(12) United States Patent
Shikama et al.

(10) Patent No.: US 12,276,847 B2
(45) Date of Patent: Apr. 15, 2025

(54) OPTICAL CONNECTING COMPONENT AND OPTICAL CONNECTING STRUCTURE

(71) Applicant: Nippon Telegraph and Telephone Corporation, Tokyo (JP)

(72) Inventors: Kota Shikama, Tokyo (JP); Norio Sato, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 210 days.

(21) Appl. No.: 17/782,475

(22) PCT Filed: Oct. 28, 2020

(86) PCT No.: PCT/JP2020/040440
§ 371 (c)(1),
(2) Date: Jun. 3, 2022

(87) PCT Pub. No.: WO2021/111773
PCT Pub. Date: Jun. 10, 2021

(65) Prior Publication Data
US 2023/0003950 A1    Jan. 5, 2023

(30) Foreign Application Priority Data

Dec. 5, 2019  (WO) .................. PCT/JP2019/047636

(51) Int. Cl.
*G02B 6/38*      (2006.01)
*G02B 6/42*      (2006.01)

(52) U.S. Cl.
CPC ......... *G02B 6/3886* (2013.01); *G02B 6/3885* (2013.01); *G02B 6/4231* (2013.01)

(58) Field of Classification Search
CPC .......... G02B 6/3886; G02B 6/36; G02B 6/38; G02B 6/3807; G02B 6/3873; G02B 6/3885; G02B 6/4231
See application file for complete search history.

(56) References Cited

U.S. PATENT DOCUMENTS 4,844,582 A * 7/1989 Giannini .............. G02B 6/4292
                                                          385/59
5,555,332 A   9/1996 Dean et al.
(Continued)

FOREIGN PATENT DOCUMENTS

FR    2527791 A1 * 12/1983 ........... G02B 6/3873
GB    2020055 A    11/1979
(Continued)

OTHER PUBLICATIONS

Machine translation of FR 2527791 A1. (Year: 1983).*
(Continued)

*Primary Examiner* — Daniel Petkovsek
*Assistant Examiner* — Emma R. Oxford
(74) *Attorney, Agent, or Firm* — Slater Matsil, LLP

(57) ABSTRACT

An optical connecting component is an optical connecting component to be connected to another optical connecting component, which includes an optical waveguide component, an alignment component for fixing the optical waveguide component, and a magnetic structure integrated with the alignment component. A positioning structure is provided on a connecting end face of the alignment component, in which the positioning structure determines a relative position between the connecting end face and a connecting end face of an alignment component provided in the other optical connecting component.

14 Claims, 39 Drawing Sheets

(56) References Cited

U.S. PATENT DOCUMENTS

| | | | |
|---|---|---|---|
| 6,257,769 B1* | 7/2001 | Watanabe | G02B 6/30 385/59 |
| 7,311,526 B2* | 12/2007 | Rohrbach | G06F 1/18 439/39 |
| 8,757,893 B1 | 6/2014 | Isenhour et al. | |
| 9,869,826 B1 | 1/2018 | Shang | |
| 2002/0154871 A1 | 10/2002 | Nakura et al. | |
| 2006/0093273 A1* | 5/2006 | Fenwick | G02B 6/389 385/63 |
| 2015/0111398 A1* | 4/2015 | Isenhour | H01R 13/6205 439/39 |
| 2017/0123170 A1* | 5/2017 | Furuya | G02B 6/44715 |
| 2017/0269312 A1 | 9/2017 | Mitsui et al. | |
| 2019/0113691 A1 | 4/2019 | Konegawa et al. | |
| 2019/0384024 A1* | 12/2019 | Neukirch | G02B 6/423 |
| 2021/0405311 A1* | 12/2021 | Li | G02B 6/4292 |
| 2023/0273377 A1* | 8/2023 | Nakane | G02B 6/3885 385/57 |

FOREIGN PATENT DOCUMENTS

| | | | | |
|---|---|---|---|---|
| JP | 61070817 U | | 5/1986 | |
| JP | H09318852 A | * | 12/1997 | |
| JP | 2000275464 A | | 10/2000 | |
| JP | 2001215362 A | | 8/2001 | |
| JP | 2007272047 A | | 10/2007 | |
| WO | WO-2012029442 A1 | * | 3/2012 | G02B 6/382 |

OTHER PUBLICATIONS

Machine translation of WO 2012029442 A1. (Year: 2012).*

Machine translation into English of JP-H09318852-A, 8 pages. (Year: 1997).*

Nagase, et al., "History of Fiber Optic Physical Contact Connector for Low Insertion and High Return Losses", IEEE HISTory of Electrotechnolgy CONference (HISTELCON), 2017, pp. 113-116. "As described in the specification".

* cited by examiner

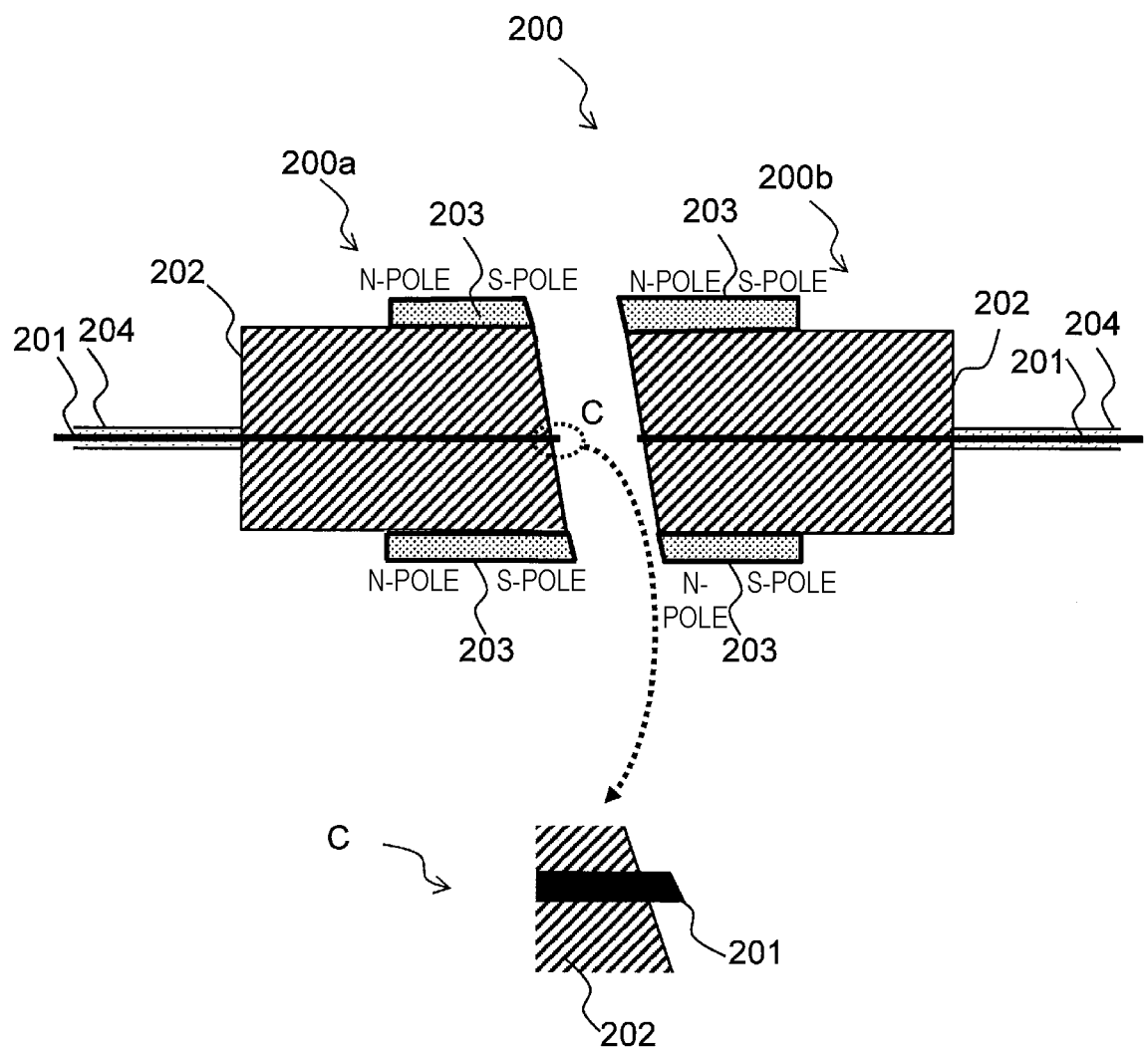

OPTICAL CONNECTING COMPONENT AND OPTICAL CONNECTING STRUCTURE

CROSS-REFERENCE TO RELATED APPLICATIONS

This application is a national phase entry of PCT Application No. PCT/JP2020/040440, filed on Oct. 28, 2020, which claims the benefit of PCT Application No. PCT/JP2019/047636, filed on Dec. 5, 2019, which applications are hereby incorporated herein by reference.

TECHNICAL FIELD

The present invention relates to an optical connecting component and an optical connecting structure that are oriented to downsizing and use magnets for holding and pressing optical waveguide components with each other.

BACKGROUND

In recent years, with increase in traffic due to video services, internet of things (IoT), cloud services, or the like, significant expansion of communication capacity in data centers or between data centers is required. In order to realize the expansion of communication capacity, instead of conventional short-distance communication methods using electric signals, introduction of optical interconnection technology using optical transmission techniques used in optical communications or the like is progressing. In this optical interconnection technology, an optical transceiver form called as a pluggable transceiver is often used. Further, with the recent need for increasing communication capacity, the number of channels of optical transceivers configuring the optical interconnection is increasing. There is a need to mount numerous optical fibers on a board. In order to connect the numerous optical fibers on or at an edge of the board so as to realize a space saving, downsizing of a multicore optical connector is required.

In the pluggable transceiver, various optical components represented by an optical transmitter/receiver, electric circuit components for controlling them, a printed circuit board and the like are accommodated in a metal housing thereof. Further, the housing is provided with a guide structure that allows an optical connector to be inserted from or pulled out to the outside. Inserting an optical connector matching with this guide structure enables the optical connector to be optically coupled with the optical transmitter/receiver in the housing.

As mentioned above, with the need for the increase in communication capacity, the size of the pluggable transceiver is getting smaller year by year, and the housing is downsized to the same extent as the guide structure for the optical connector. Therefore, in order to further downsize the housing in the future, it is required to downsize a guide mechanism, that is, further downsize the size of an optical connector matching with the guide mechanism. Further, there is also an application of connecting optical fibers to each other in the small housing, and the optical connector is required to be made as small as possible even for this application.

Further, it is considered that the introduction of the optical interconnection on a board while eliminating the housing will progress in the future. Even in such a case, in order to reduce the area occupied by optical connecting components on the board, the demand for compact optical connectors is increasing.

Generally, as an optical connector for connecting optical fibers such as an optical connector for a pluggable transceiver, in the case of a single-core connector, the one using a cylindrical ferrule, which is represented by an SC connector or an LC connector, is known. Further, in the case of a multi-core connector, an MT connector and an MPO connector based on the MT connector are known (Non-Patent Literature 2).

The multi-core connector is similar to the single-core connector in that it is used as an interface of a pluggable transceiver, and is widely used particularly for multi-channel parallel transmission applications. As illustrated in Non-Patent Literature 1, in the single-core connector, positioning is performed by accommodating and aligning fibers in cylindrical ferrule components and connecting them in a confronting relationship with a split sleeve interposed therebetween. That is, independent components are used for the optical fiber alignment components (single-core ferrules) and the high-accuracy positioning component (split sleeve) between the ferrules.

On the other hand, in the multi-core connector, resin-molded ferrules having a plurality of holes for accommodating fibers and two guide holes for accommodating/inserting guide pins are used. The fiber connection is performed by bonding and fixing a plurality of fibers in the ferrules and fitting the guide pins provided in one ferrule into the other ferrule. At this time, since the fiber accommodation holes and the guide pin holes are excellent in both hole diameter accuracy and hole position accuracy, high accuracy positioning between the fibers can be realized.

Further, in each optical connector, connecting end faces of the fibers and the ferrules are polished. For example, in the MT connector of the multi-core connector, the end faces are right-angled. In the MPO connector, the end faces are inclined.

Further, in the multi-core connector, the end face of the fiber is often polished so as to slightly protrude from the end face of the ferrule. In order to prevent Fresnel reflection between the fiber and an air layer on the connecting end face, for example, in the MT connector, the ferrules are pressed against each other by a clip, and the connecting end face is filled with a resin that matches in refractive index. Further, for example, in the MPO connector, the connecting end faces are obliquely formed, and coiled springs are provided behind respective ferrules to realize a physical contact (PC) connection, which is a close contact connection between cores, so that the ferrules in a confronting relationship can be pressed with a sufficient force.

Further, in realizing the optical interconnection, it is necessary to connect optical elements configuring the optical transceiver to numerous optical fibers or optical waveguide devices containing a polymer, silica glass, or the like, as a core material. Conventionally, they are positioned with high accuracy using an active alignment and then permanently fixed and integrated with an adhesive or the like. Further, a structure for easily connecting the connectors is also under study, in which the previously described optical connector technique is diverted for the connection between optical elements and a plurality of optical fibers or optical waveguides on a board, without performing the active alignment.

For example, by integrating the optical fibers or optical waveguides as optical connecting components using an MT ferrule or the like and arranging a positioning structure that fits with guide pins of the MT ferrule on the optical element side, a multicore connector connection with the optical elements can be realized. Even in such a connector connection with optical elements, since the optical elements themselves are becoming smaller and denser year by year, the connection components are required to be further reduced in size.

CITATION LIST

Non-Patent Literature

Non-Patent Literature 1: Ryo Nagase, Kazuo Hokari, "optical connector", NTT technique journal, December 2007, pp.74-78.

"Non-Patent Literature 2: History of Fiber Optic Physical Contact Connector for Low Insertion and High Return Losses," Ryo Nagase, Yoshiteru Abe, Mitsuru Kihara, Proc. IEEE HISTory of ELectrotechnolgy CONference (HISTEL-CON), 2017.

SUMMARY

Technical Problem

However, since conventional multicore optical connectors require a spring component such as a clip or a coiled spring and a mechanical fastening structure for constantly applying the pressing force of the spring component to connecting end faces, there is a limit to downsizing. In particular, as illustrated in Non-Patent Literatures 1 and 2, the MPO connector using coiled springs requires the usage of a plurality of components and housing components to realize manual push-pull connection while resisting a reaction force of the coiled spring. The size of these components is an obstacle factor in further downsizing the connectors. Further, when a spring component is used for connector connection with optical elements, it is required to use a clip or a spring component for fastening them, and the size of these components is an obstacle factor in downsizing the connector connection portions.

Embodiments of the present invention have been made to solve the above-mentioned problems, and intends to provide an optical connecting component and an optical connecting structure that are compact in size and capable of realizing a stable optical connecting by adding a pressing force between connecting end faces without using any mechanical fastening component, any spring component, or the like.

Means for Solving the Problem

To solve the above-mentioned problem, an optical connecting component according to embodiments of the present invention is an optical connecting component to be connected to another optical connecting component, the optical connecting component including an optical waveguide component, an alignment component for fixing the optical waveguide component, and a magnetic structure integrated with the alignment component, wherein a positioning structure is provided on a connecting end face of the alignment component, in which the positioning structure determines a relative position between the connecting end face and a connecting end face of an alignment component provided in the other optical connecting component.

Effects of Embodiments of the Invention

According to embodiments of the present invention, stable optical connection can be realized, and an optical connecting component and an optical connecting structure that are compact in size can be realized.

BRIEF DESCRIPTION OF THE DRAWINGS

FIG. 6B is a side sectional view illustrating the optical connector according to the second embodiment of the present invention.

DETAILED DESCRIPTION OF ILLUSTRATIVE EMBODIMENTS

First Embodiment

Hereinafter, a first embodiment will be described in detail with reference to attached drawings.

Figure 1A:
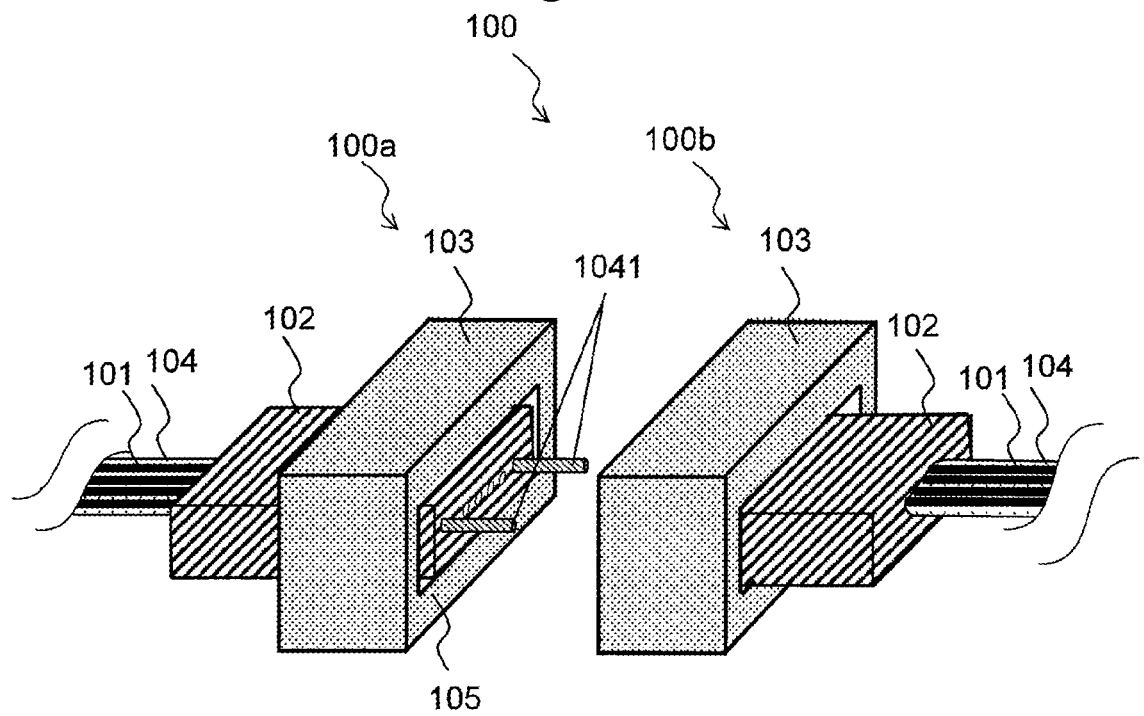
FIG. 1A is a perspective view illustrating an optical connector, before connection, according to a first embodiment of the present invention.
Figure 1B:
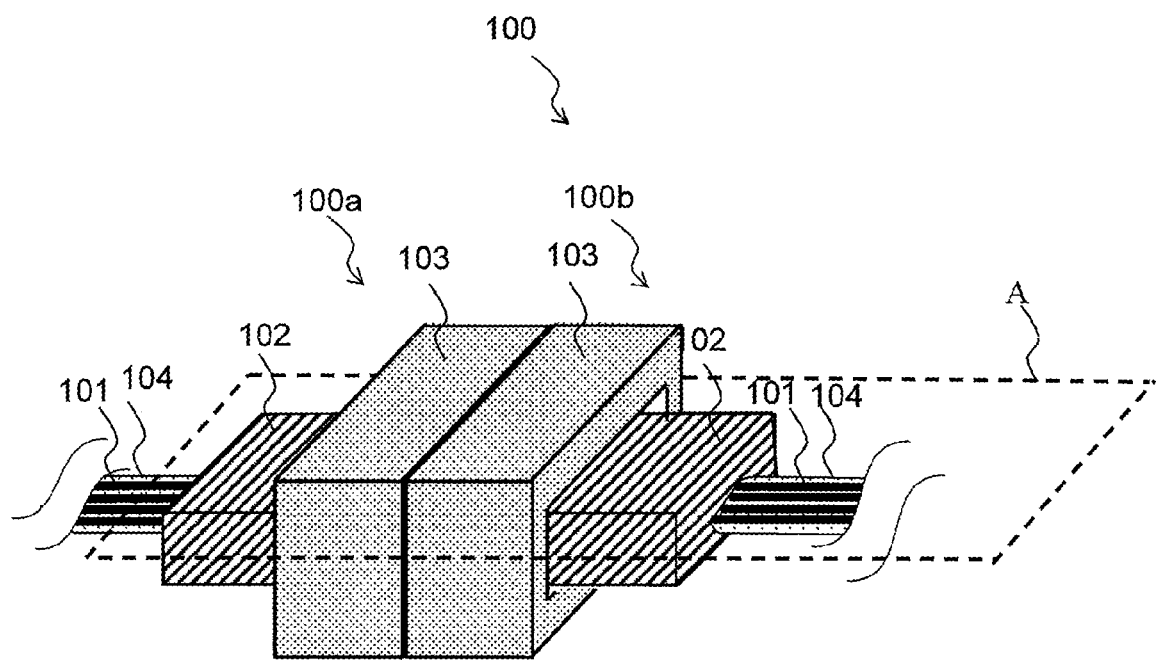
FIG. 1B is a perspective view illustrating the optical connector, after connection, according to the first embodiment of the present invention.
Figure 2A:
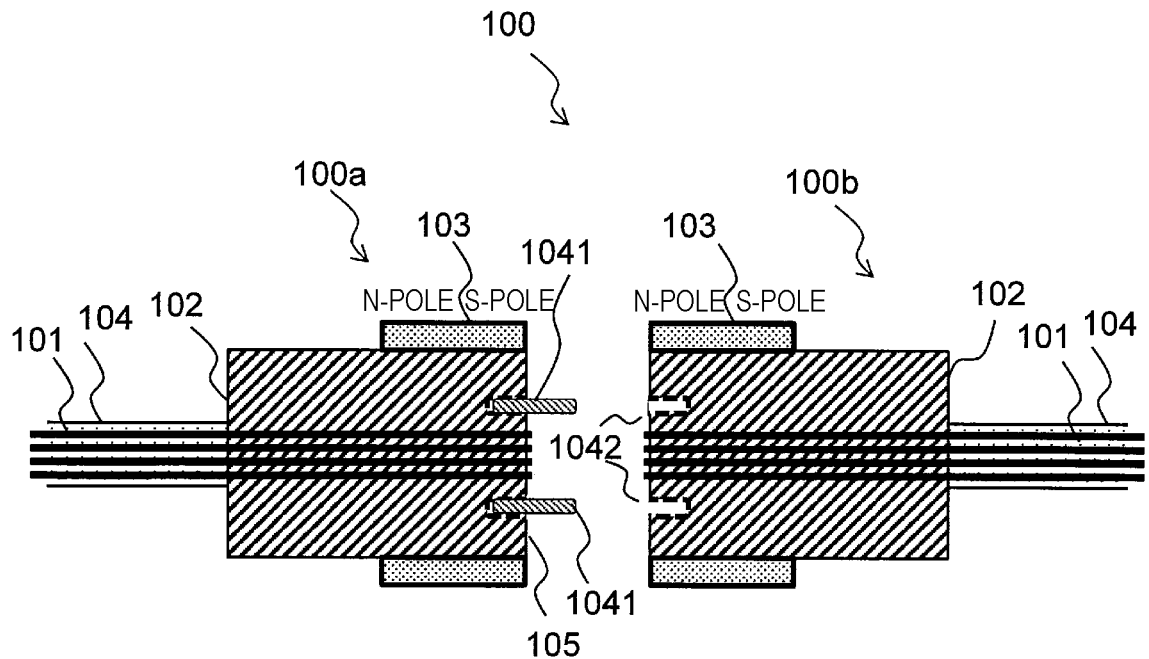
FIG. 2A is a top sectional view illustrating the optical connector, before connection, according to the first embodiment of the present invention.
Figure 2B:
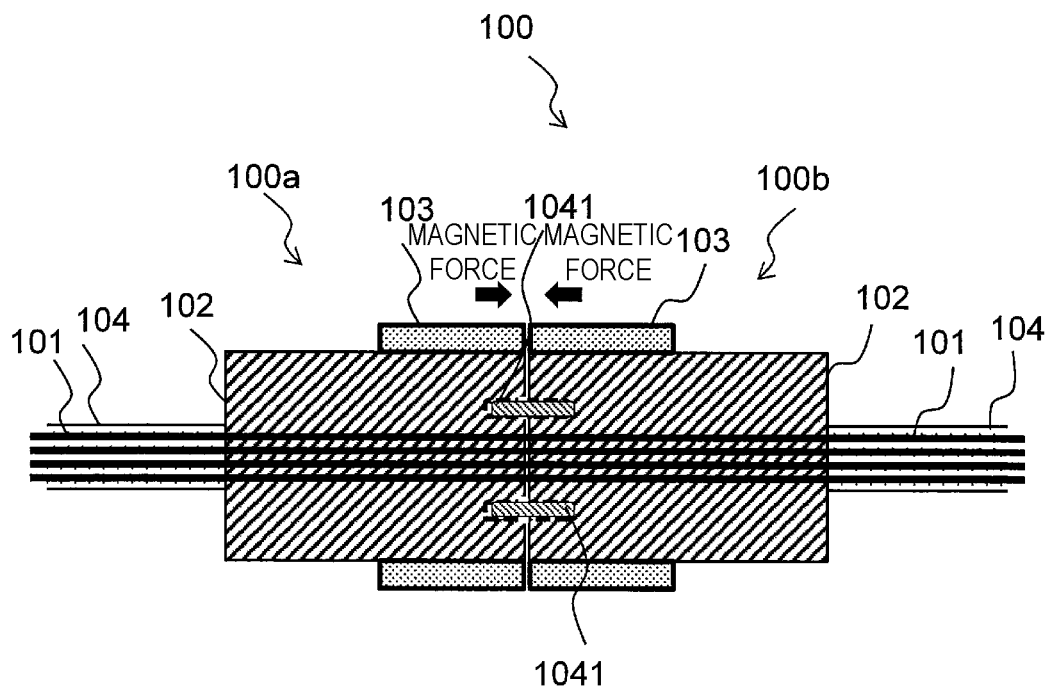
FIG. 2B is a top sectional view illustrating the optical connector, after connection, according to the first embodiment of the present invention.

FIGS. 1A and 1B are perspective views illustrating an optical connector 100, before and after connection, according to the first embodiment of the present invention. In the drawings, a plane A is a horizontal plane including a central axis of the optical connector 100. The present embodiment is an exemplary optical connecting structure that uses a pair of optical connecting components in which optical fibers are used as optical waveguide components and the optical fibers are aligned. FIGS. 2A and 2B are sectional views (hereinafter, referred to as "top sectional views") illustrating the optical connector 100, before and after connection, with the plane A as a cross section. Further, hereinafter, the direction of the optical fibers accommodated in the optical connector according to embodiments of the present invention is referred to as "optical fiber longitudinal direction". Further, hereinafter, a sectional view with a plane perpendicular to the plane A as a cross section, including the central axis of the optical connector according to embodiments of the present invention in the optical fiber longitudinal direction, is referred to as "side sectional view".

As illustrated in the drawings, the optical connector 100 includes optical fibers 101 and optical fiber alignment components 102, and in a confronting state, causes positioning structures (fitting structures) provided in the optical fiber alignment components 102 to realize positioning, so that the optical fibers 101 are mutually connected. As mentioned above, the optical connector 100 is illustrated as an exemplary optical connecting structure. Further, the optical connector 100 serving as the optical connecting structure is configured by connecting two optical connecting components bow and mob, each including the optical fibers 101, the optical fiber alignment component 102, and the positioning structure (fitting structure).

Here, the optical fiber alignment component 102 is provided with at least a plurality of microholes having an inner diameter slightly larger than the outer diameter of the optical fiber 101 in the optical fiber alignment component 102. The optical fiber 101 whose coating has been removed is accommodated in the microhole. The optical fibers 101 and the optical fiber alignment component 102 are fixed with an adhesive. Note that the adhesive is not illustrated in the drawings. The optical fiber 101 is illustrated as an exemplary optical waveguide component. Other examples of the optical waveguide component include optical waveguides, optical elements, and the like.

Further, a plurality of optical fibers 101 is attached to an optical fiber tape 104.

The optical fibers 101 and the optical fiber alignment component 102 are surface-polished, at their connecting end face 105, so as to be substantially the same plane. Further, a joining component 103 capable of accommodating the optical fiber alignment component 102 is arranged in such a way as to surround the circumference of the optical fiber alignment component 102 in the outer peripheral direction. Here, the outer peripheral direction of the optical fiber alignment component is a direction along the outer periphery of the optical fiber alignment component in a plane perpendicular to the optical fiber longitudinal direction.

The joining component 103 in the present embodiment has an opening part capable of accommodating the optical fiber alignment component 102 (e.g., in the case of an MT ferrule-based structure, the width is approximately 2 to 10 mm, the height is approximately 1 to 5 mm, and the length is approximately 2 to 10 mm), and the size of the joining component 103 is approximately 3 to 15 mm in width, approximately 2 to 10 mm in height, and approximately 3 to 10 mm in length.

Further, the optical fiber alignment component 102 has the fitting structure, according to which two metal guide pins 1041 used in a known multicore ferrule are inserted into guide pin holes 1042 provided in the optical fiber alignment component (ferrule) 102 so that the pins are fitted and positioned. Although in the drawing the guide pins and the pin holes are provided only partly in the longitudinal direction, they may be arranged so as to penetrate in the longitudinal direction of the ferrule. Further, while the fitting by these guide pins is kept, the attractive force acts in such a way as to attract the connecting end faces each other because the joining components 103 are made of magnets.

In embodiments of the present invention, the type and material of the optical fiber and the type and material of the optical fiber alignment component 102 can be any known type and material. For example, the optical fiber may be a silica-based fiber or a plastic fiber.

Further, although the MT ferrule is used for the optical fiber alignment component 102, a known multicore ferrule may be used. In this case, any of general-purpose plastics, engineering plastics, super engineering plastics, and the like, which are often used for the multicore ferrule, may be used. Further, a glass material, a semiconductor material such as silicon, or ceramic may be used for a structure similar to the multicore ferrule. In addition, similar effects can be exerted by any other material as long as the optical fibers can be positioned and arranged with high accuracy. For example, like a known fiber array, a structure in which the fibers are accommodated in a glass V groove and closed by a lid component placed thereon and fixed with an adhesive may be used.

Further, although the circumference of the optical fiber 101 is coated, two or more layered coating may be realized by additionally providing a known tube, a nylon coating, or the like thereon. Further, in the case of a multicore fiber, a known taped and bundled fiber tape may be used.

Figure 3A:
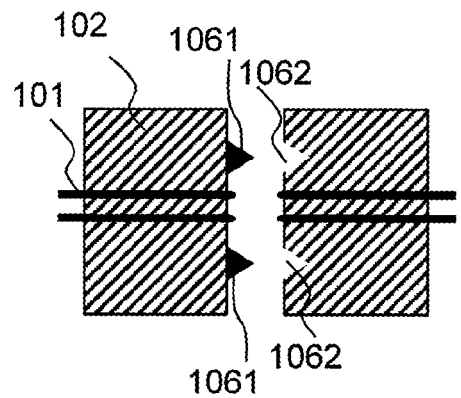
FIG. 3A is a top sectional view illustrating an optical connector fitting structure according to the first embodiment of the present invention.

Further, the guide pins 1041 and the guide pin holes 1042 are used in the positioning structure (fitting structure) in the present embodiment. The fitting structure is not limited to the above-described example. For example, like the fitting using notches 1111 and grooves 1112 illustrated in FIG. 3A, protrusions or the like may be formed, or attached, on one ferrule end face, and guide grooves that match these protrusions may be provided on the other ferrule end face.

Figure 3B:
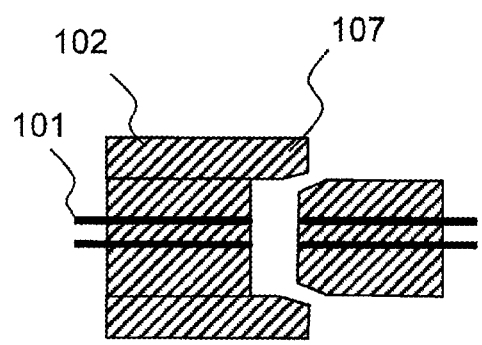
FIG. 3B is a top sectional view illustrating an optical connector fitting structure according to the first embodiment of the present invention.

Further, as illustrated in FIG. 3B, an external fitting guide structure 107 or the like may be used. Any other fitting structure is applicable as long as similar accuracy can be ensured. In the external fitting guide structure 107 of the fourteenth aspect, one ferrule has an insertion hole and the other ferrule has an external shape that matches the shape of the insertion hole.

Here, the joining components 103 are made of permanent magnets. Any known magnets may be used, as the material of the permanent magnets, depending on a magnetic force to be generated. For example, they can be neodymium magnets. In addition, ferrite magnets, alnico magnets, samarium cobalt magnets, KS steels, MK steels, neodymium iron boron magnets, and the like can be used. In this case, the joining components 103 made of permanent magnets are magnetized to N-poles and S-poles along the optical fiber longitudinal direction. Hereinafter, the "joining components" are also referred to as a "magnetic structure".

Even if both are not permanent magnets, when one joining component 103 is a magnet made of a hard magnetic material, the other joining component 103 may be made of a soft magnetic material such as metal. For example, SUS430, iron, nickel, cobalt, or a material having magnetism of stainless (SUS), which is an iron-based alloy, can be used as a material unexpensive and excellent in machining.

The optical fiber alignment component 102 and the joining component 103 are integrated in advance by any method such as bonding, mechanical fitting, or any one of various joining techniques. Further, in the first embodiment, the external shapes of the optical fiber alignment component 102 and the joining component 103 are exemplarily illustrated as being quadrangle/rectangle as illustrated in FIGS. 1A and 1B, but their external shapes can be any arbitrary shapes, of course. For example, the external shapes may be circular, elliptical, polygonal, or the like. The above is similarly applied to other embodiments described below.

Here, the optical fiber 101 is polished so as to protrude slightly from the optical fiber alignment component 102 with respect to the optical fiber longitudinal direction of the connecting end face. Further, the connecting end face of the joining component 103 and the connecting end face of the optical fiber alignment component 102 are positioned and integrated so as to be substantially the same plane.

With such a structure, the following effects are exerted. That is, according to the conventional multicore optical connector, in order to hold opposing optical fibers 101 so as to eliminate a gap therebetween, a coiled spring, a clip, or the like adds a pressing force. Further, the MPO connector or the like has a housing structure that realizes a mechanical fastening structure to constantly add the pressing force of a coiled spring to the connecting end face.

Adopting the present structure makes it possible to add a pressing force for connecting the optical fibers 101 each other with the attractive force by the magnet, without adding any spring element. In addition, since the attractive force by the magnet additionally expresses the effect of holding the members, a stable optical connection can be maintained without requiring a mechanical fastening component that counteracts the reaction force of the spring as in the conventional art. That is, the number of members can be reduced, and as a result, a more compact multicore optical connector can be realized.

Figure 4A:
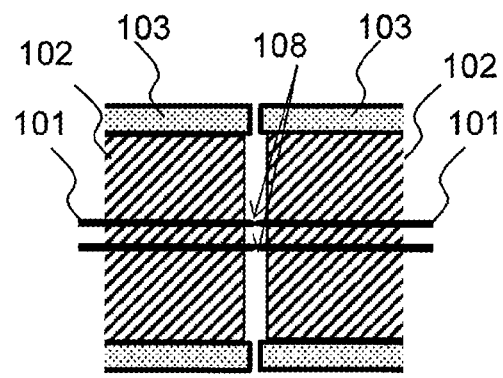
FIG. 4A is a top sectional view illustrating an optical fiber connection portion of the optical connector according to the first embodiment of the present invention.

Here, as illustrated in FIG. 4A, by appropriately setting the protrusion of the end face of the optical fiber 101 from the end face of the optical fiber alignment component 102, and adding the pressing force by magnets, a physical contact (PC) connection 108 can be realized in all optical fibers 101. In addition, a refractive index matching agent may be provided between them as described below in another embodiment.

Figure 4B:
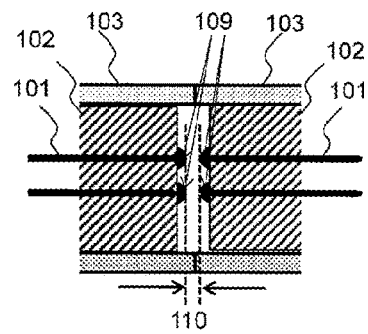
FIG. 4B is a top sectional view illustrating the optical fiber connection portion of the optical connector according to the first embodiment of the present invention.

Further, as illustrated in FIG. 4B, a microlens 109 or the like may be provided on the end face of the optical fiber 101, so that the connection is feasible in a state where an air gap 110 is intentionally provided between the optical fibers 101. Further, the air gap no may be intentionally provided without providing the microlens 109. Further, if necessary, antireflection coating or the like may be applied on the connecting end face of the optical fiber 101. Further, as described below in a second embodiment, the end face of the optical fiber alignment component 102 and the end face of the optical fiber 101 may be polished while providing a constant angle with respect to a direction orthogonal to the optical fiber longitudinal direction.

Here, the opposing faces of the joining components 103 are desired to be parallel to each other in order to stabilize the vector of the attractive force by the magnet in the optical fiber longitudinal direction. However, even if the above-described parallelism is not perfect, the reduction in optical coupling loss is ignorable unless the abutting angle of the ferrules in the longitudinal direction is greatly deviated. That is, good optical characteristics can be achieved even with parallelism that can be ensured with practical machining accuracy.

Further, the present embodiment exemplarily illustrates the joining component 103 arranged so as to cover the outer periphery of the optical fiber alignment component 102. However, the covering is not required to be perfect, of course. The joining component 103 may be arranged so as to be present on only one peripheral face or two peripheral faces.

Specifically, in the present embodiment, the joining component 103 is arranged so as to surround the circumference of a part of four sidewalls of the optical fiber alignment component 102 in the outer peripheral direction, but is not limited to this, and may be arranged so as to surround the entire outer periphery of the sidewalls of the optical fiber alignment component 102. Further, it may be arranged so as to surround the circumference of only a part of one face of the optical fiber alignment component 102, instead of all four sidewalls, and it suffices that it is arranged around at least a part of one side face of the optical fiber alignment component 102 in the outer peripheral direction.

In the case of not surrounding the four sidewalls of the optical fiber alignment component 102 in the outer peripheral direction, it may be concerned that the attractive force decreases with reducing magnet contact area. However, it is desired to largely set the size of the contact area, if necessary.

It is also possible that, from the nature of magnets, the present optical connectors are arranged in multiple rows. That is, it is also possible to provide a multiple-string multicore optical connector with no clearance in which the present multicore optical connectors are arranged side by side.

Modified Example of First Embodiment

Hereinafter, a modified example of the first embodiment will be described with reference to FIGS. 5A and 5B.

Figure 5A:
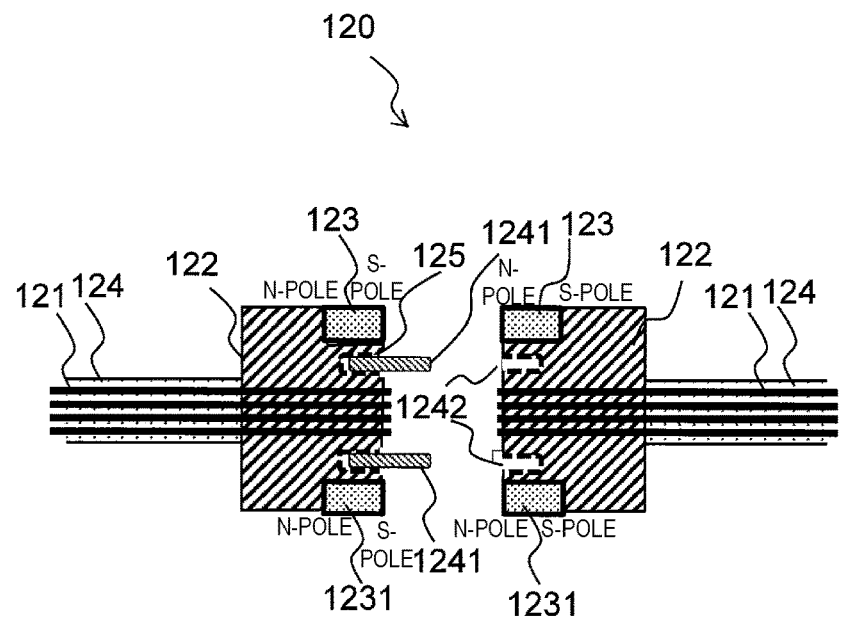
FIG. 5A is a top sectional view illustrating an optical connector, before connection, according to a modified example of the first embodiment of the present invention.
Figure 5B:
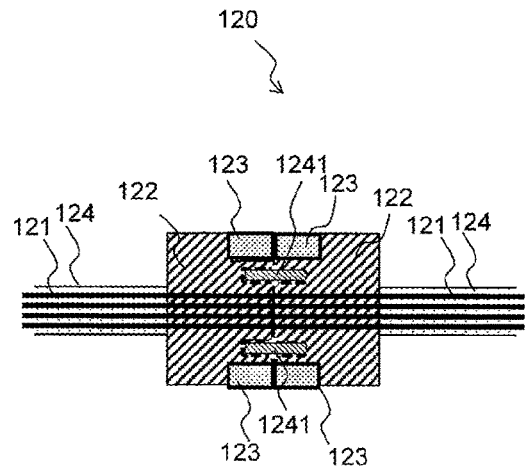
FIG. 5B is a top sectional view illustrating the optical connector, after connection, according to the modified example of the first embodiment of the present invention.

FIGS. 5A and 5B are top sectional views of an optical connector (optical connecting structure) with optical connecting components mutually connected, before and after connection, according to a modified example of the first embodiment of the present invention. In the modified example of the present embodiment, even if joining components (magnets) 123 serving as magnetic structures are appropriately arranged in the vicinity of connecting end faces 125 of optical fiber alignment components 122, effects similar to those of the first embodiment can be exerted by appropriately setting the magnet size or the like.

Here, the joining components (magnets) 123 may be arranged in the vicinity of the connecting end faces 125 of the optical fiber alignment components 122, so as to be in a row (so as to surround) in the outer peripheral direction of the optical fiber alignment component 122, or may be arranged partly in the vicinity of the connecting end faces 125, that is, at one location or at a plurality of locations. It suffices that the joining component 123 has a structure including the magnet as a part thereof.

Second Embodiment

Figure 6A:
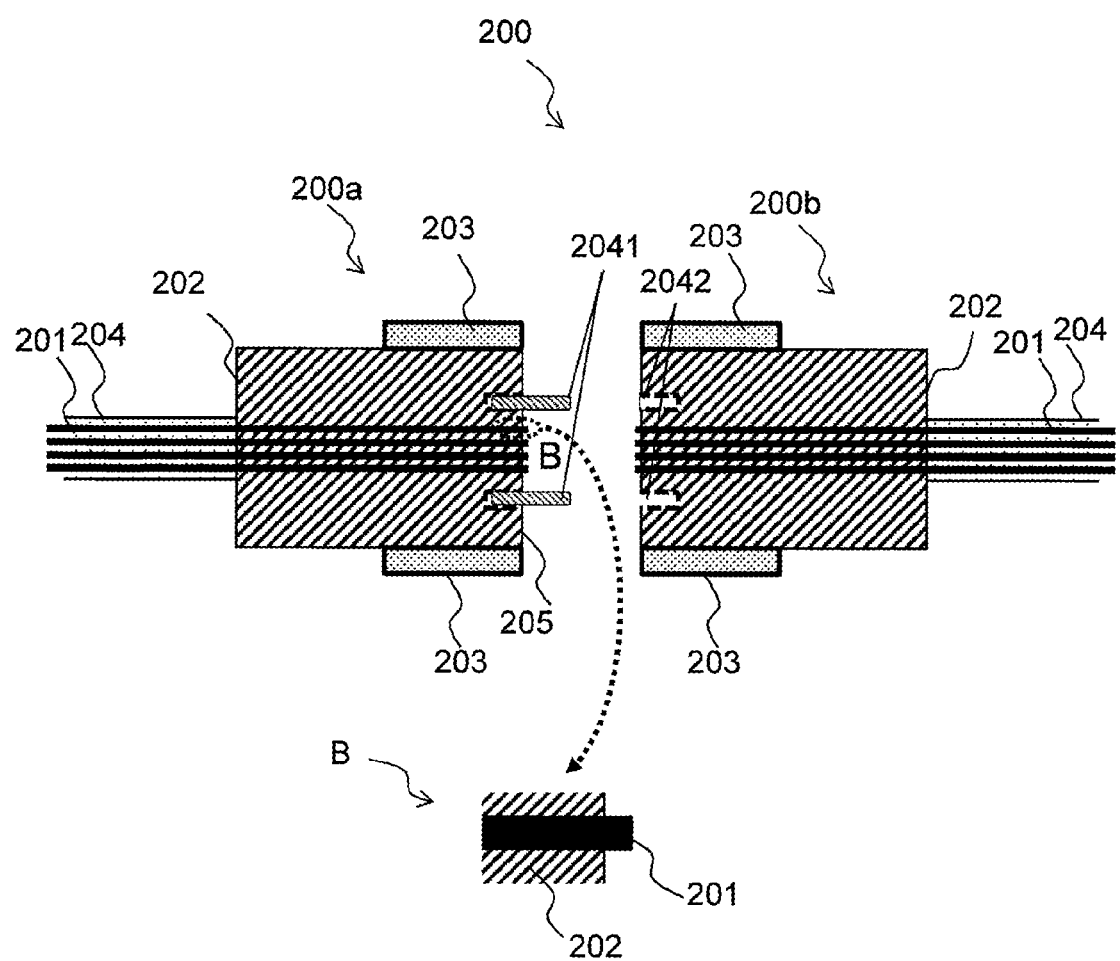
FIG. 6A is a top sectional view illustrating an optical connector according to a second embodiment of the present invention.

FIG. 6A illustrates a top sectional view of an optical connector (optical connecting structure) 200 according to the second embodiment of the present invention, and FIG. 6B illustrates a side sectional view thereof. Here, FIG. 6A also illustrates an enlarged view of a peripheral portion B of an optical fiber 201 on a connecting end face 205 of an optical fiber alignment component 202. Further, FIG. 6B also illustrates an enlarged view of a peripheral portion C of the optical fiber 201 on the connecting end face 205 of the optical fiber alignment component 102.

The configuration of the optical connector (optical connecting structure) 200 according to the present embodiment is the same as that of the first embodiment and is configured by connecting two optical connecting components 200a and 200b. A multicore ferrule 202 for the MT connector is used as the optical fiber alignment component. In the optical fiber 201, single-mode fibers whose core diameter is approximately 10 µm are arranged.

Further, the connecting end face is polished into an inclined end face of approximately 8 degrees, when viewed from the side surface. Having such an inclined face can prevent the influence of the reflected light of the light guided through the optical fiber. The angle may be an angle other than 8 degrees, and may be 5 degrees or 10 degrees. Further, the end face of the optical fiber 201 is polished so as to slightly protrude when viewed from the end face of the ferrule 202, or polished so that the tip of the fiber has a spherical surface.

Further, neodymium magnets are used for the joining components 103, and poles thereof are magnetized in the optical fiber longitudinal direction, and are arranged so as to confront and form a combination that exerts an attractive force with the N-pole (S-pole) of the joining component. All the fiber cores are brought into close contact with each other under the pressing of the attractive force by the magnet, and the PC connection is realized as illustrated in FIG. 4A.

With such a structure, similar to the effects in the first embodiment, a compact PC connection multicore optical connector can be realized by eliminating the mechanical pressing/holding structure such as the clip used in the conventional MT connector, the coiled spring and the plurality of housing components used in the MPO connector or the like.

Further, arranging the poles of the magnets in the optical fiber longitudinal direction defines the male and female on the right-hand side and the left-hand side of FIGS. 6A and 6B. However, compared with a case where one of them is made of a metallic magnetic material (soft magnetic material), the attractive force by the magnet can be generated largely and it is possible to provide an optical connector and an optical connecting structure that are compact in size.

In other words, arranging the poles of the magnets in the optical fiber longitudinal direction determines the polarities between respective magnets. Therefore, the degree of freedom in selecting the polarity of the magnet is restricted. On the other hand, the effect that the attractive force by the magnet can be generated largely can be exerted.

Third Embodiment

Figure 7A:
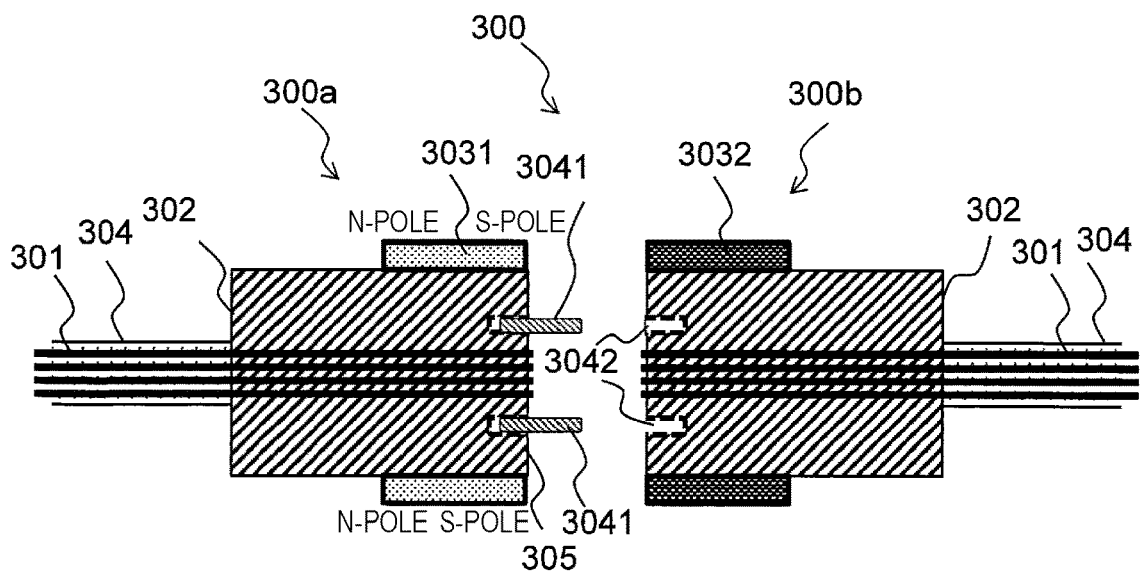
FIG. 7A is a top sectional view illustrating an optical connector, before connection, according to a third embodiment of the present invention.
Figure 7B:
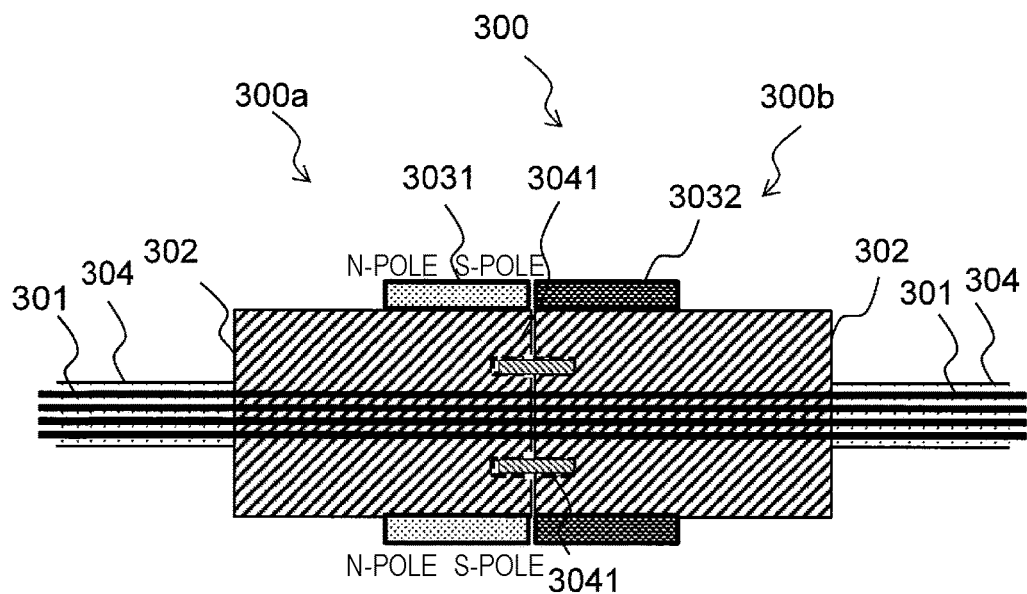
FIG. 7B is a top sectional view illustrating the optical connector, after connection, according to the third embodiment of the present invention.
Figure 7C:
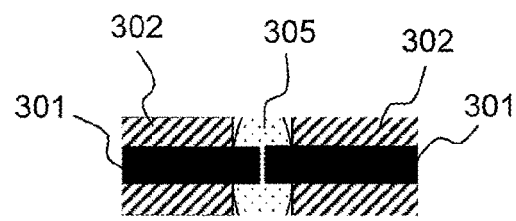
FIG. 7C is an enlarged top sectional view illustrating an optical fiber connection portion of the optical connector, after connection, according to the third embodiment of the present invention.

FIGS. 7A and 7B illustrate top sectional views of an optical connector (optical connecting structure) 300 with optical connecting components mutually connected, before and after connection, according to a third embodiment of the present invention. Further, FIG. 7C illustrates an enlarged view of a connection portion of optical fibers 301.

The configuration of the optical connector (optical connecting structure) 300 according to the present embodiment is substantially the same as that of the second embodiment, and is configured by connecting two optical connecting components 300a and 300b, but each fiber end face is projected and polished so as to be a right-angled end face when viewed from the side surface. Further, the joining component being one magnetic structure is SUS430. Further, a refractive index matching agent 305 is interposed between the connecting end faces of the optical fibers 301 to be connected.

With such a structure, similar to the effects in the first embodiment, a compact multicore optical connector can be realized by eliminating the mechanical pressing/holding structure such as the clip used in the conventional MT connector, the coiled spring and the plurality of housing components used in the MPO connector or the like.

Further, although the attractive force by the magnet reduces when one of them is made of metal, the connection is feasible without specifying a pair of male and female. In other words, in a configuration in which one joining component contains a metallic magnetic material and the other joining component contains a magnet, the attractive force by the magnet reduces, but the polarity of the magnet of the other joining component is not determined. Therefore, the effect that the degree of freedom in selecting the polarity of the magnet is not restricted is exerted.

At this time, since the refractive index matching agent 305 is interposed, Fresnel reflection can be prevented without the PC connection. As a result, since sufficient characteristics can be realized even with a small pressing force, it is possible to provide an optical connector and an optical connecting structure that are compact in size. Any known gel, liquid, or film matching agent may be used as the refractive index matching agent 305, as long as similar effects can be obtained.

Fourth Embodiment

Figure 8A:
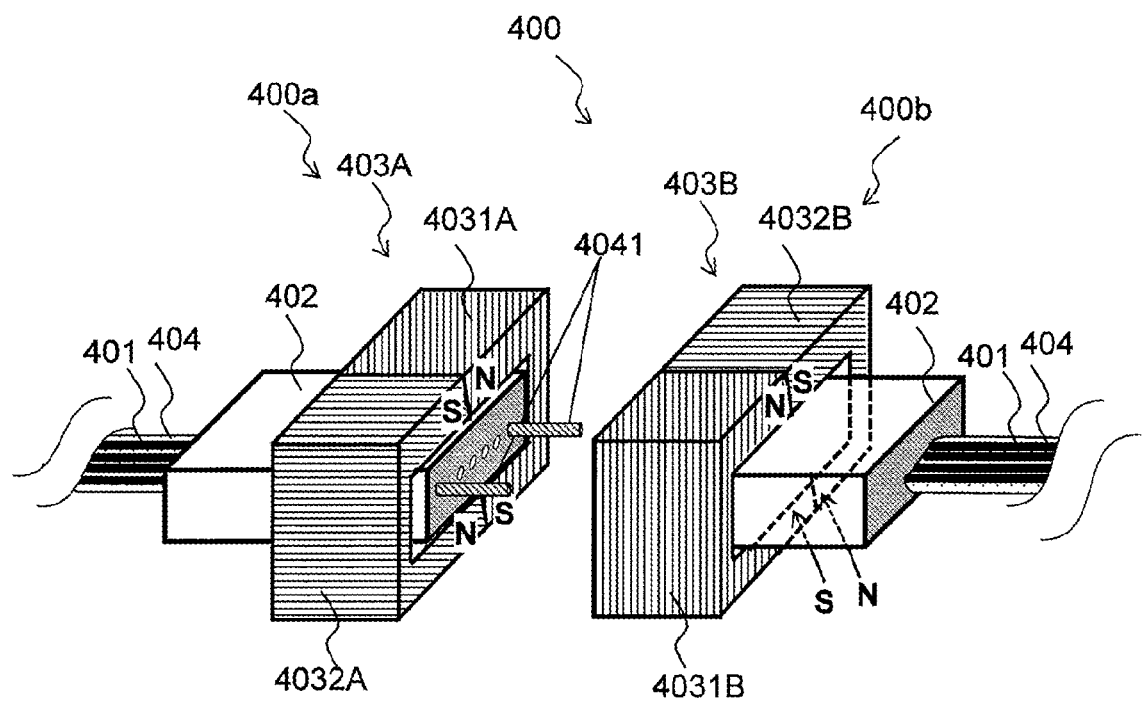
FIG. 8A is a perspective view illustrating an optical connector according to a fourth embodiment of the present invention.
Figure 8B:
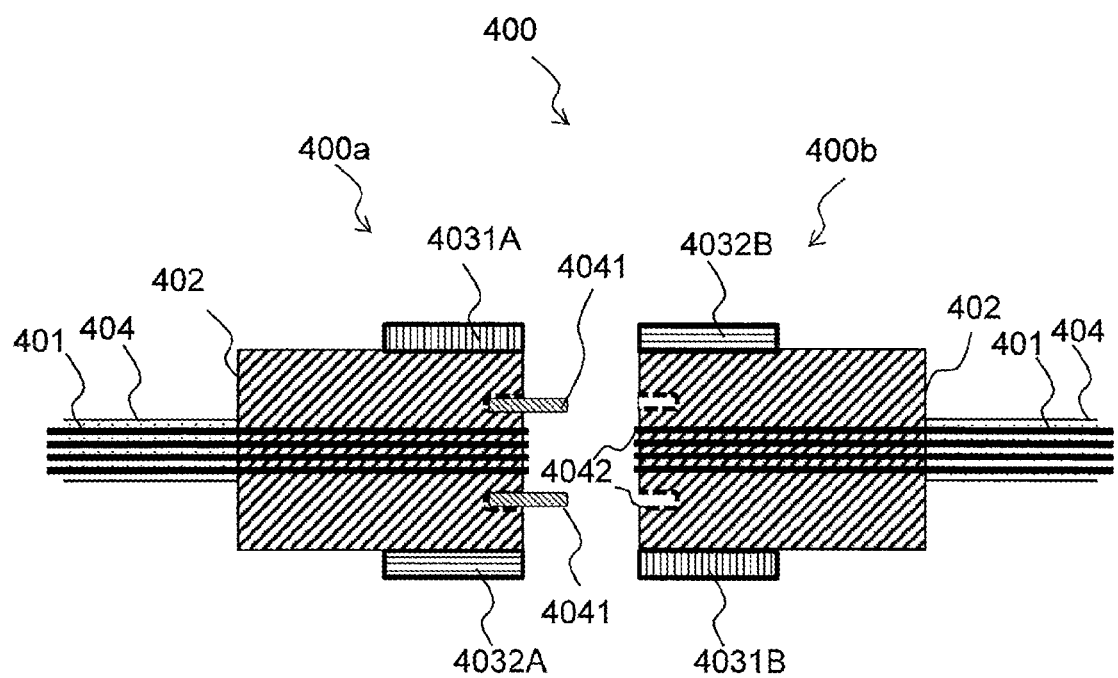
FIG. 8B is a top sectional view illustrating the optical connector according to the fourth embodiment of the present invention.

FIG. 8A illustrates a perspective view of an optical connector (optical connecting structure) 400 with optical connecting components mutually connected according to a fourth embodiment of the present invention, and FIG. 8B illustrates a top sectional view thereof. The configuration of the optical connector (optical connecting structure) 400 according to the present embodiment is substantially the same as that of the first embodiment and is configured by connecting two optical connecting components 400a and 400b, but a joining component 403 being a magnetic structure is configured to have two magnets 4031 and 4032 so as to form a divided and overlapped structure. The N-pole and S-pole of the joining components on the opposite side are arranged so that an attractive force acts.

Specifically, the optical connector (optical connecting structure) 400 according to the present embodiment has a pair of joining components 403A and 403B. The joining component 403A is composed of divided parts 4031A and 4032A. The part 4031A confronts with the part 4032A at two faces (upper and lower sides of an optical fiber alignment component 402 illustrated in FIG. 8A). One face (e.g., the upper side of the optical fiber alignment component 402 in FIG. 8A) is magnetized to the N-pole, and the other face (e.g., the lower side of the optical fiber alignment component 402 in FIG. 8A) is magnetized to the S-pole, and the magnetization is performed in the outer peripheral direction of the optical fiber alignment component 402.

Further, the part 4032A confronts with the part 4031A at two faces (upper and lower sides of the optical fiber alignment component 402 in FIG. 8A), one face (e.g., the upper side of the optical fiber alignment component 402 in FIG. 8A) is magnetized to the S-pole, and the other face (e.g., the lower side of the optical fiber alignment component 402 in FIG. 8A) is magnetized to the N-pole, and the magnetization is performed in the outer peripheral direction of the optical fiber alignment component 402.

Accordingly, as the part 4031A and the part 4032A have opposite polarities on opposing faces, an attractive force acts between the part 4031A and the part 4032A.

Further, the joining component 403B has a configuration similar to that of the joining component 403A, but is arranged in such a manner that the N-pole and the S-pole of 4031B and 4032B are opposite to the polarities of the joining component 403A.

As a result, at opposing faces, 4031B has polarities opposite to those of 4032A to be brought into contact in the optical fiber longitudinal direction. When 4032A is magnetized to the N-pole on one face (e.g., the upper side of the optical fiber alignment component 402 in FIG. 8A) and to the S-pole on the other face (e.g., the lower side of the optical fiber alignment component 402 in FIG. 8A). On the other hand, 4032B is magnetized to the S-pole on one face (e.g., the upper side of the optical fiber alignment component 402 in FIG. 8A) and to the N-pole on the other face (e.g., the lower side of the optical fiber alignment component 402 in FIG. 8A).

Accordingly, since the part 4031B and the part 4032A have opposite polarities on the opposing faces, an attractive force acts between the part 4031B and the part 4032A.

Similarly, since the part 4032B and the part 4031A have opposite polarities on the opposing faces, an attractive force acts between the part 4032B and the part 4031A.

With such a structure, similar to the effects in the first embodiment, a compact PC connection optical connector can be realized by eliminating the mechanical pressing/holding structure, and also the attractive force by the magnet can be generated largely. As a result, even if the size of the joining component is reduced, a sufficient pressing force can be generated, and it is possible to provide an optical connector and an optical connecting structure that are compact in size.

Here, in the present embodiment, each of the joining components 403A and 403B is configured to be composed of two divided parts (4031A and 4032A, 4031B and 4032B), but it suffices that each joining component is configured to include a plurality of divided parts, and these divided parts (magnets) are magnetized in the outer peripheral direction of the optical fiber alignment component 402, so as to have opposite polarities on respective opposing faces. Further, it suffices that the polarities are opposite on the opposing faces between the joining components (403A and 403B).

Further, in the present embodiment, the respectively divided plurality of parts may be magnetized in the optical fiber longitudinal direction. It suffices that they have opposite polarities on their opposing faces. Further, it suffices that the joining components (403A and 403B) have opposite polarities on the opposing faces therebetween.

That is, it suffices that the joining component 403 being a magnetic structure has portions with a plurality of magnets in the outer peripheral direction of the optical fiber alignment component 402 and these portions have opposite polarities on the opposing faces therebetween. Further, it suffices that at least a pair of joining components (403A and 403B) have opposite polarities at the opposing faces therebetween.

It is not required that both of the joining components 403A and 403B serving as a pair of magnetic structures be constituted by permanent magnets. When one joining component is a magnet, a soft magnetic material such as metal may be used for the other joining component. Further, it is acceptable that 4031A and 4031B are magnets and 4032A and 4032B are soft magnetic materials such as metal, or that 4031A and 4031B are soft magnetic materials such as metal and 4032A and 4032B are magnets. As described above, in a pair of joining components, it suffices that a portion constituted by a soft magnetic material such as metal neighbors a portion constituted by a magnet. In other words, it suffices that a face of a portion that confronts with a portion constituted by a soft magnetic material such as metal is constituted by a magnet. For example, SUS430, iron, nickel, cobalt, or a material having magnetism of stainless (SUS), which is an iron-based alloy, is usable as the soft magnetic material such as metal, and as a material unexpensive and excellent in machining.

Fifth Embodiment

Figure 9A:
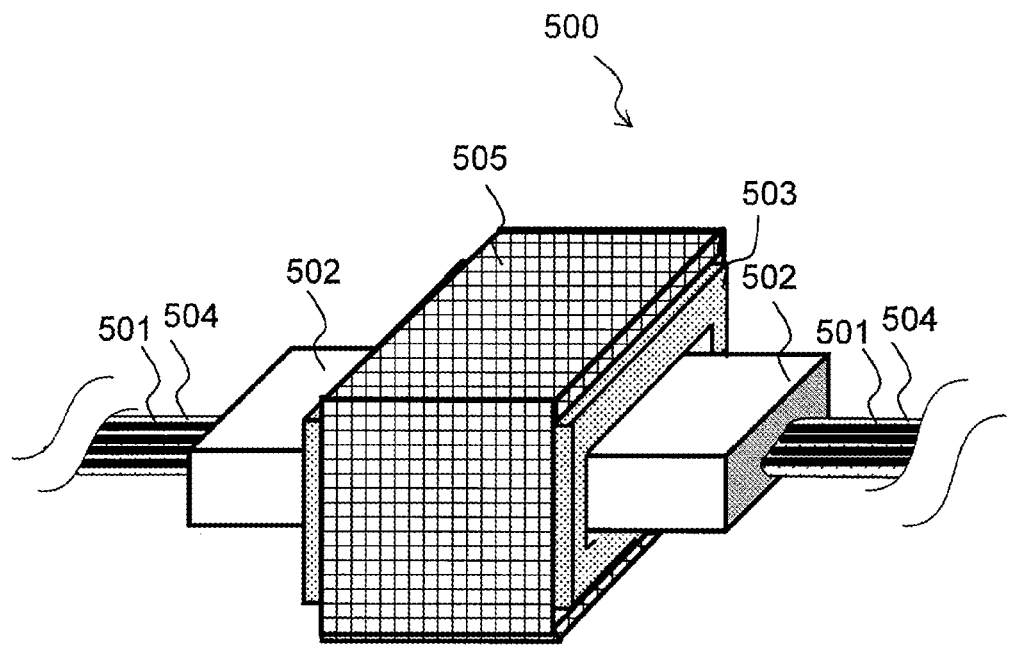
FIG. 9A is a perspective view illustrating an optical connecting structure according to a fifth embodiment of the present invention.
Figure 9B:
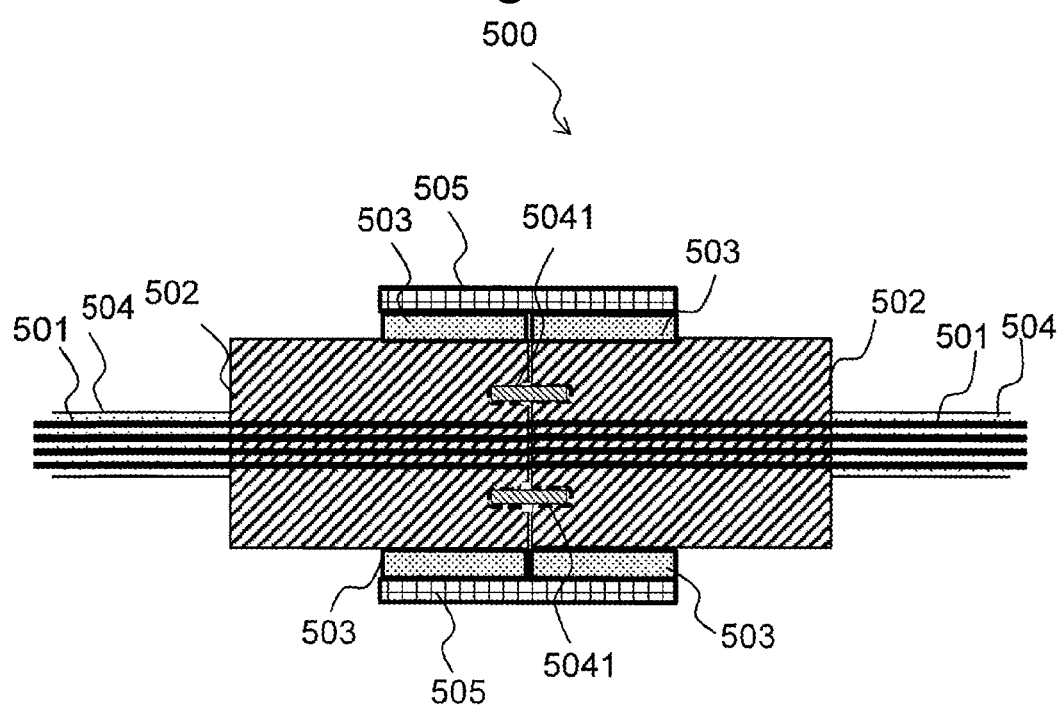
FIG. 9B is a top sectional view illustrating the optical connecting structure according to the fifth embodiment of the present invention.

FIG. 9A illustrates a perspective view of an optical connecting structure 500 with optical connecting components mutually connected according to a fifth embodiment of the present invention, and FIG. 9B illustrates a top sectional view thereof. The optical connector configuration in the optical connecting structure 500 according to the present embodiment may be any combination obtainable from the first to fourth embodiments. Here, a plate 505 surrounding the circumference of respective joining components 503 being a pair of connected magnetic structures is provided. The plate 505 is made of metal or other soft magnetic material and is, for example, a plate of SUS430.

In the present embodiment, the plate 505 is arranged so as to surround the outer peripheral direction of the joining components 503. Here, the outer peripheral direction of the joining components 503 is a direction along the outer periphery of the joining components 503 in a plane perpendicular to the optical fiber longitudinal direction.

With such a structure, not only a compact optical connecting structure can be realized as in the first to fourth embodiments, but also magnetic force lines can be confined with the intervening plate 505. Therefore, the attractive force by the magnet can be further enhanced, and it is possible to provide an optical connector and an optical connecting structure that are compact in size.

Further, using the plate 505 made of a soft magnetic material can reduce the influence of the magnetic force to the outside, and brings auxiliary effects of preventing the magnets from adhering to surrounding members and eliminating adverse effects of the magnetic field. Here, the shape of the plate 505 is arbitrary and, if necessary, may be larger or smaller than the outer periphery of the two joining components. Further, one large plate may be provided according to the multiple-string multicore connector so as to be in contact with the circumference of the multiple-string multicore connector.

Sixth Embodiment

Figure 10A:
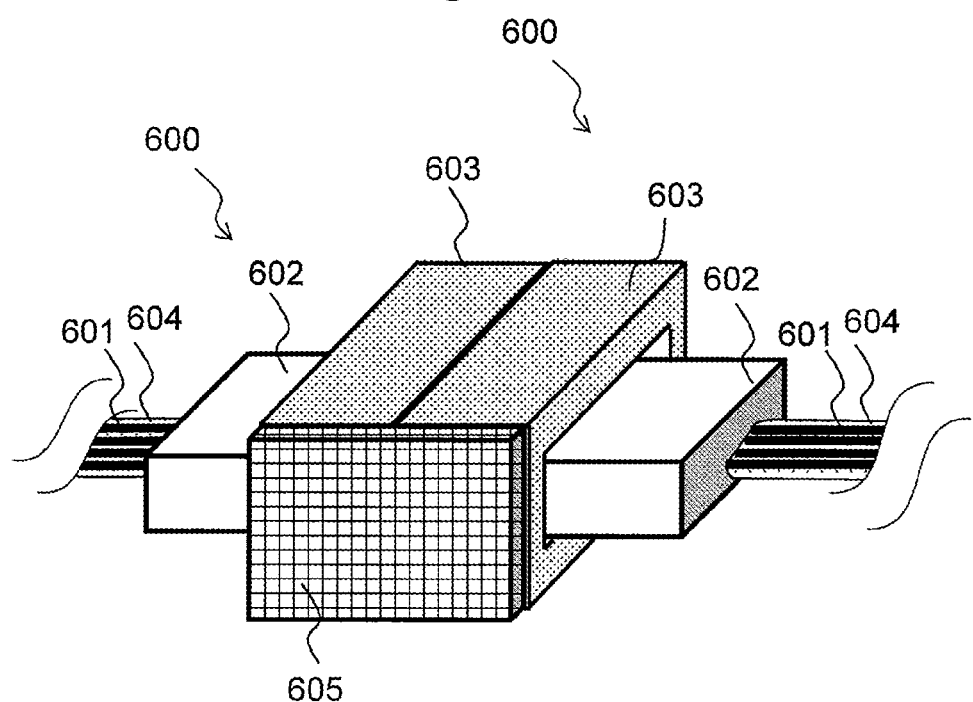
FIG. 10A is a perspective view illustrating an optical connecting structure according to a sixth embodiment of the present invention.
Figure 10B:
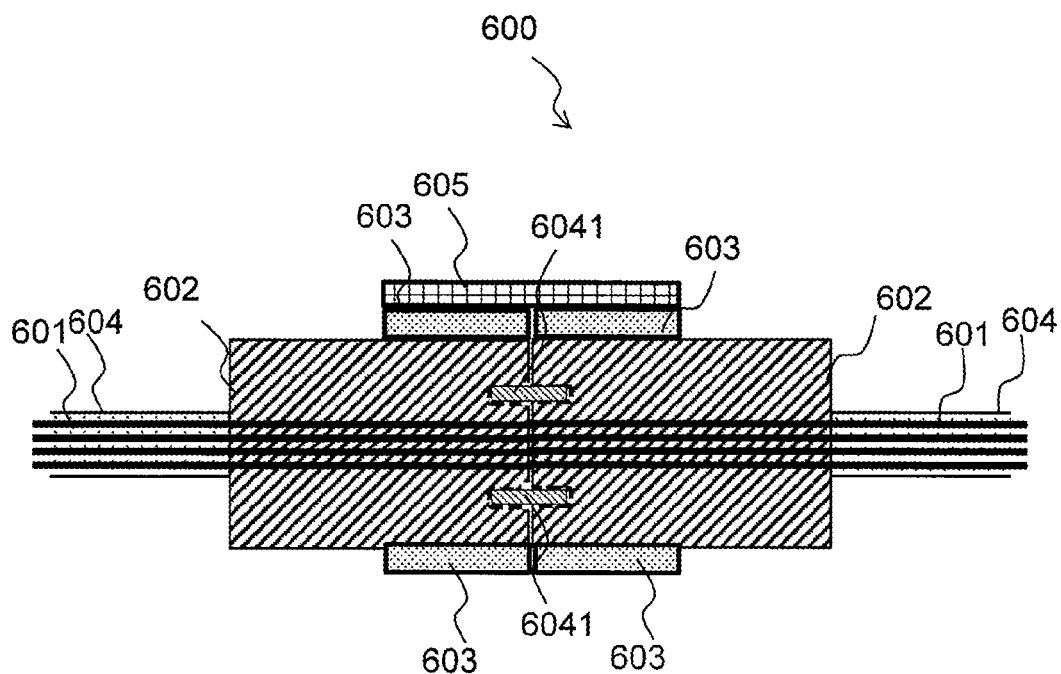
FIG. 10B is a top sectional view illustrating the optical connecting structure according to the sixth embodiment of the present invention.

FIG. 10A illustrates a perspective view of an optical connecting structure 600 with optical connecting components mutually connected according to a sixth embodiment of the present invention, and FIG. 10B illustrates a top sectional view thereof. The optical connector configuration in the optical connecting structure 600 according to the present embodiment may be any combination obtainable from the first to fourth embodiments, but it is desired that both of joining components 603 being magnetic structures are permanent magnets. Here, a plate 605 being in contact with one face of each of a pair of connected joining components 603 is provided. The plate 605 is made of metal or other soft magnetic material and is, for example, a plate of SUS430.

With such a structure, not only a compact optical connecting structure can be realized as in the first to fourth embodiments, but also magnetic force lines can be confined with the intervening plate 605. Therefore, similar to the fifth embodiment, the attractive force by the magnet can be further enhanced, and it is possible to provide an optical connector and an optical connecting structure that are compact in size.

Further, using the plate 605 made of a soft magnetic material can reduce the influence of the magnetic force to the outside, and brings auxiliary effects of preventing the magnets from adhering to surrounding members and eliminating adverse effects of the magnetic field.

Figure 11:
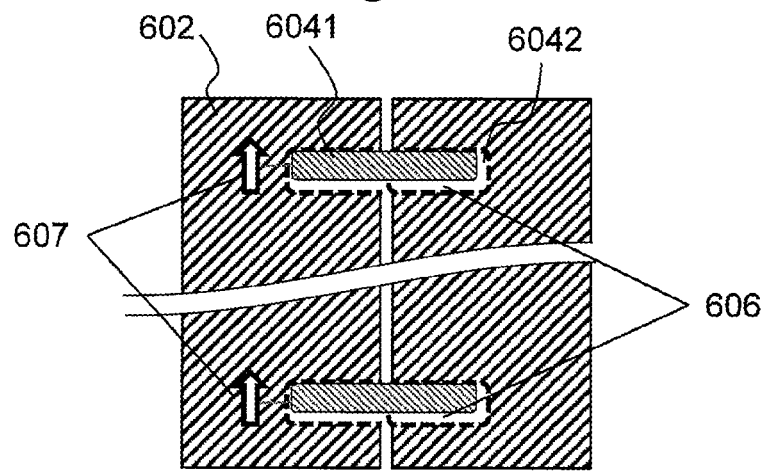
FIG. 11 is a top sectional view illustrating a fitting portion of the optical connecting structure according to the sixth embodiment of the present invention.

Further, in this structure, the joining components (permanent magnets) 603 being magnetic structures are pulled to one plate 605. As a result, the positioning accuracy at the time of fitting the fitting components can be further enhanced. Specifically, as illustrated in FIG. 11, when fitting with guide pins 6041, it is necessary to provide slight clearances 606 between the guide pins 6041 and guide pin holes 6042, and these clearances 606 may deteriorate the positioning accuracy.

However, according to the present structure, the fitting portion is moved in one direction of the clearance 606 by the magnetic attractive force (indicated by arrows 607 in the drawing) that pulls optical fiber alignment components 602. Accordingly, if the relative positions between respective fibers and the guide pins 6041 are adjusted in advance so as to be optimum positions in biased directions, a further effect of enhancing the positioning accuracy of the fibers can be exerted.

Modified Example of Sixth Embodiment

Hereinafter, a modified example of the sixth embodiment will be described with reference to FIGS. 12 and 13.

Figure 12:
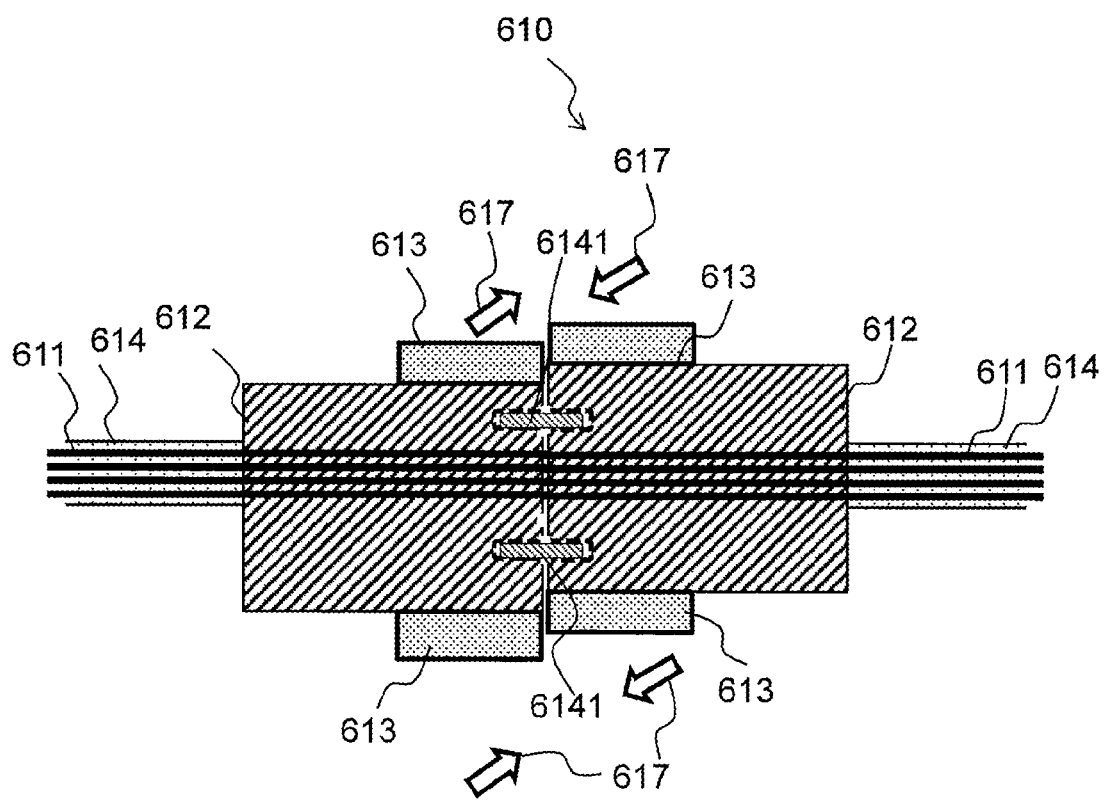
FIG. 12 is a top sectional view illustrating an optical connecting structure according to a modified example of the sixth embodiment of the present invention.
Figure 13:
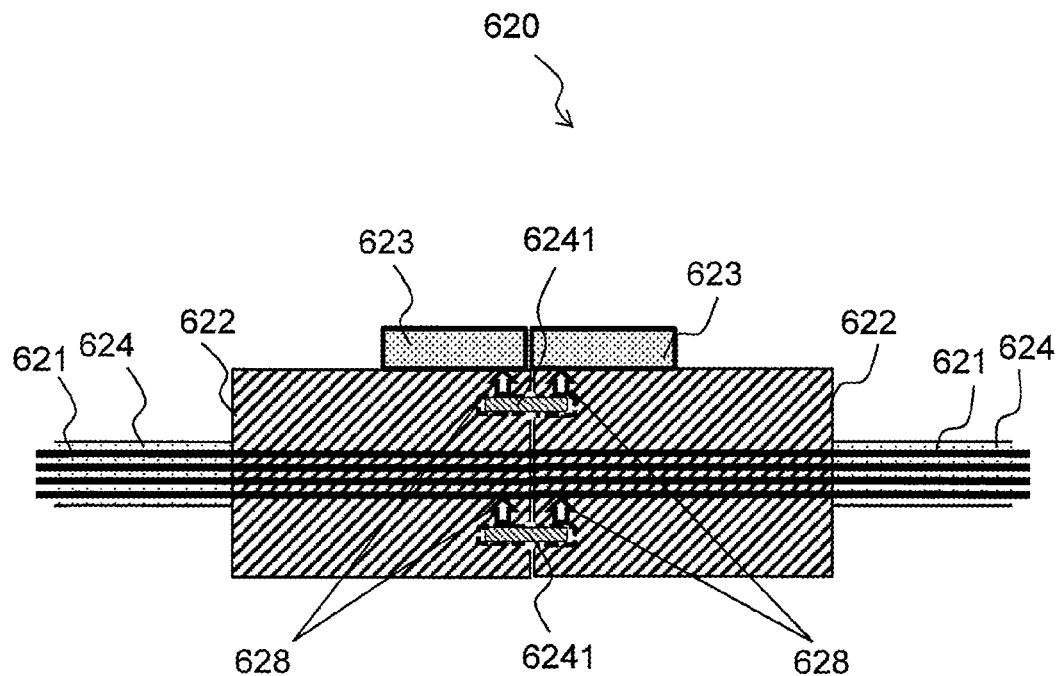
FIG. 13 is a top sectional view illustrating an optical connecting structure according to a modified example of the sixth embodiment of the present invention.

FIGS. 12 and 13 illustrate top sectional views of an optical connecting structure with optical connecting components mutually connected according to the modified example of the sixth embodiment of the present invention. The effects of the sixth embodiment can also be realized by the structure illustrated in FIG. 12. That is, when the longitudinal direction of optical fibers 611 is taken as the center, by making the arrangement of joining components 613 being two opposed magnetic structures asymmetric with respect to a direction orthogonal to the optical fiber longitudinal direction, the vector of the attractive force by the magnet (indicated by arrows 617 in the drawing) is slightly added to one direction orthogonal to the optical fiber longitudinal direction in addition to the optical fiber longitudinal direction. Therefore, similarly, the fitting portion is moved in one direction of the clearance by the magnetic attractive force that pulls optical fiber alignment components 612. Thus, an additional effect of enhancing the positioning accuracy of the fibers can be exerted.

Further, as illustrated in FIG. 13, even when joining components 623 are arranged along any one face in the circumference of optical fiber alignment component 622, and guide pins 6241 are made of metallic magnetic material (soft magnetic material), the attractive force (indicated by arrows 628 in the drawings) acts on the guide pins 6241 and effects similar to the above can be exerted.

Seventh Embodiment

Figure 14A:
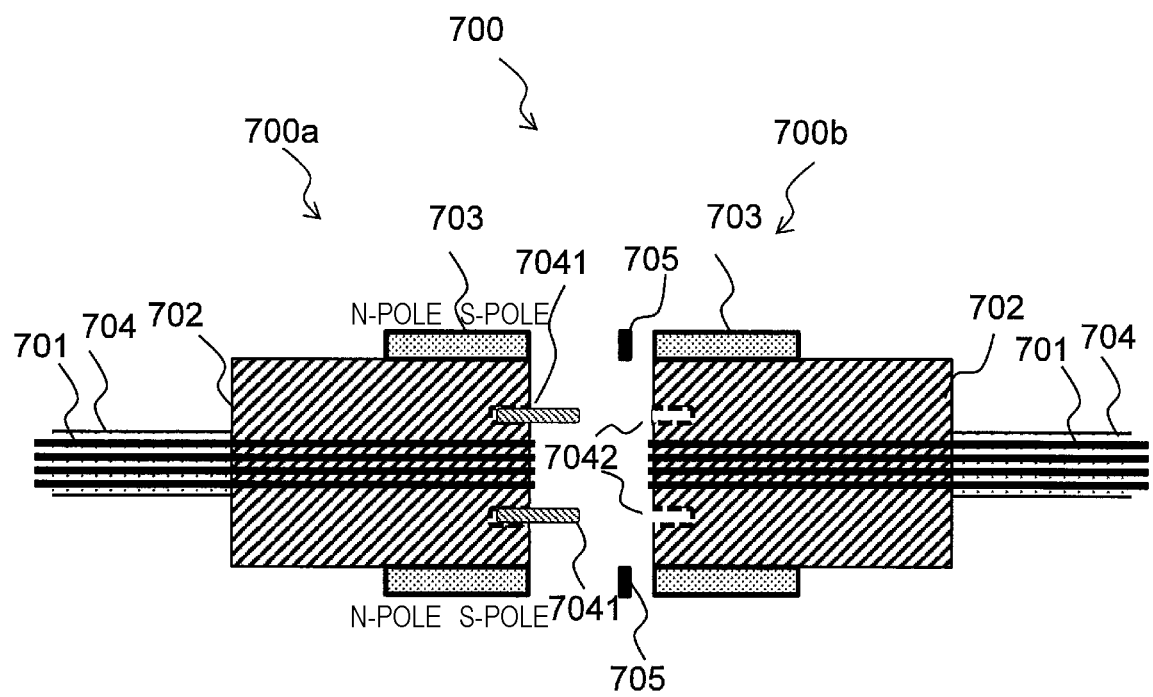
FIG. 14A is a top sectional view illustrating an optical connector, before connection, according to a seventh embodiment of the present invention.
Figure 14B:
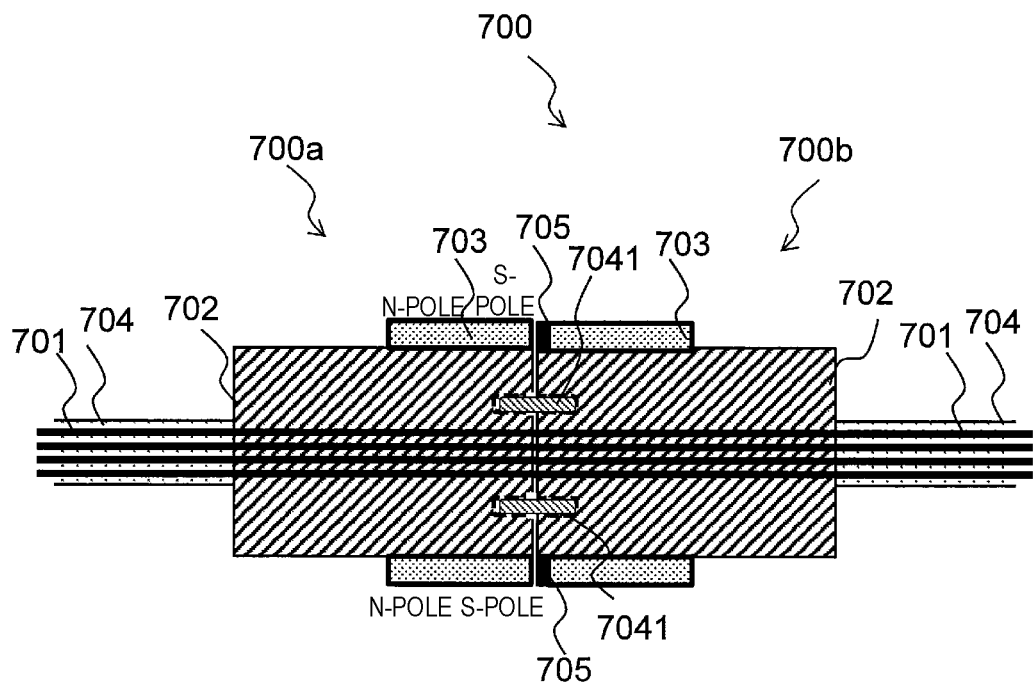
FIG. 14B is a top sectional view illustrating the optical connector, after connection, according to the seventh embodiment of the present invention.

FIGS. 14A and 14B illustrate top sectional views of an optical connector (optical connecting structure) 700 with optical connecting components mutually connected, before and after connection, according to a seventh embodiment of the present invention. Illustrated in the drawings are before-connection aspect 71 and after-connection aspect 72 in the optical connector (optical connecting structure) 700 according to the present embodiment.

The configuration of the optical connector (optical connecting structure) 700 according to the present embodiment is substantially similar to that of the second embodiment, and is configured by connecting two optical connecting components 700a and 700b, but a metal foil 705 made of a magnetic material is inserted between opposing joining components 703. For example, a metal foil of SUS430 having an opening for the optical fiber alignment component is inserted. With such a structure, similar to the second embodiment, a compact optical connector can be realized. In addition, since a cavity between the joining components 703 being magnetic structures is filled with the magnetic material, the substantial cavity decreases. That is, even when the cavity is large, it is possible to suppress the reduction in attractive force, and a compact multicore optical connector with enhanced magnetic force effect can be realized.

Eighth Embodiment

Figure 15A:
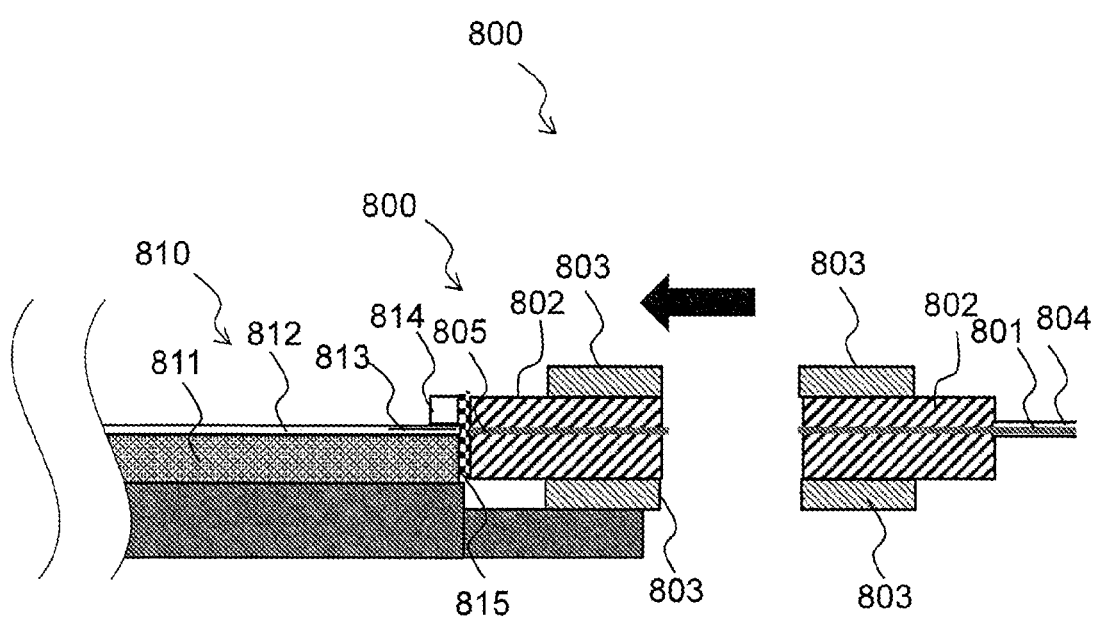
FIG. 15A is a side sectional view illustrating an optical connecting structure, before connection, according to an eighth embodiment of the present invention.
Figure 15B:
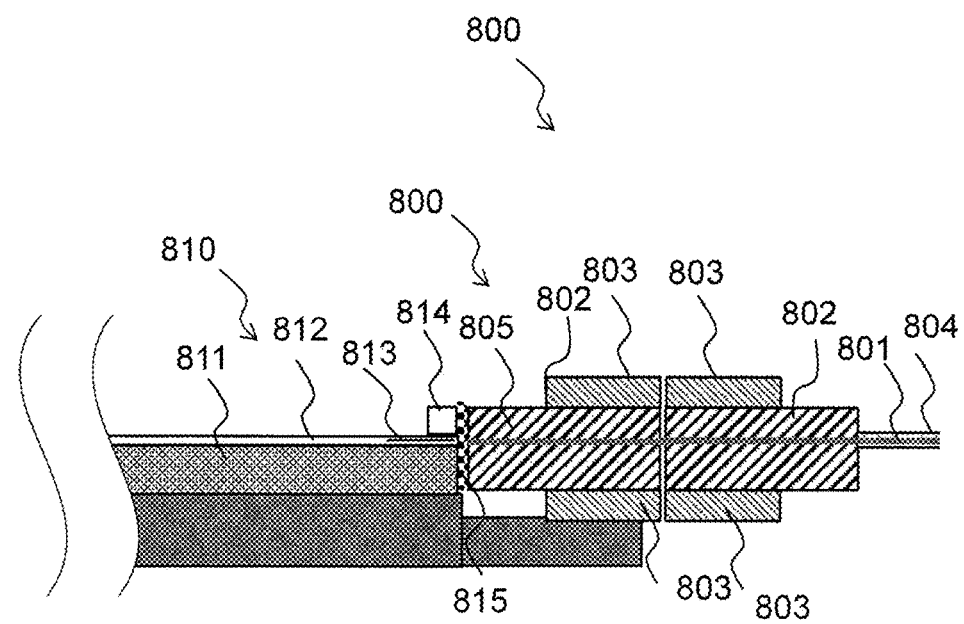
FIG. 15B is a side sectional view illustrating the optical connecting structure, after connection, according to the eighth embodiment of the present invention.

FIGS. 15A and 15B illustrate side sectional views of an optical connecting structure 800, before and after connection, according to an eighth embodiment of the present invention.

The optical connector configuration in the optical connecting structure 800 according to the present embodiment is substantially the same as that of the second embodiment, but a fiber extraction side of one optical connector is connected and integrated via an optical waveguide device 810 and an adhesive 815 so that an optical waveguide core 813 of the optical waveguide device 810 and the core of a short fiber 805 are photocoupled with low loss. In the present embodiment, optical fibers and the optical waveguide device are used as optical waveguide components.

The optical waveguide device 810 includes an optical waveguide layer 812 on an optical waveguide substrate 811 and the optical waveguide core 813 in the optical waveguide layer 812. Further, the optical waveguide device 810 includes a reinforcing plate 814 at a portion connected to the optical connector.

Here, the optical waveguide device 810 is a planar light wave circuit having a light propagation mechanism, a light emitting element, a light receiving element, a light modulation element, an optical function element (e.g., a splitter, a wavelength multiplexer/demultiplexer, an optical switch, a polarization control element, or an optical filter), or the like. Materials for the optical waveguide device include, for example, semiconductors such as silicon and germanium, group III-V semiconductors represented by indium phosphide (InP), gallium arsenide (GaAs), indium gallium arsenide (InGaAs), and the like, ferroelectrics such as lithium niobate, polymer, silica glass, and the like.

With such a structure, similar to the first to seventh embodiments, a compact optical connecting structure can be realized. In addition, by making the short fiber intervene, a compact multicore optical connector connection for the optical waveguide device and optical fibers can be artificially provided. Regarding the material and structure of the joining components, any method described in the first to the seventh embodiments may be used.

Modified Example of Eighth Embodiment

Figure 16A:
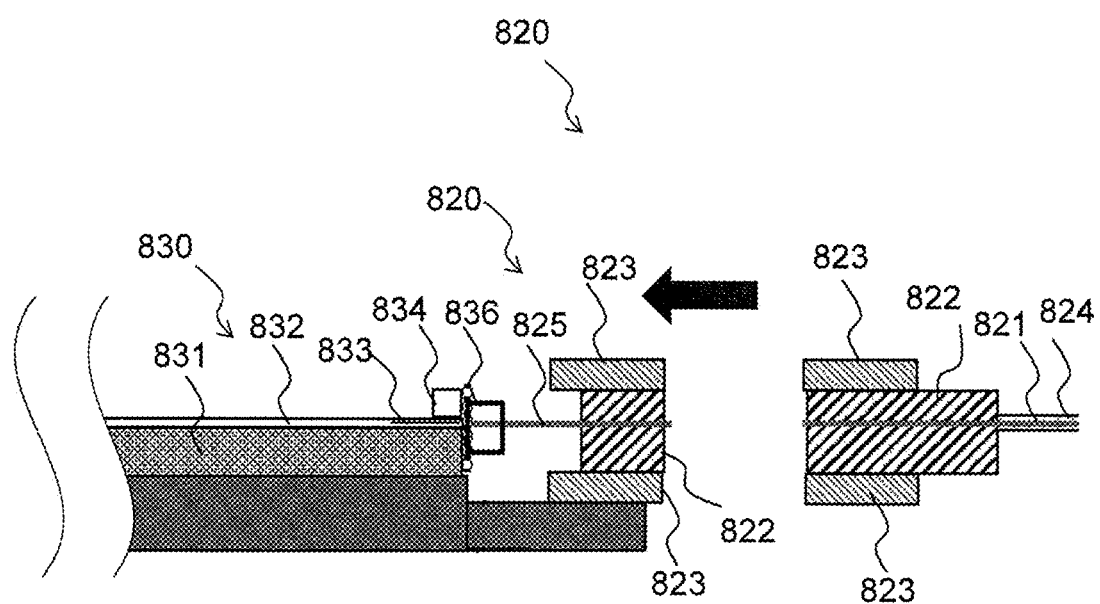
FIG. 16A is a side sectional view illustrating an optical connecting structure, before connection, according to a modified example of the eighth embodiment of the present invention.
Figure 16B:
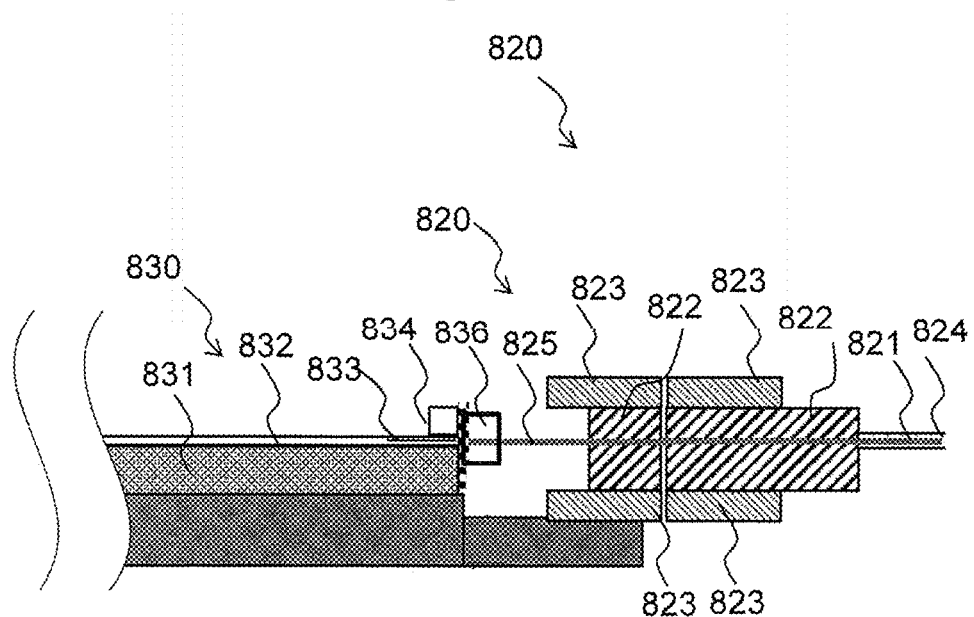
FIG. 16B is a side sectional view illustrating the optical connecting structure, after connection, according to the modified example of the eighth embodiment of the present invention.

FIGS. 16A and 16B illustrate side sectional views of an optical connecting structure 820, before and after connection, according to a modified example of the eighth embodiment of the present invention.

In the optical connecting structure 800 illustrated in FIGS. 15A and 15B, an optical fiber alignment component 802 is directly bonded and fixed to the end face of the optical waveguide device 810. However, like the optical connecting structure 820 illustrated in FIGS. 16A and 16B, a short fiber 825 may be connected to an optical waveguide layer 832 via a connection block 836 of a fiber array or the like made of glass, and an optical fiber alignment component 822 and a joining component 823 may be attached and connected at a location corresponding to constant length transmission by the short fiber 825.

Ninth Embodiment

Figure 17A:
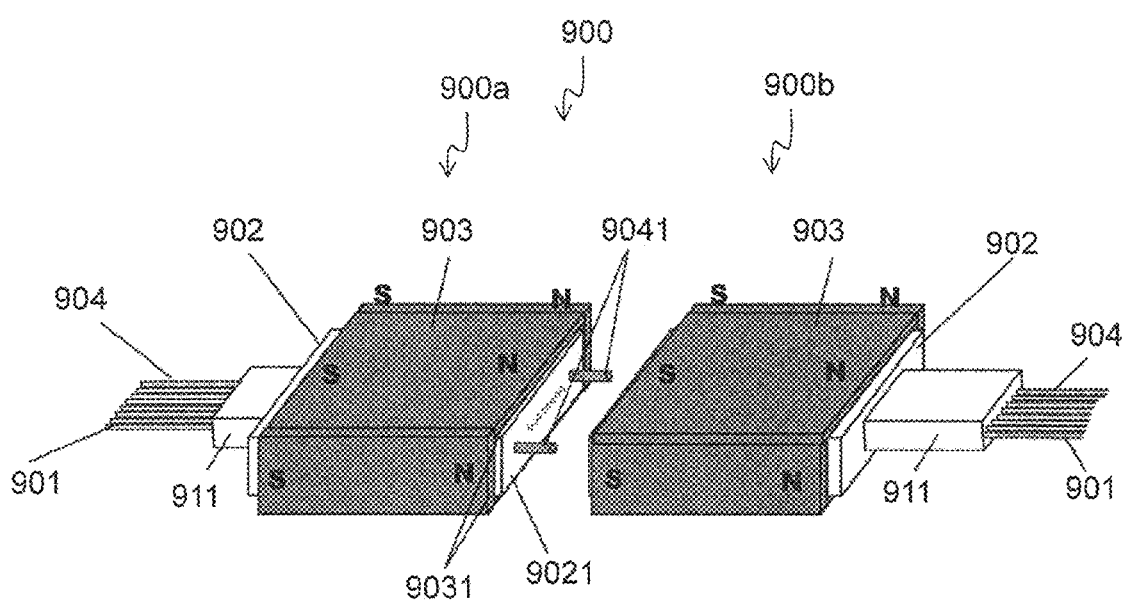
FIG. 17A is a perspective view illustrating an optical connecting structure, before connection, according to a ninth embodiment of the present invention.
Figure 17B:
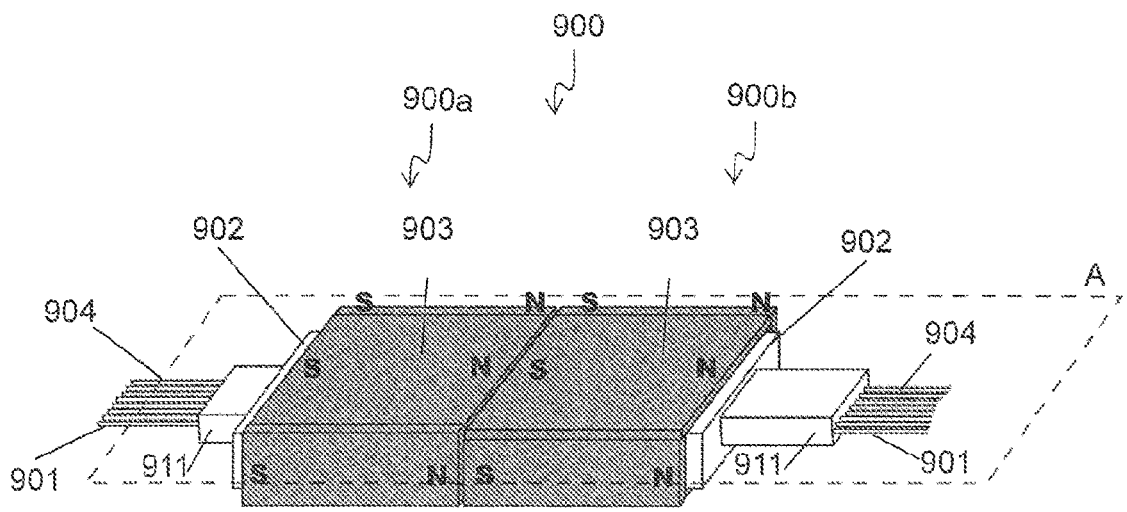
FIG. 17B is a perspective view illustrating the optical connecting structure, after connection, according to the ninth embodiment of the present invention.
Figure 18A:
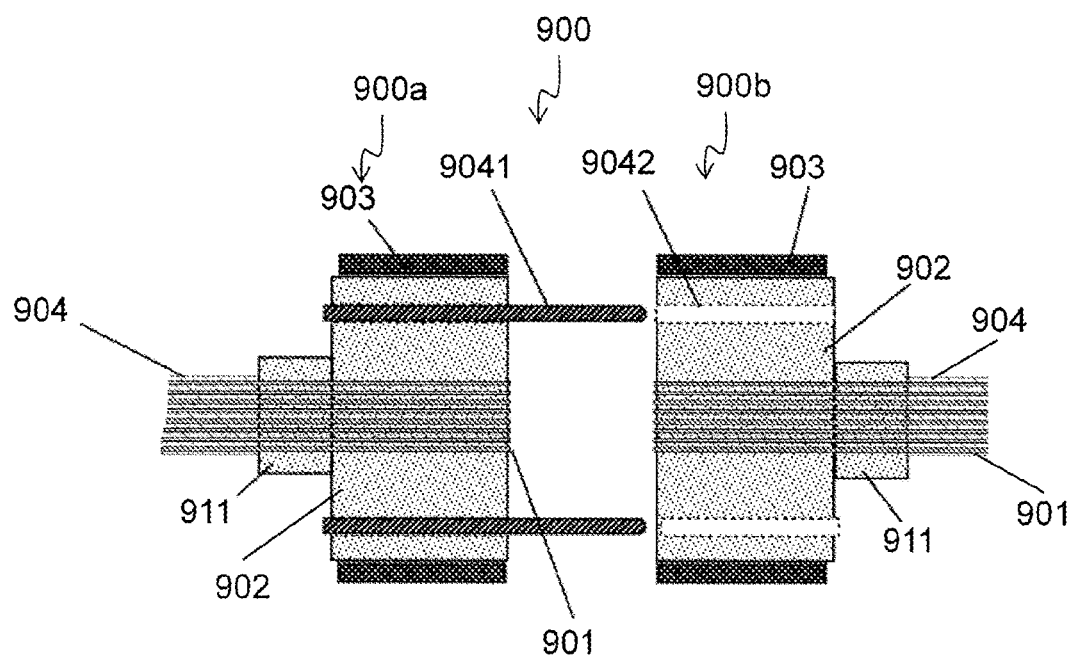
FIG. 18A is a top sectional view illustrating the optical connecting structure, before connection, according to the ninth embodiment of the present invention.
Figure 18B:
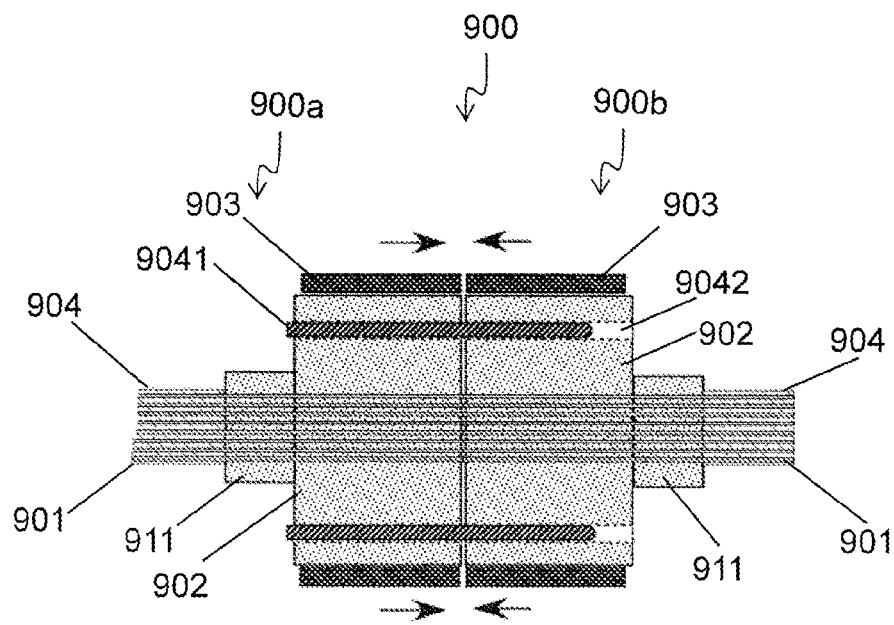
FIG. 18B is a top sectional view illustrating the optical connecting structure, after connection, according to the ninth embodiment of the present invention.

FIGS. 17A and 17B illustrate perspective views of an optical connecting structure 900, before and after connection, according to a ninth embodiment of the present invention. Further, FIGS. 18A and 18B illustrate schematic sectional views of the optical connecting structure 900, before and after connection, along the plane A of FIG. 17B.

As illustrated in FIGS. 17A and 17B and FIGS. 18A and 18B, the optical connecting structure 900 is configured by connecting an optical connecting component 900a and an optical connecting component 900b. Each of the optical connecting components 900a and 900b includes a plurality of optical fibers 901, an alignment component 902 for positioning and fixing them in a predetermined arrangement, and a magnetic structure 903 around it. A positioning structure is provided on a connecting end face 9021 of the alignment component 902. Here, the optical fiber 901 (optical waveguide component) is, for example, a silica-based single-mode fiber having a cladding diameter of 125 µm and a core diameter of approximately 10 µm.

The alignment component 902 is a ferrule having a plurality of microholes whose inner diameter (e.g., approximately 0.5 to 1.5 µm) is slightly larger than the outer diameter of the optical fiber 901, and is a well-known MT ferrule, for example.

Further, the positioning structure includes, for example, two guide pins (male side) 9041 and guide pin holes (female side) 9042 at both ends, as used in the MT ferrule. As illustrated in the drawings, the alignment components 902 are arranged so as to face each other, and by inserting and coupling the positioning structures provided on the connecting end faces 9021 of the alignment components 902, the positioning of the optical fibers 901 can be realized and the plurality of optical fibers 901 are collectively optically connected.

Here, the optical fibers 901 from which the coating has been removed are accommodated in the microholes provided in the alignment component 902, and the optical fibers 901 and the alignment component 902 are fixed by an adhesive. In the drawings, the adhesive is not illustrated.

Further, the connecting end faces of the optical fibers 901 and the connecting end face 9021 of the alignment component 902 are flat-polished so as to be substantially the same plane. Actually, the connecting end faces of the optical fibers 901 are polished so as to have a slightly spherical surface. For example, the optical fibers 901 are arranged at the pitch of approximately 250 µm. The number of the optical fibers 901 is 8-core in the drawing. It is needless to say that the above-described pitch and the core number are arbitrary and any core number of such as 2-core, 4-core, 8-core, 12-core, 16-core, or 24-core can be applied.

Although the circumference of the optical fibers 901 is coated, a known resin (e.g., acrylic, epoxy, silicone, or polyimide) coating is applied around a portion other than the inside of the microholes of the alignment component 902, and further they are assembled as a plurality of fiber tapes 904.

As illustrated in FIGS. 17A and 17B, the fiber tapes 904 are further protected by a boot 911. The boot 911 is a known one used for assembling the MT connector or the like, and the boot 911 may be omitted if necessary.

Further, although not illustrated in FIGS. 18A and 18B, if necessary, in order to prevent the falling-off of the guide pins 9041 being the positioning structure, one of the alignment components 902 and the guide pins 9041 may be fixed by any means such as another component or a joining material.

Further, although omitted in the drawings, a tapered shape that facilitates the insertion may be provided, if necessary, in the vicinity of the guide pin holes 9042, the microholes, and tips of the guide pins 9041.

Further, in FIGS. 17A and 17B and FIGS. 18A and 18B, the magnetic structure 903 capable of accommodating the alignment component 902 is arranged so as to surround the circumference of the alignment component 902 and is integrated with the alignment component 902. Here, any of the magnetic structures 903 is made of a hard magnetic material (so-called magnet), and any known magnets may be used, as the material of the magnets, depending on a magnetic force to be generated. As representative magnets, neodymium magnets can be used. In addition, any known magnets such as ferrite magnets, alnico magnets, samarium cobalt magnets, KS steels, MK steels, neodymium iron boron magnets, and the like can be used. Further, any magnets whose magnetic characteristics are adjusted by slightly changing these compositions can be used in the same manner.

The magnetic structures 903 made of the magnet (referred to as the joining component in the first to eighth embodiments) are such that their N-poles and S-poles are arranged so that the magnetic attractive force acts between connecting end faces 9031 of the opposing magnetic structures 903 in FIGS. 18A and 18B. In FIGS. 17A and 17B, they are magnetized so as to form a pair of N-pole and S-pole along the longitudinal direction of the fiber. As a result, an attractive force acts so as to attract the connecting end faces 9021 of the alignment components 902 and the connecting end faces 9031 of the magnetic structures 903. Even if both of the paired opposing magnetic structures 903 are not made of the hard magnetic material (magnet), when only one is made of a magnet and the other magnetic structure 903 is made of a soft magnetic material, similar application is feasible because a magnetic force acts between the magnetic structures 903.

As the soft magnetic material, so-called metals attracted to magnets, and the like are known. For example, iron, nickel, cobalt, or a material having magnetism of stainless (SUS) that is an iron-based alloy (e.g., SUS430) can be used. It is needless to say that, when both of the opposing magnetic structures 903 are magnets, the magnetic force to be generated is larger and the attractive force is larger.

On the other hand, although the attractive force is inferior to the above, the other may be made of a soft magnetic material from the viewpoint of workability, prevention of adhesion to other components, prevention of adverse effects of the magnetic force, or the like. These can be appropriately selected depending on the required attractive force, the size of the magnetic structure 903, required conditions, and the like.

Figure 19:
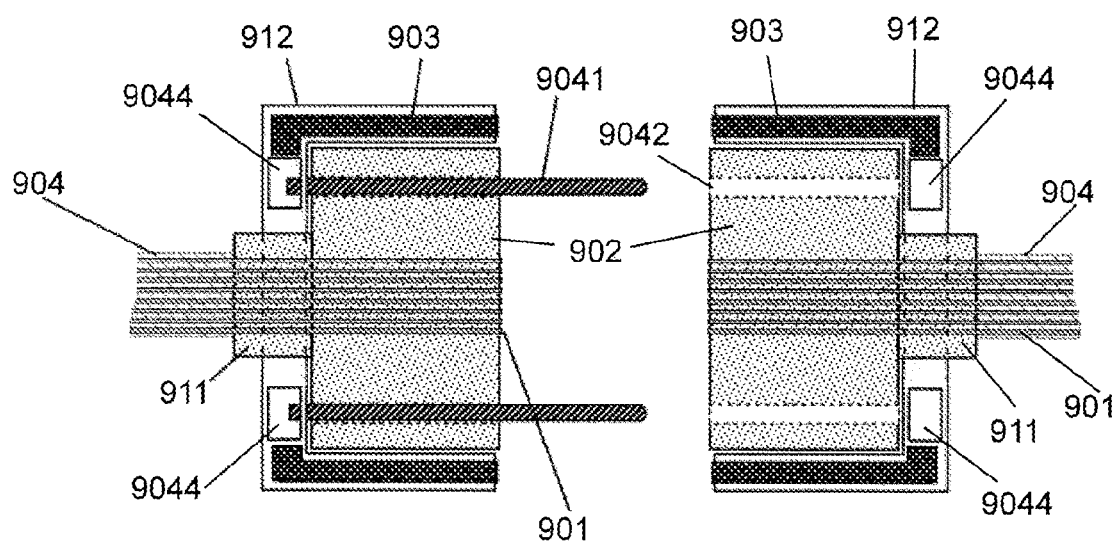
FIG. 19 is a top sectional view illustrating an exemplary optical connecting structure, before connection, according to the ninth embodiment of the present invention.

Further, the alignment component 902 and the magnetic structure 903 are integrated, and any joining method such as adhesion, mechanical fitting, or metal joining (soldering or the like) may be used. Further, instead of the above joining, the alignment component 902 and the magnetic structure 903 may be integrated via another retention component 912, as illustrated in a sectional view of FIG. 19. The retention component 912 may be provided with a structure 9044 that prevents the guide pin 9041 from falling. Further, a fastening structure for fitting the retention components 912 at the time of connection may be provided appropriately.

In FIGS. 18A and 18B, the optical fiber 901 is polished so as to slightly protrude from the alignment component 902 with respect to the optical fiber longitudinal direction of the connecting end face. Further, the connecting end face 9031 of the magnetic structure 903 and the connecting end face 9021 of the alignment component 902 are configured to be on the same plane, or the connecting end face 9031 of the magnetic structure 903 is positioned so as to retract from the connecting end face 9021 of the alignment component 902 in the optical fiber longitudinal direction. There is a clearance between the connecting end faces 9031 of the opposing magnetic structures 903.

In general, the smaller the gap, the larger the magnetic force acting between magnets. Therefore, it is ideal that the face between the magnetic structures and the face between the alignment components are on the same plane so that a larger magnetic force can be generated.

On the other hand, if the magnetic structure protrudes even slightly toward the connection face with respect to the optical fiber longitudinal direction, there will be a risk that the end faces of the alignment components or the end faces of the optical fibers cannot be brought into contact with each other. However, the above-mentioned positional relationship can reduce the gap between the magnets being the magnetic structures as small as possible without hindering the contact of the end faces of the alignment components 902 and the end faces of the optical fibers, and accordingly the magnetic force can be sufficiently generated.

With such a structure, the following effects are exerted.

That is, in the conventional multicore optical connector, it is required to apply a pressing force to the connecting end face so as to reduce the gap between the opposing optical fibers (or to make the gap zero), and a coiled spring, a clip, or the like is used as a member applying the pressing force.

Further, for example, in the MPO connector or the like, it is necessary to provide spring holding components and a plurality of housing components for integrating them. In addition, in order to maintain the connection state where the pressing force is applied, it is necessary to generate the pressing force by providing the mechanical fastening structure for the housing components and maintaining the mechanically fastened structure with interposing adapter components or the like to be fitted with the housing components.

With the structure of embodiments of the present invention, without using the previously described mechanical spring component, the pressing force can be added between the connecting end faces of the optical fibers by the magnetic attractive force.

Further, since the effect of holding the connection state is exerted by the magnetic attractive force, a stable optical connection can be maintained without requiring housing components and adapter components equipped with the mechanical fastening structure as in the past to counteract the reaction force of the spring component.

That is, even when the same pressing force is generated by using the structure of embodiments of the present invention, the number of members can be greatly reduced, and a multicore optical connector connection structure that is greatly downsized compared with the conventional one can be realized.

For example, a known MT ferrule generally has a width of 6.4 mm, a length of 8 mm, and a thickness of 2.5 mm, but the external shape of the MPO connector requires a width of 12 mm, a thickness of 7.5 mm, and a length of 25 mm when a surrounding housing and a fiber protection portion are taken into consideration. In addition, it is necessary to provide the adapter components for coupling.

The elastic force of the coiled spring generated at this time is, for example, 10N. On the other hand, by adopting a structure using a general neodymium magnet around both MT ferrules, for example, if it is arranged with a thickness of 1 mm and a length of 20 mm, the external dimension including the magnetic structure 903 can be greatly downsized to a width of 8.4 mm, a length of 8 mm, and a thickness of 4.5 mm. As a result, a magnetic force equal to or greater than 10N can be generated, and the adapter components can be eliminated, leading to great downsizing.

The above-described calculation is an example. It is possible to further increase the magnetic force or realize downsizing with the same magnetic force, by adding any method such as forming the magnets by stronger materials, forming the magnets by a one-dimensional or two-dimensional multi-pole magnet array as described in the embodiment described below, or adding other magnetic structure 903 such as a metal plate, which functions as a so-called yoke and generates a larger magnetic force. Further, in recent years, thin MT ferrules (e.g., 1.25 mm in thickness and 4 mm in length) have been developed, and further downsizing is feasible by combining with the same thin MT ferrule.

Further, in the structures illustrated in FIGS. 17A and 17B and FIGS. 18A and 18B, although the magnetic structure 903 is arranged so as to surround the circumference of the alignment component 902, any other structure capable of generating a magnetic force is employable.

Figure 20A:
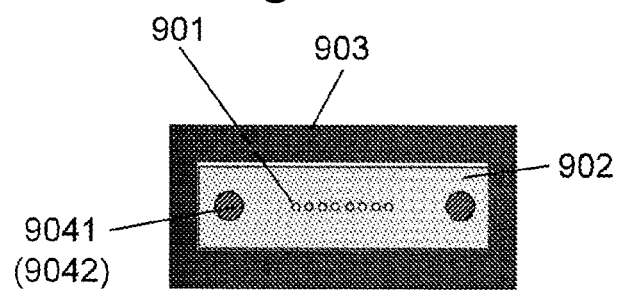
FIG. 20A is a connecting end face sectional view illustrating an exemplary optical connecting structure according to the ninth embodiment of the present invention.
Figure 20B:
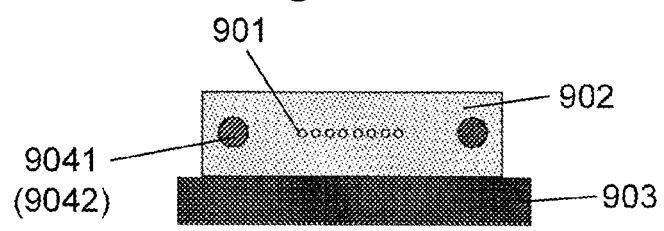
FIG. 20B is a connecting end face sectional view illustrating an exemplary optical connecting structure according to the ninth embodiment of the present invention.

FIGS. 20A to 20K illustrate arrangement variations of the positional relationship between the magnetic structure 903 and alignment component 902 when viewed from the connecting end face side of FIGS. 17A and 17B. A structure illustrated in FIG. 20A is similar to that of FIGS. 17A and 17B in that the entire outer periphery is surrounded by the magnetic structure 903. As illustrated in FIG. 20B, of course, the magnetic structure 903 may be configured to be present only on one face of the outer periphery.

Figure 20C:
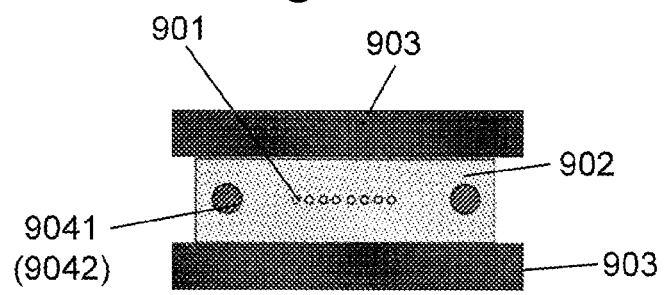
FIG. 20C is a connecting end face sectional view illustrating an exemplary optical connecting structure according to the ninth embodiment of the present invention.
Figure 20D:
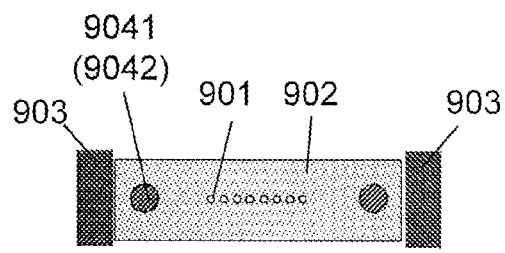
FIG. 20D is a connecting end face sectional view illustrating an exemplary optical connecting structure according to the ninth embodiment of the present invention.
Figure 20E:
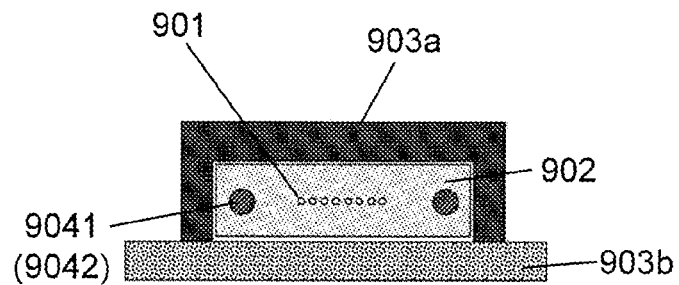
FIG. 20E is a connecting end face sectional view illustrating an exemplary optical connecting structure according to the ninth embodiment of the present invention.

Further, as illustrated in FIGS. 20C and 20D, it may be arranged on upper and lower faces or right and left faces. Further, the magnetic structure 903 is not required to be a single material, and may be a combination of a hard magnetic material 903a and a soft magnetic material 903b. For example, as illustrated in FIG. 20E, a part of the outer periphery may be the hard magnetic material (magnet) 903a and another part may be the soft magnetic material 903b.

Figure 20F:
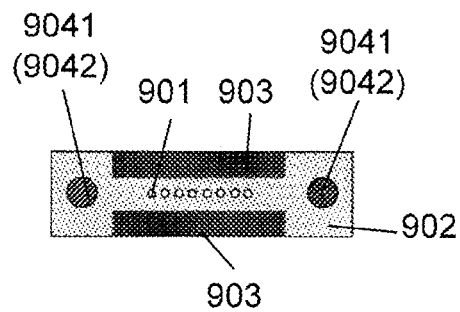
FIG. 20F is a connecting end face sectional view illustrating an exemplary optical connecting structure according to the ninth embodiment of the present invention.
Figure 20G:
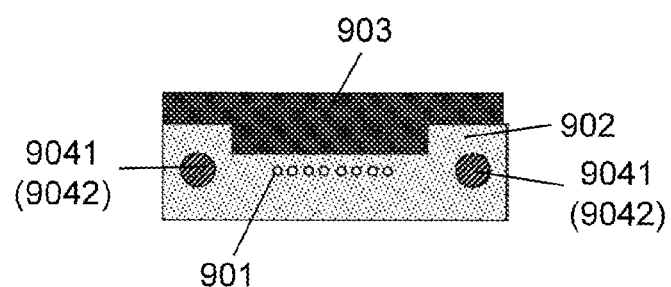
FIG. 20G is a connecting end face sectional view illustrating an exemplary optical connecting structure according to the ninth embodiment of the present invention.

Further, as illustrated in FIGS. 20F and 20G, incorporating the magnetic structure 903 or a part of the magnetic structure 903 in the alignment component 902 can further reduce the size and enhance the mountability. They may be joined mechanically or may have a structure integrated by a magnetic force. Any joining means such as adhesion or soldering may be used. Here, the structure incorporating at least a part of the magnetic structure 903 in the alignment component 902 includes a structure in which at least a part of the magnetic structure 903 is penetrated into the alignment component 902.

Figure 20H:
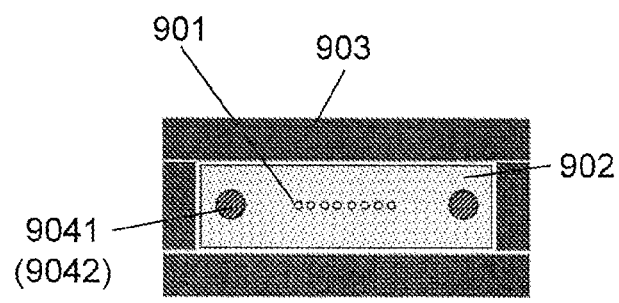
FIG. 20H is a connecting end face sectional view illustrating an exemplary optical connecting structure according to the ninth embodiment of the present invention.
Figure 20I:
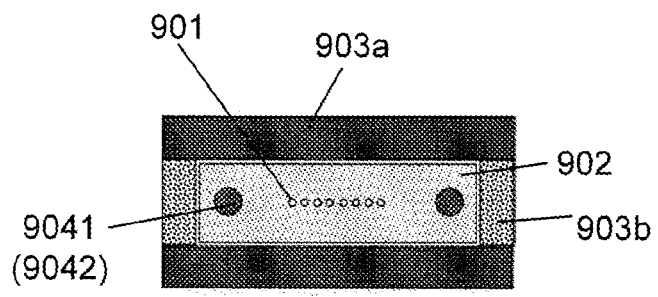
FIG. 20I is a connecting end face sectional view illustrating an exemplary optical connecting structure according to the ninth embodiment of the present invention.
Figure 20J:
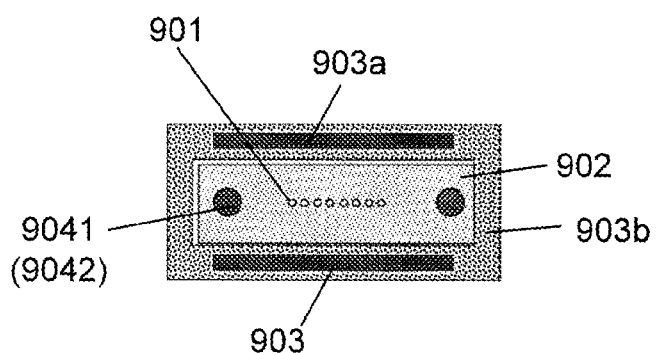
FIG. 20J is a connecting end face sectional view illustrating an exemplary optical connecting structure according to the ninth embodiment of the present invention.
Figure 20K:
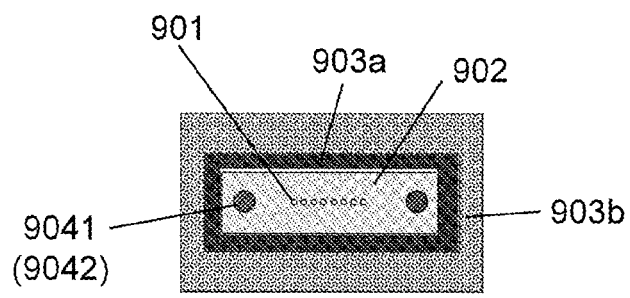
FIG. 20K is a connecting end face sectional view illustrating an exemplary optical connecting structure according to the ninth embodiment of the present invention.

Similarly, as illustrated in FIGS. 20H, 20I, and 20J, a combination of a plurality of magnetic structures 903 (903a, 903b) may be used. As described below in another embodiment, a structure (FIG. 20K) in which a plate of the magnetic structure 903b made of a soft magnetic material is further provided around the magnetic structure 903a may be adopted. Of course, it is not limited to the example illustrated in FIG. 20, and any analogical structure may be adopted. Further, any combination obtainable from FIG. 20 may be used for the pair to be connected.

Figure 21A:
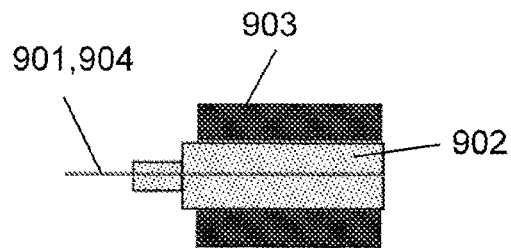
FIG. 21A is a side sectional view illustrating an exemplary optical connecting structure according to the ninth embodiment of the present invention.
Figure 21B:
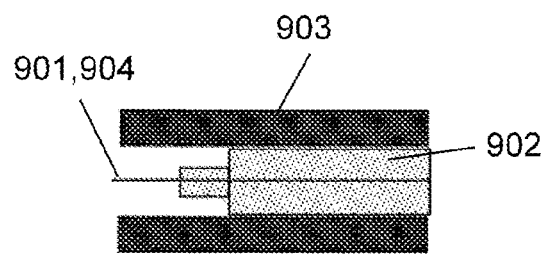
FIG. 21B is a side sectional view illustrating an exemplary optical connecting structure according to the ninth embodiment of the present invention.
Figure 21C:
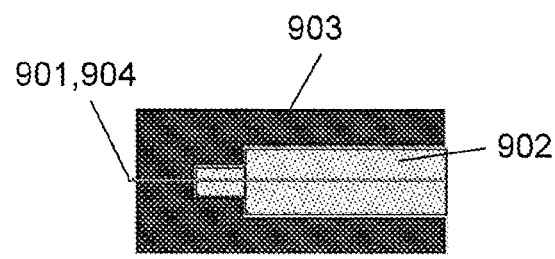
FIG. 21C is a side sectional view illustrating an exemplary optical connecting structure according to the ninth embodiment of the present invention.

Further, FIGS. 21A to 21F illustrate arrangement variations of the positional relationship between the magnetic structure 903 and the alignment component 902 in a side cross section in the optical fiber longitudinal direction. As illustrated in FIG. 21A, the magnetic structure 903 may be shorter than the alignment component 902 on the face (face opposite to the connecting end face) on which the optical fibers 901 and the fiber tapes 904 (optical waveguide component) are inserted. Further, as illustrated in FIG. 21B, of course, the magnetic structure 903 may extend longer than the alignment component 902. In this case, for example, of course, since the fiber tape 904 is smaller in the thickness direction than the alignment component 902, the thickness of the magnetic structure 903 may be changed along the fiber tape 904 as illustrated in FIG. 21C.

Figure 21D:
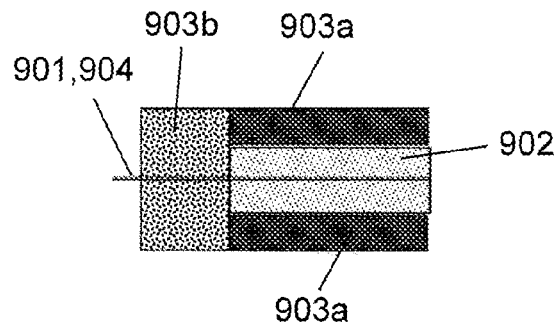
FIG. 21D is a side sectional view illustrating an exemplary optical connecting structure according to the ninth embodiment of the present invention.
Figure 21E:
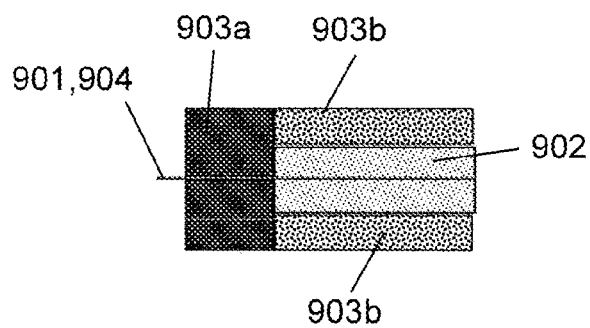
FIG. 21E is a side sectional view illustrating an exemplary optical connecting structure according to the ninth embodiment of the present invention.
Figure 21F:
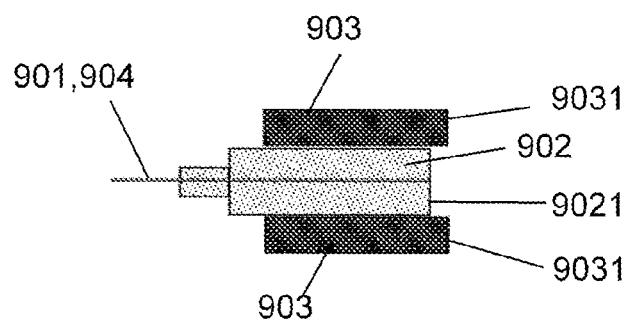
FIG. 21F is a side sectional view illustrating an exemplary optical connecting structure according to the ninth embodiment of the present invention.

Further, the magnetic structure 903 is not required to be a single material in the longitudinal direction, and may be a combination of a hard magnetic material 903a and a soft magnetic material 903b. As illustrated in FIGS. 21D and 21E, in a configuration similar to that illustrated in FIG. 21C, a part may be configured by the hard magnetic material 903a and the other may be configured by a metal being the soft magnetic material 903a. With this configuration, it is possible to increase the magnetic force while suppressing the magnet usage amount. Further, a boot function for protecting the optical fibers 901 or the like can be simultaneously functioned. As illustrated in FIG. 21F, a structure in which the connecting end face 9031 of the magnetic structure 903 protrudes from the connecting end face 9021 of the alignment component 902 may be adopted.

In any of FIGS. 21A to 21F, when a plurality of magnetic structures 903 are combined, they may be mechanically joined, or may be integrated by magnetic force. Any joining means such as adhesion or soldering may be used. Further, as described above, any combination obtainable from FIGS. 20A to 20K and FIGS. 21A to 21F is usable as a combination of the magnetic structures 903, and any combination for the opposing pair may be used as connection structures.

Further, as mentioned above, when one magnetic structure 903 includes a magnet, the other may be composed of only a soft magnetic material. When one of them is composed of only a soft magnetic material, the magnetic force slightly reduces compared to the case where both are configured by magnets. However, it is unnecessary to worry about the N-S combination and arrangement for generating the magnetic attractive force, and therefore it may be practically preferable and may be appropriately selected.

Using the above-mentioned variations can exert additional effects such as increase in magnetic force for further downsizing, space saving in the case of including a connection structure mounting substrate, and improved workability in manufacturing. For example, it is relatively difficult to drill holes in magnets, but cutting is easy. Therefore, as partly illustrated in FIGS. 20A to 20K, using another magnet in assembling, or adopting a structure with intervention of a soft magnetic material or the like, can improve easiness in fabrication.

Further, in addition to the above, it is possible to exert mounting benefits such as sharing with other mounting components. For example, the soft magnetic material portions of FIGS. 20A to 20K may be shared with the substrate on which the connection structure is mounted, or screw holes or the like may be arranged in the soft magnetic material portions so as to be shared with the mechanical fastening structure for the connection structure mounting substrate.

Next, other constituent elements of embodiments of the present invention will be described. In embodiments of the present invention, any known type and material of the optical fiber and any known type and material of the alignment component can be applied.

For example, the optical fiber 901 may be a silica-based optical fiber or a plastic fiber, which are well known. Further, any of single-mode fibers, multi-mode fibers, polarization holding fibers, photonic crystal fibers, multi-core fibers, and the like can be applied as the optical fibers 901.

In addition, although the circumference of the optical fibers 901 is coated, a known resin (e.g., acrylic, epoxy, silicone, or polyimide) coating is applied around a portion other than the inside of the microholes of the alignment component 902, and further two or more layered coating may be provided by adding a silicone tube, a nylon coating, or the like, thereon. Of course, in the case of a multi-core fiber, the optical fiber can be handled more easily by using a known taped and bundled fiber tape 904.

A multicore ferrule such as a known MT ferrule can be used as the alignment component 902. Any of general-purpose plastic, engineering plastic, super engineering plastic, and the like, which are often used for the MT ferrule, may be used as the material of the multi-core ferrule.

Further, for a structure similar to the multi-core ferrule, a glass material may be used, or a processed product based on any material such as a semiconductor material such as silicon or a ceramic material may be used. For example, like a known optical fiber array, a structure in which the optical fibers are accommodated in a glass V groove and closed by a lid component placed thereon and fixed with an adhesive is applicable. In this case, as mentioned above, in the circumference thereof, two guide pins or the like may be positioned and bonded at predetermined positions on both ends, so as to obtain an alignment component structure made of a glass material and having a positioning structure.

Further, the external shapes of the alignment component 902 and the magnetic structure 903 are exemplarily illustrated as being quadrangle/rectangle in the drawings, but their external shapes can be any arbitrary shapes, of course. For example, the external shapes may be circular, elliptical, polygonal, or the like. The corners and the like may be chamfered or filleted if necessary. The above is similarly applied to other embodiments.

Figure 22A:
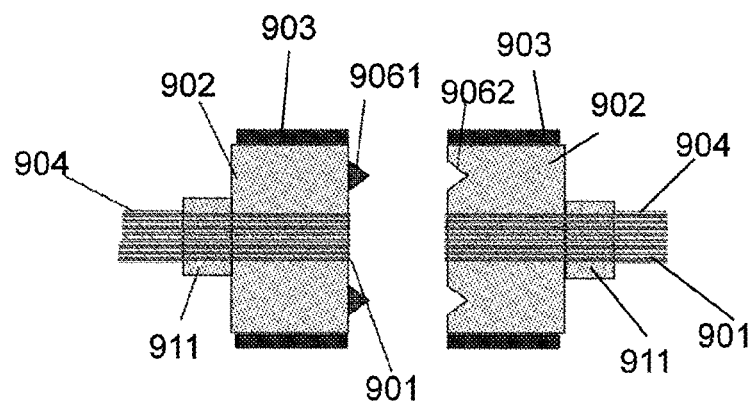
FIG. 22A is a side sectional view illustrating an exemplary optical connecting structure according to the ninth embodiment of the present invention.

As the positioning structure, FIGS. 17A and 17B and FIGS. 18A and 18B illustrate the positioning structures by the guide pins used in the MT ferrule or the like, but the positioning structure according to embodiments of the present invention is not limited to the above, of course. For example, as illustrated in FIG. 22A, like fitting by notches and grooves, protrusions 9061 or the like may be formed or attached on one ferrule end face and guide grooves 9062 or the like matching with the protrusions may be provided on the other.

Figure 22B:
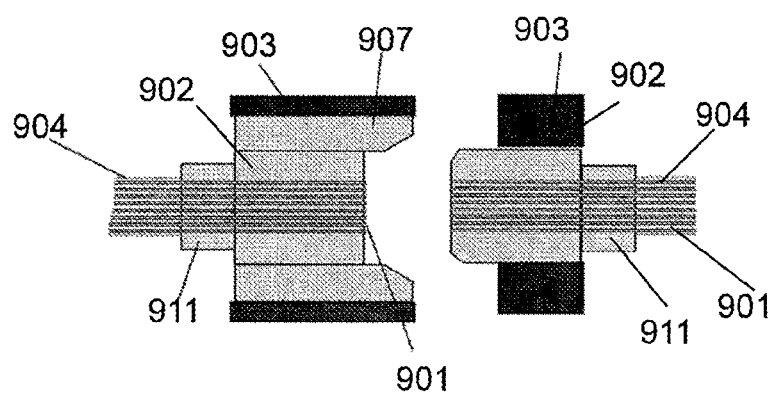
FIG. 22B is a side sectional view illustrating an exemplary optical connecting structure according to the ninth embodiment of the present invention.

Further, as illustrated in FIG. 22B, fitting by external form guides 907 or the like may be used. Any other fitting structure or the like can be applied to positioning as long as similar accuracy can be ensured.

Figure 23A:
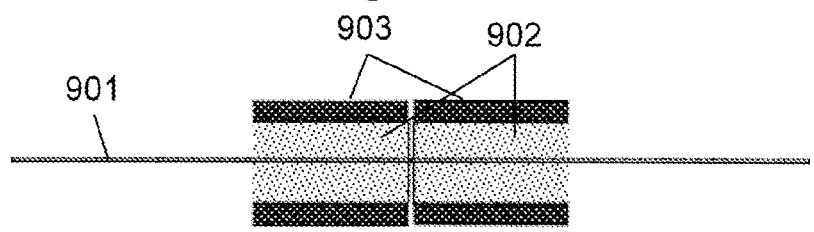
FIG. 23A is a side sectional view illustrating an exemplary optical connecting structure according to the ninth embodiment of the present invention.

Next, the connecting end face of the optical fiber 901 will also be described. The same applies even if the optical fiber 901 is replaced by an optical waveguide or an optical element, as the optical waveguide component. For example, similar to the present embodiment, appropriately setting the protrusion of the end face of the optical fiber 901 from the end face of the alignment component 902 as illustrated in FIG. 23A and adding the pressing force by the magnet can realize the physical contact (PC) connection for all fibers.

As a result, Fresnel reflection with an air layer can be suppressed. As described below in another embodiment, even if there is a gap between the optical fibers 901 to be connected, the Fresnel reflection can be suppressed by filling the gap with a resin having an appropriate refractive index for matching in refractive index.

Figure 23B:
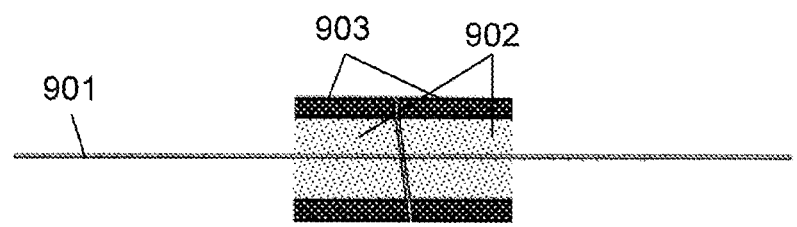
FIG. 23B is a side sectional view illustrating an exemplary optical connecting structure according to the ninth embodiment of the present invention.

Further, as illustrated in FIG. 23B, obliquely polishing the end face of the optical fiber 901 can suppress return light due to the Fresnel reflection. In this case, the alignment component 902 may be polished together, or an inclined end face may be formed only on the end face of the optical fiber 901. The angle at this time may be set in the vertical direction of the paper surface as illustrated in FIG. 23B, or may be set in the depth direction of the paper surface, of course.

Figure 23C:
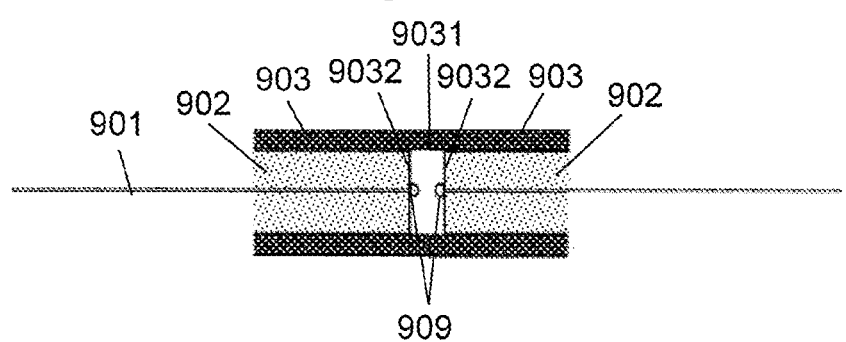
FIG. 23C is a side sectional view illustrating an exemplary optical connecting structure according to the ninth embodiment of the present invention.

Further, as illustrated in FIG. 23C, it is also possible to provide a gap (cavity) and provide microlenses 909 or the like at the end faces of the optical fibers 901, so that the optical fibers 901 are connected in a state where a designated gap is provided therebetween.

Further, the air gap may be intentionally provided without providing the microlens. In this case, if necessary, antireflection coating or the like may be applied to the fiber connecting end face so that the Fresnel reflection can be suppressed. Further, in the configuration of FIG. 23C, an inclined end face may be formed without applying the antireflection coating. In this case, it suffices that the positions of the opposing optical fibers 901 may be appropriately set in advance so that the light coupling is realized even in a state where there is an angle.

In the case of a space coupling system, when realizing the configuration of FIG. 23C, it suffices that the connecting end face 9031 of the magnetic structure 903 is arranged so as to protrude from the connecting end face 9021 of the alignment component 902.

Next, the tolerance of the magnetic structure 903 will be described. In order to stabilize the vector of the magnetic attractive force in the fiber longitudinal direction, it is desired that the opposing faces of the magnetic structures 903 are parallel. However, even if the above-mentioned parallelism is not perfect, the reduction in optical coupling loss is ignorable unless the abutting angle in the longitudinal direction between the alignment components 902 deviates greatly. That is, good optical characteristics can be achieved even with parallelism that can be ensured with practical machining accuracy.

In addition, due to the nature of magnets, the optical connecting structure 900 can be arranged in multiple rows. That is, by arranging the multicore optical connecting structures 900 side by side, a multiple-string multicore optical connection with no clearance can be provided.

As will be described below, in the present optical connecting components and the optical connecting structure, regarding the optical waveguide components, the optical waveguide components accommodated in the alignment components are not limited to a plurality of optical fibers, of course. Similar effects can be exerted even when the optical fibers are replaced by optical waveguides having a plurality of waveguide cores. The connection between the optical waveguides or the connection between the optical waveguides and the plurality of optical fibers are feasible.

Tenth Embodiment

Figure 24A:
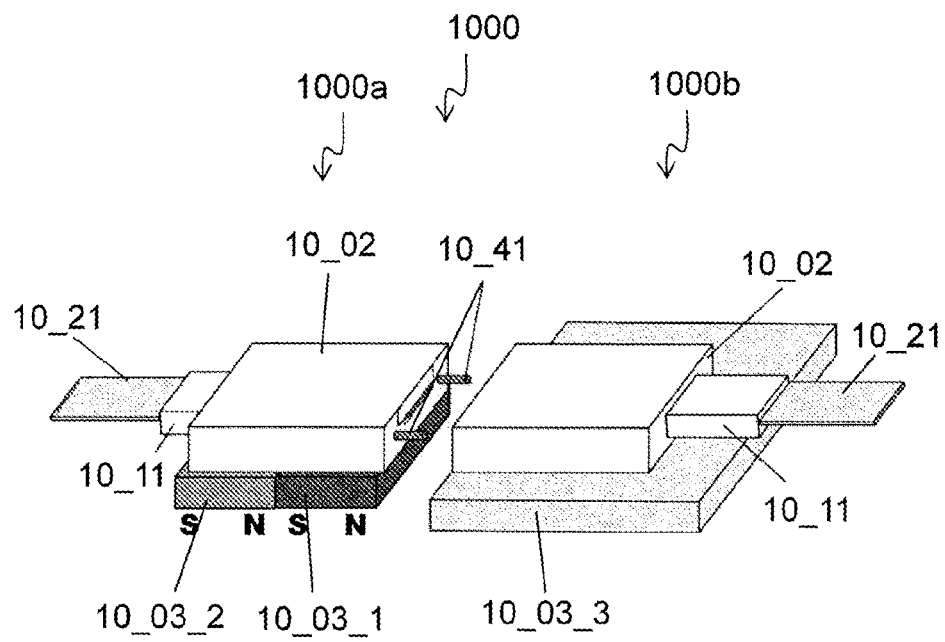
FIG. 24A is a perspective view illustrating an optical connecting structure, before connection, according to a tenth embodiment of the present invention.
Figure 24B:
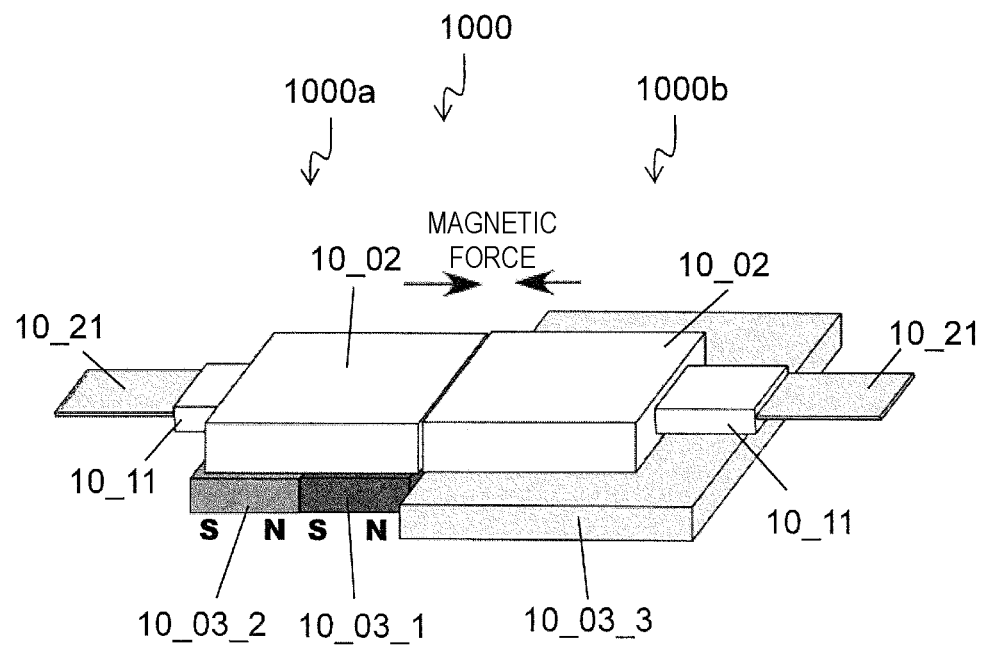
FIG. 24B is a perspective view illustrating the optical connecting structure, after connection, according to the tenth embodiment of the present invention.

FIGS. 24A and 24B illustrate perspective views of an optical connecting structure moo, before and after connection, according to a tenth embodiment of the present invention.

The fundamental structure is the same as that of the ninth embodiment. The optical connecting structure 1000 is configured by connecting an optical connecting component 1000a and an optical connecting component 1000b. In respective optical connecting components 1000a and 1000b, the MT ferrule is used as alignment components 10_02 as described above, and guide pins 10_41 and guide holes are used as the positioning structure. Magnetic structures 10_03 with the arrangement shown in FIG. 20B are arranged on and integrated with bottom surfaces (one outer periphery faces) of the alignment components 10_02.

In the optical connecting component 1000a, a neodymium magnet 10_03_01 being a single hard magnetic material is used as one of the magnetic structures 10_03. Similarly, a neodymium magnet 10_03_02 being a hard magnetic material is used as the other. The opposing faces of respective magnets have different polarities (N-pole or S-pole). On the other hand, a soft magnetic material 10_03_03 is used as one of the magnetic structures.

On the other hand, unlike the plurality of optical fibers 10_01 of the first embodiment, an optical waveguide 10_21 having a plurality of cores and a clad around them is accommodated in each alignment component 10_02.

The cores and the clad configuring the optical waveguide 10_21 are made of a polymer resin, and each is made of a fluorinated epoxy resin whose refractive index is optimally adjusted. The core diameter is approximately 8 μm, and it functions as a single mode waveguide.

The external shape of the polymer waveguide is a quadrangle. A quadrangular groove for accommodating the polymer waveguide is formed in the MT ferrule. After the polymer waveguide is accommodated, the ferrule and the polymer waveguide are integrated by covering the ferrule with a lid from the upper surface of the waveguide and fixing the lid with an adhesive. This is substantially the same structure as that of a well-known PMT connector (Polymer Waveguide Connected with the MT connector). This structure makes it possible to realize connector connection of the waveguides in the same manner as the MT connector.

Of course, the waveguide to be configured is not limited to the above example, and any optical waveguide that functions as an optical waveguide can be applied. For example, a polymer may be used as the material, or a silica-based PLC (Planar Lightwave Circuit) using, as a main base material, a silica glass formed on a well-known substrate may be used.

Further, similarly, any material such as a Si waveguide formed on an SOI substrate, an InP waveguide made of a compound semiconductor, or an LN waveguide made of a dielectric material may be used.

Further, as the material of the polymer waveguide, any known waveguide material may be used in addition to the fluorinated epoxy resin. For example, epoxy resin, acrylic resin, silicone resin, polyimide resin, polynorbornene resin, polyoxetane resin, organic-inorganic hybrid resin, or the like may be the material. A halogen substituent obtained by fluorinating, chlorinating, or brominating the resin may be used. Further, any derivative with a partially modified chemical structure based on the resin may be used.

The size of the waveguide core can be arbitrarily designed, and either single-mode or multi-mode may be used. Further, of course, the interval of the waveguide cores and the number of channels can also be arbitrarily applied.

In FIGS. 24A and 24B, the arrangement of the neodymium magnets, which are magnetic structures made of the hard magnetic material, is different from that of the ninth embodiment.

Specifically, as illustrated in FIGS. 24A and 24B, in the optical connecting component 1000a, in the magnetic structure 10_03, two magnets 10_03_01 and 10_03_02 having N- and S-poles in the longitudinal direction are joined along the longitudinal direction. The pair of N-pole and S-pole is disposed in the same magnetic structure 10_03. Here, the pair of N-pole and S-pole is arranged in such a manner that an attractive force acts appropriately between the opposing faces of two magnets 10_03_01 and 10_03_02. On the other hand, in the optical connecting component 1000b, the soft magnetic structure 10_03_03 is arranged and is connected to the magnet 10_03_01 by the magnetic force.

With such a structure, similar to the effects described in the first embodiment, a necessary pressing force can be added between the connecting end faces of the optical waveguides 10_21 by the magnetic attractive force, without using the previously described mechanical spring component.

Further, since the effect of holding the connection state is exerted by the magnetic attractive force, a stable optical connection can be maintained without requiring any housing component equipped with the conventional mechanical fastening component that counteracts the reaction force of the spring component, or any adapter component. That is, even when the same pressing force is generated, using the structure of embodiments of the present invention can greatly reduce the number of members. It is unnecessary to be incorporated into the MPO connector or the like. A connector connection structure for optical waveguides, which is greatly reduced in size compared with the conventional one, can be realized.

Further, by arranging the magnets separately in the same component as in the present embodiment, the magnetic attractive force can be greatly generated even when the size is the same. That is, even if the size of the magnetic structure 10_03 is made smaller, a sufficient pressing force can be generated. The size for generating the same pressing force can be further reduced. As a result, it becomes possible to provide an optical connecting component and an optical connecting structure that are further reduced in size.

Although the connection between optical waveguides has been described as an example. Of course, similar to the first embodiment, it is applicable to the connection between a plurality of optical fibers or between a plurality of optical fibers and an optical waveguide.

Further, similar to the first embodiment, it can also be applied to the structure and material of the alignment components, different positioning structures, and any connecting end faces illustrated in the examples of FIGS. 23A-23C.

Figure 25A:
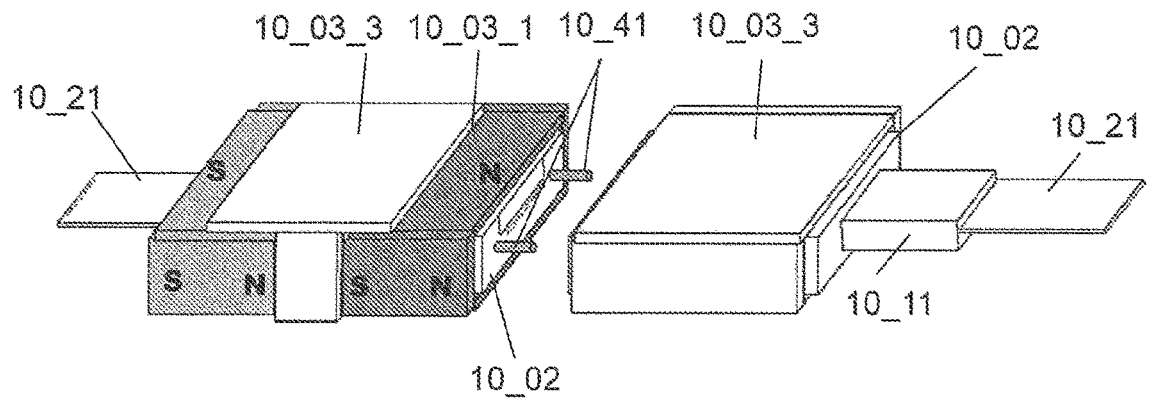
FIG. 25A is a perspective view illustrating an exemplary optical connecting structure, before connection, according to the tenth embodiment of the present invention.
Figure 25B:
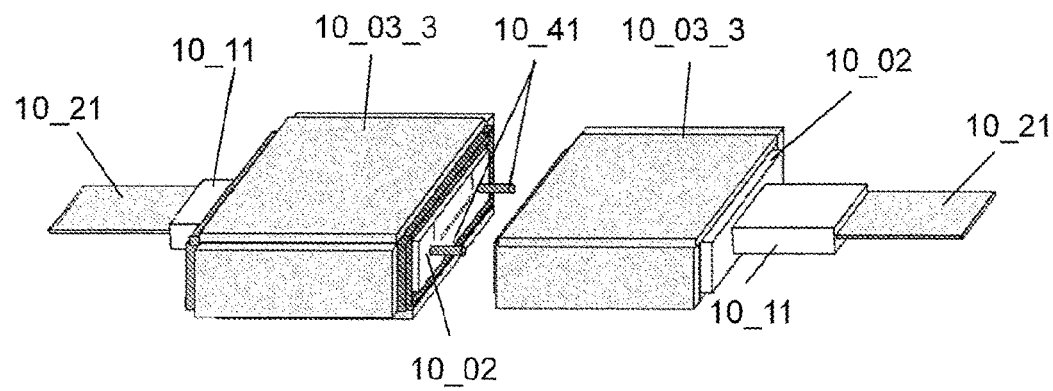
FIG. 25B is a perspective view illustrating an exemplary optical connecting structure, before connection, according to the tenth embodiment of the present invention.

Further, any combination obtainable from FIGS. 20A to 22B may be applied as long as a structure in which the magnet is divided along the longitudinal direction of the waveguide core is adopted. For example, a structure in which SUS430 being a soft magnetic material structure interposes as illustrated in FIG. 25A, or surrounding as illustrated in FIG. 25B, may be adopted.

In the present embodiment, although the 2-division example (one N-S pair in one magnetic structure) is illustrated, any N-S holding structure more than 2-division (a plurality of N-S pairs in one magnetic structure) may also be adopted. The combination of these magnet groups can be formed by connecting magnet components having an N-S pair magnetized in advance by using a magnetic attractive force and, if necessary, can be integrated by filling the gap with an adhesive or soldering, or the like.

Further, of course, when only the magnetic structure of one of the optical connecting components contains the magnet having a hard magnetic structure and the other is configured to contain a soft magnetic material, the attractive force slightly reduces. However, it is unnecessary to worry about the N-S combination and it may be practically preferable and may be appropriately selected.

Eleventh Embodiment

Figure 26A:
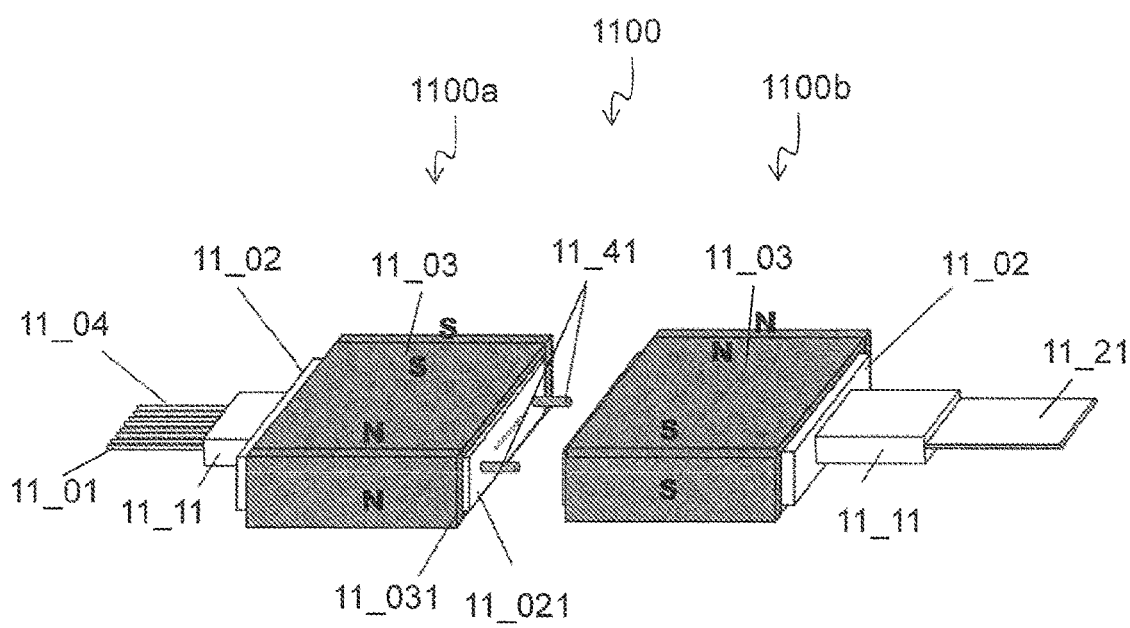
FIG. 26A is a perspective view illustrating an optical connecting structure, before connection, according to an eleventh embodiment of the present invention.
Figure 26B:
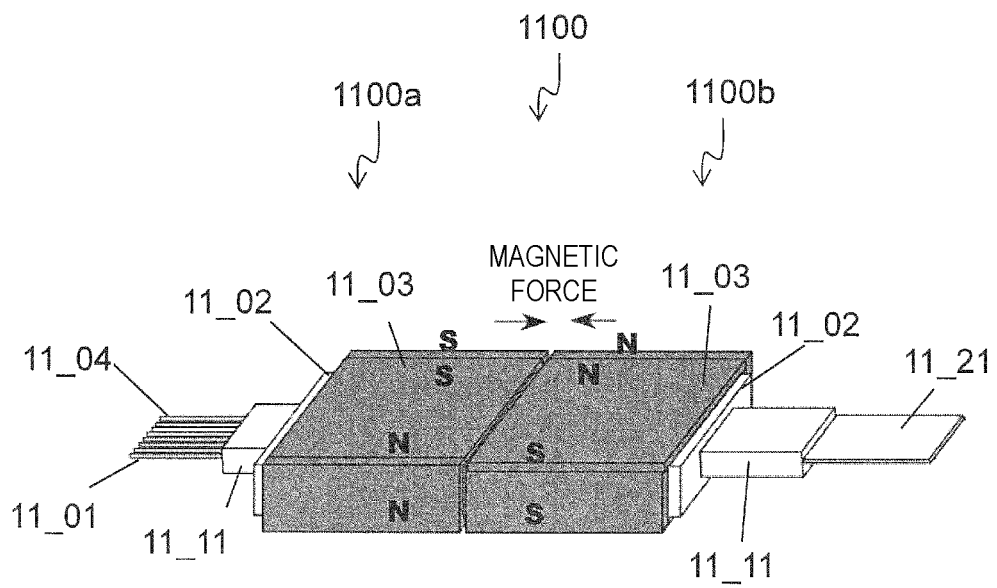
FIG. 26B is a perspective view illustrating the optical connecting structure, after connection, according to the eleventh embodiment of the present invention.

FIGS. 26A and 26B illustrate perspective views of an optical connecting structure 1100, before and after connection, according to an eleventh embodiment of the present invention.

The fundamental structure is the same as that of the ninth embodiment, and the optical connecting structure 1100 is configured by connecting an optical connecting component 1100a and an optical connecting component 1100b. In respective optical connecting components 1100a and 1100b, the MT ferrule is used as an alignment component 11_02 as described above, and guide pins 11_41 and guide holes are used as the positioning structure. Similar to FIG. 20A, magnetic structures 11_03 arranged so as to surround the circumference of the alignment components 11_02 are arranged and integrated. The illustrated objects to be connected are an optical fiber and an optical waveguide, instead of connecting optical fibers with each other or connecting optical waveguides with each other. Of course, the same is true for any combination of these optical waveguide components.

In the present embodiment, one of the magnetic structures 11_03 uses a neodymium magnet that is a single hard magnetic material, and the other uses a neodymium magnet that is also a hard magnetic material.

Except for the objects to be connected, this embodiment is different from the ninth and tenth embodiments in that the N-pole and the S-pole are not magnetized along the optical fiber longitudinal direction but magnetized in the outer peripheral direction. In the optical connecting components 1100a and 1100b, N-S is appropriately arranged so as to face each other so that a magnetic attractive force acts between respective magnetic structures 11_03.

With such a structure, a compact optical connecting structure can be realized without using mechanical pressing components or housing components provided with a fastening structure or the like, similar to effects described in the ninth embodiment.

Further, by changing the direction of magnetization, depending on dimensions and arrangement of the magnets, the magnetic attractive force can be greatly generated even when the size is the same. That is, even if the size of the magnetic structure 11_03 is made smaller, a sufficient pressing force can be generated. The size for generating the same pressing force can be further reduced.

Even if there are restrictions on the width, length, thickness, or the like in the implementation of the optical connecting structure, a sufficient pressing force can be generated, and it is possible to provide an optical connecting component and an optical connecting structure that are further reduced in size.

Further, as additional effects, the present configuration exerts two additional effects of an alignment effect in connection faces and a connection holding effect.

Regarding the former, since the opposing connection faces are an N-S pair, for example, if one of the connection components is erroneously inverted when connected, the connection will fail because of confrontment of N-N and S-S as well as repellence acting therebetween. As a result, this brings an additional effect of preventing erroneous connections.

In addition, regarding the former, although detailed positioning is actually performed by the positioning structure, the relative position of the two connection faces that maximizes the attractive force in N-S is uniquely determined by the magnetic force. Therefore, rough positioning can by realized by the magnetic force. In this case, if it is possible to form the external shape and magnetize the component itself very precisely, highly accurate positioning of optical fiber can be performed even when the positioning structure is not present.

Further, regarding the latter, since the position on the plane where the attractive force is maximized is defined in relation to the above, even if an external force is applied after connection in a direction orthogonal to the optical fiber longitudinal direction or in the outer peripheral direction, a reaction force of the magnet acts, and a force for holding a relative positional relationship between the connection faces is larger than that of the ninth embodiment.

Actually, the slip of the connection faces is very small due to the fitting of the guide pins 11_41, but when the clearance between the guide pins 11_41 and the guide holes 11_42 is, for example, 1 µm, an optical axis deviation between cores after connection corresponding to 1 µm may occur depending on the external force. Therefore, if there is vibration, the connection loss may fluctuate periodically. However, with the present configuration, even when an external force is applied in a direction orthogonal to the optical fiber longitudinal direction or in the outer peripheral direction, a holding/restoring force acts due to the magnetic attractive force, and therefore, it is possible to enhance the stability of the connection.

Figure 27A:
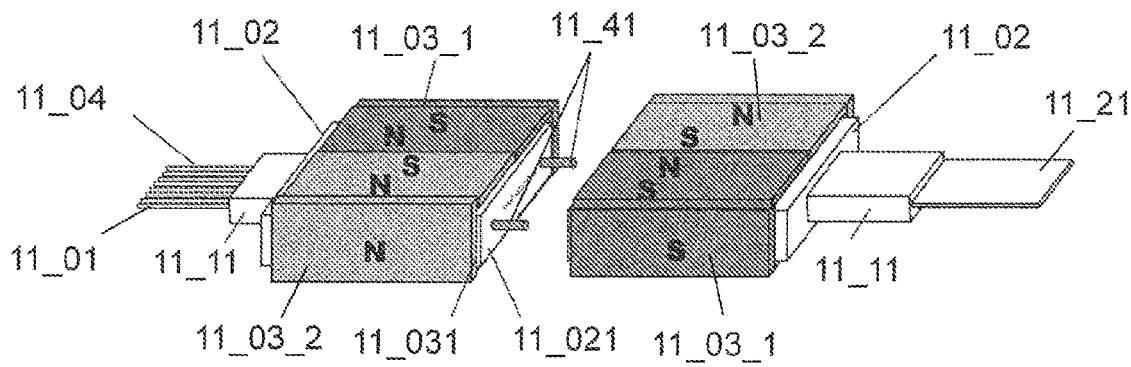
FIG. 27A is a perspective view illustrating an exemplary optical connecting structure, before connection, according to the eleventh embodiment of the present invention.

Similar to the tenth embodiment, an example of 2-division (one N-S pair in one magnetic structure) in the outer peripheral direction may be adopted. Further, any N-S holding structure more than 2-division (a plurality of N-S pairs in one magnetic structure) may also be adopted. For example, 2-division illustrated in FIG. 27A may be adopted.

Figure 27B:
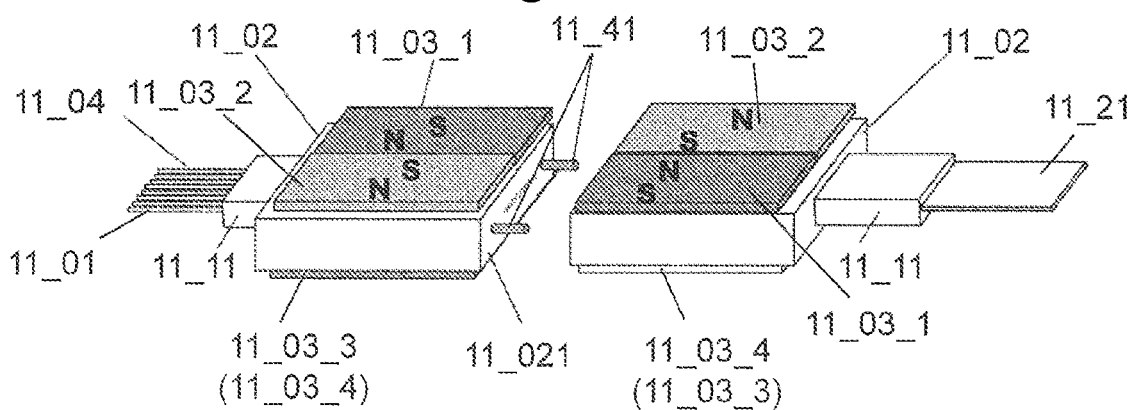
FIG. 27B is a perspective view illustrating an exemplary optical connecting structure, before connection, according to the eleventh embodiment of the present invention.

Further, any combination obtainable from FIGS. 20A to 22B may be applied as long as the magnet is divided along the outer peripheral direction of the waveguide core. For example, a shape in which SUS430 being a soft magnetic material structure is interposed or a shape in which the magnet is arranged and sandwiched only in the vertical direction, for example, a structure illustrated in FIG. 27B may be applied.

Further, of course, only the magnetic structure 11_03 of one optical connecting components may contain a magnet that is a hard magnetic structure, and the other may be configured by a soft magnetic material. In this case, although the previously described alignment effect and the holding effect are reduced, the magnetic attractive force can be increased even when the size is the same depending on dimensions of the magnetic structure 11_03 or the like, compared to a soft magnetic material magnet and a soft magnetic material pair.

Twelfth Embodiment

Figure 28A:
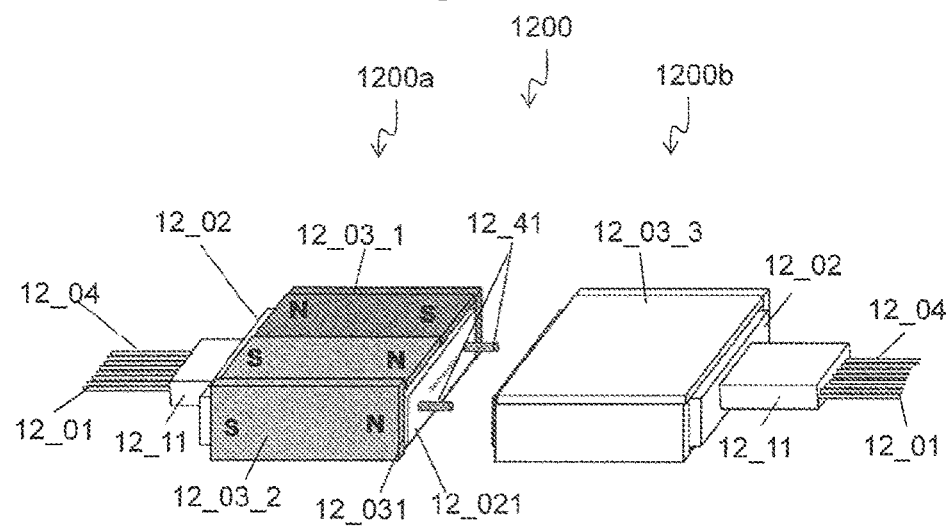
FIG. 28A is a perspective view illustrating an optical connecting structure, before connection, according to a twelfth embodiment of the present invention.
Figure 28B:
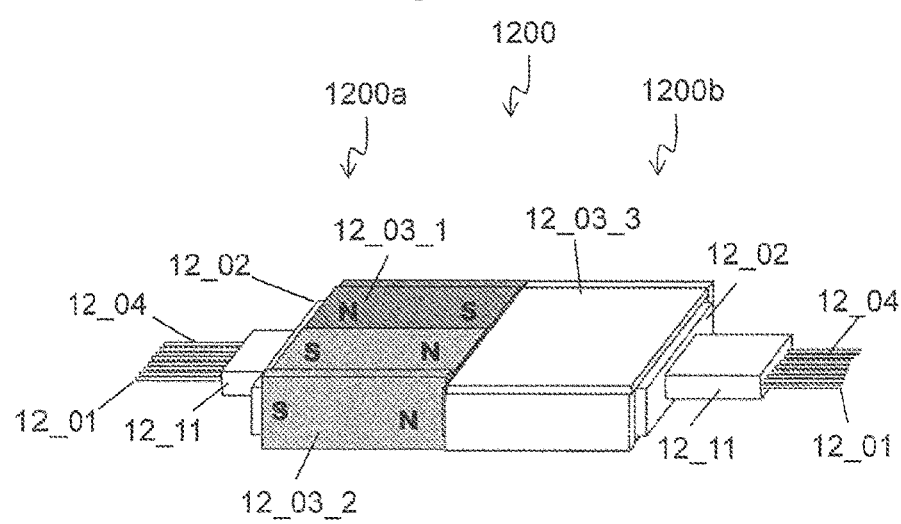
FIG. 28B is a perspective view illustrating the optical connecting structure, after connection, according to the twelfth embodiment of the present invention.

FIGS. 28A and 28B illustrate perspective views of an optical connecting structure, before and after connection, according to a twelfth embodiment of the present invention.

The fundamental structure is the same as that of the ninth embodiment, and an optical connecting structure 1200 is configured by connecting an optical connecting component 1200a and an optical connecting component 1200b. In respective optical connecting components 1200a and 1200b, the MT ferrule is used for an alignment component 12_02 as described above, and guide pins 12_41 and guide holes are used as the positioning structure. Similar to FIG. 20A, a magnetic structure 12_03 arranged so as to surround the circumference of the alignment component 12_02 is arranged and integrated. Optical fibers are exemplarily illustrated as objects to be connected. Of course, optical waveguides or the like can also be applied as optical waveguide components.

In the present embodiment, a neodymium magnet being a single hard magnetic material is used as one of magnetic structures 12_03, and a nickel being a soft magnetic material is used as the other. Here, in the neodymium magnet, two pairs of magnets in which the N- and S-poles are magnetized along the optical fiber longitudinal direction are arranged in the outer peripheral direction.

With such a structure, similar to the effects described in the ninth embodiment, a compact optical connecting structure can be realized without using the mechanical pressing components, the housing components including the fastening structure, or the like.

Further, incorporating a plurality of magnet pairs in the same magnetic structure 12_03 can strengthen the confinement of magnetic force lines and can greatly generate the magnetic attractive force even when the size is the same. That is, even if the size of the magnetic structure 12_03 is made smaller, a sufficient pressing force can be generated. The size for generating the same pressing force can be further reduced. As a result, it is possible to provide an optical connecting component and an optical connecting structure that are further reduced in size.

The combination of these magnet groups can be formed by connecting magnet components having an N-S pair magnetized in advance by using a magnetic attractive force and, if necessary, can be integrated by filling the gap with an adhesive or soldering, or the like.

Modified Example of Twelfth Embodiment

Figure 29:
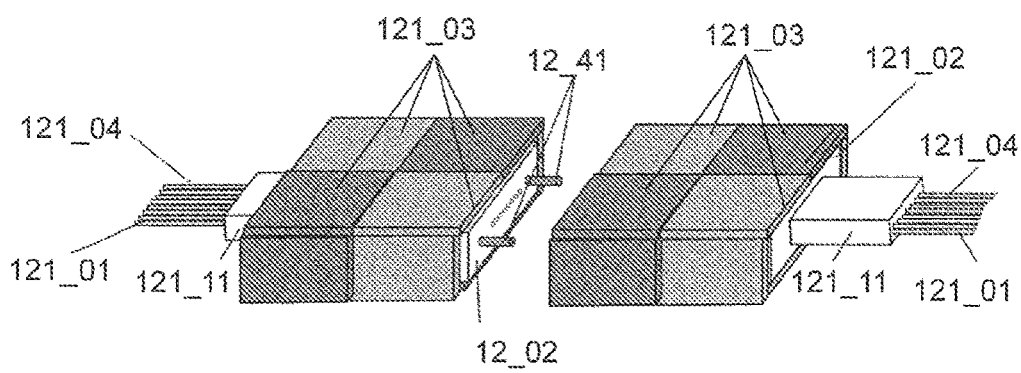
FIG. 29 is a perspective view illustrating an optical connecting structure, before connection, according to a modified example of the twelfth embodiment of the present invention.

FIG. 29 illustrates a modified example of the twelfth embodiment.

The optical connecting structure illustrated in FIG. 29 includes magnet groups 121_03 in which the magnet group integrated as illustrated in FIGS. 28A and 28B is further arranged in the outer peripheral direction in the same manner. The optical connecting structure according to this modified example includes a plurality of magnets not only in the optical fiber longitudinal direction but also in the outer peripheral direction. Each of the plurality of magnets is arranged in such a manner that the opposing faces of neighboring magnets have different polarities.

As described above, two-dimensionally dividing the poles can further strengthen the confinement of magnetic force lines and can greatly generate the magnetic attractive force even when the size is the same. That is, even if the size of the magnetic structure (magnet group) 121_03 is made smaller, a sufficient pressing force can be generated. The size for generating the same pressing force can be further reduced.

Figure 30:
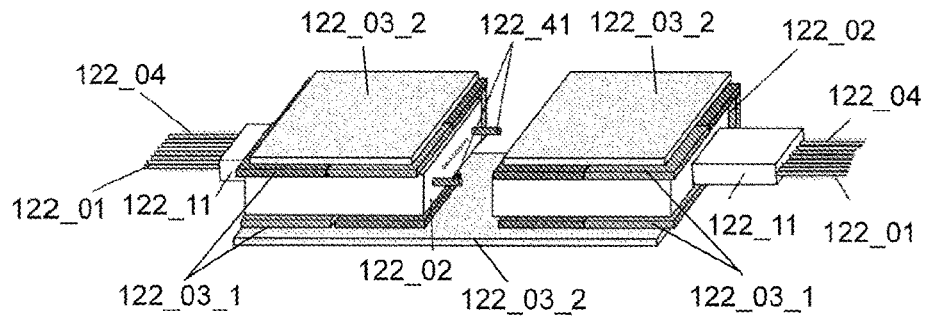
FIG. 30 is a perspective view illustrating an exemplary optical connecting structure, before connection, according to a modified example of the twelfth embodiment of the present invention.

The present structure is not always required to be a single component as illustrated in FIG. 29. Any combination of FIGS. 20A to 22B may be applied. The magnetic structure may be divided. For example, as illustrated in FIG. 30, different magnet groups 122_03_1 and soft magnetic materials 122_03_2 may be arranged as magnetic structures on the upper and lower surfaces.

Further, in the present embodiment, the other is made of a soft magnetic material, but of course, similar to the tenth and eleventh embodiments, the other may be a magnetic structure configured by each of FIGS. 28A to 30 and a magnet made of a hard magnetic material with opposed N-S arrangement. In this case, as described in the eleventh embodiment, the positioning effect in connection faces and the holding effect related to the stability after connection can be additionally exerted.

Thirteenth Embodiment

Figure 31A:
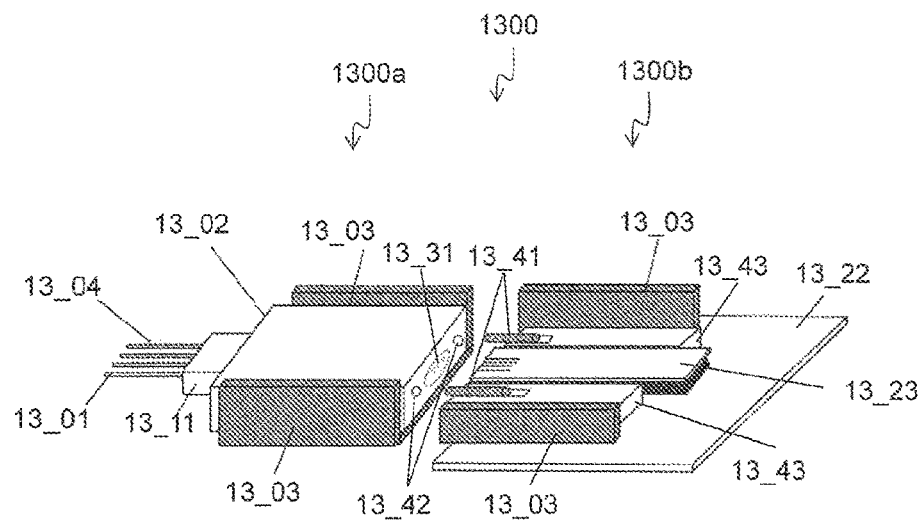
FIG. 31A is a perspective view illustrating an optical connecting structure, before connection, according to a thirteenth embodiment of the present invention.
Figure 31B:
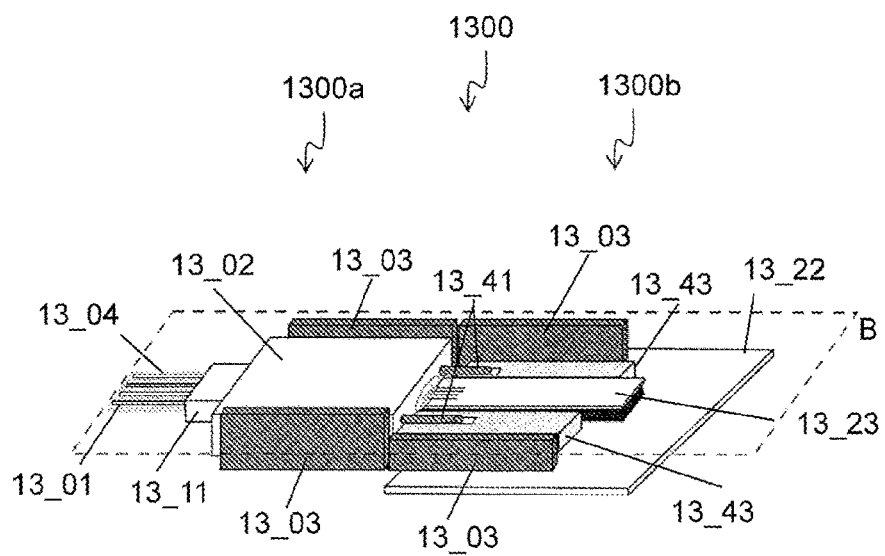
FIG. 31B is a perspective view illustrating the optical connecting structure, after connection, according to the thirteenth embodiment of the present invention.
Figure 31C:
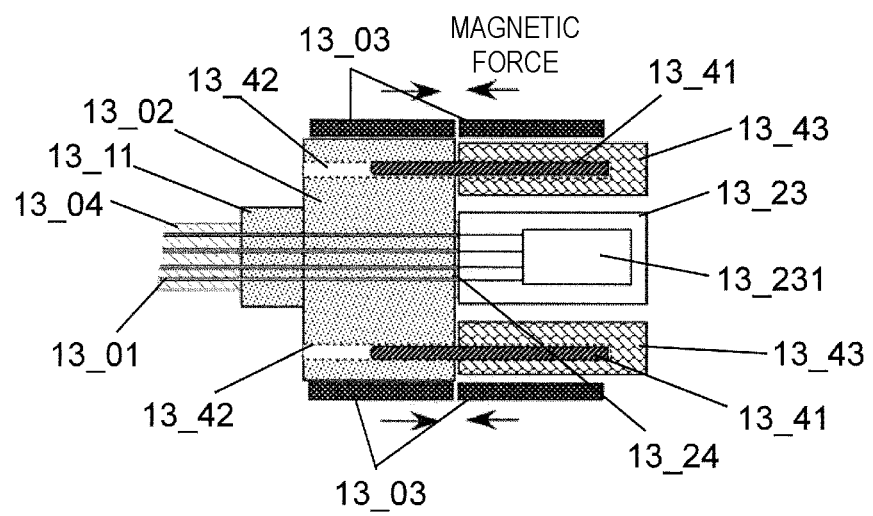
FIG. 31C is a top sectional view illustrating the optical connecting structure, before connection, according to the thirteenth embodiment of the present invention.

FIGS. 31A and 31B illustrate perspective views of an optical connecting structure 1300, before and after connection, according to a thirteenth embodiment of the present invention. The optical connecting structure 1300 is configured by connecting an optical connecting component 1300*a* and an optical connecting component 1300*b*. FIG. 31C illustrates a sectional view taken along a plane B in FIG. 31B.

In the optical connecting component 1300*a*, an alignment component 13_02 accommodates a plurality of optical fibers 13_01, similar to the ninth embodiment. A positioning structure such as guide pin insertion holes 13_42 is arranged on an end face of the alignment component 13_02.

Further, magnetic structures 13_03 are connected partly to the circumference of the alignment component 13_02, and the magnetic structure 13_03 is formed of a magnet that is a hard magnetic material. The optical connecting component 1300*a* and the optical connecting component 1300*b* are connected by the magnetic force of the magnetic structures 13_03.

On the other hand, in the optical connecting component 1300*b* (optical element 13_23 side), the alignment component includes a positioning structure on a substrate 13_22. The positioning structure such as guide pins 13_41 is arranged around the optical element 13_23. The positioning structure may be a component 13_43 having the guide holes 13_42 into which the guide pins 13_41 can be inserted. That is, a combination of male and female may be changed.

Here, the optical element 13_23 is mounted on the substrate 13_22, and the positioning structure is also formed or mounted on the substrate 13_22.

Further, in the vicinity of the optical element 13_23, magnets serving as the magnetic structure 13_03 and made of a hard magnetic material are arranged on the right and left sides and mounted on the substrate 13_22. Details of electric wiring, electric mounting units, electric circuit elements, optical element functional units or the like are omitted in the drawing.

At this time, the optical element 13_23 is, for example, a photonic integrated circuit configured by a silicon waveguide having a plurality of cores.

A spot size converter that matches with the mode field diameter of the optical fiber, or the like, is appropriately integrated in the vicinity of the silicon waveguide being the optical element 13_23. This enables highly efficient connection by the mode field of the optical fiber and Edge Coupling.

Further, the clearance between connecting end faces is filled with a refractive index matching agent 13_31.

Further, the positioning structure provided on the optical element 13_23 side is accurately positioned with respect to a plurality of optical input/output parts provided in the optical element 13_23. By fitting the guide pins 13_41 provided in the optical connecting component 1300*b* into the guide structure (holes) 13_42 of the optical connecting component 1300*a*, respective cores of the plurality of optical fibers 13_01 and the optical input/output parts of the optical element 13_23 are positioned. Therefore, it is configured to enable highly efficient optical connection.

With such a structure, similar to the effects described in the ninth embodiment, a compact connector connection between the optical element and a plurality of optical fibers can be realized without using the housing components provided with mechanical pressing components, fastening structures, or the like, such as a clip component in the MT connector or a coiled spring in the MPO connector.

In particular, in applications of an optical element, it is necessary to mount the optical element on a substrate or the like in consideration of an application for electrically connecting the optical element to the printed circuit board or the like. In this case, unlike the application for connecting optical fibers accommodated in the alignment component, connecting optical waveguides accommodated in the alignment component, or connecting optical fibers and optical waveguides, as described in the ninth to twelfth embodiments, it is difficult to mount a clip or a spring on the optical element side mounted on the substrate. In addition, it is very difficult to form a mechanical structure in such a manner that the pressing components are fastened, from the viewpoints of mounting, the thickness of the substrate, mechanical interference with other components mounted on the mounting substrate, and the like.

In the case of this structure, the magnetic structures 13_03 provided on the substrate 13_22 side may be magnet blocks illustrated in FIGS. 31A and 31B or simple magnetic metal blocks such as SUS430, and the structure is very simple. Therefore, the magnetic structures 13_03 can be easily arranged on the substrate 13_22 or in the vicinity of the optical element 13_23, and this exerts a great effect in realizing a compact optical connecting structure.

The optical element 13_23 is, for example, a light emitting element, a light receiving element, a light modulation element, or an optical function element. A distributed feedback (DFB) laser array, a distributed Bragg reflector (DBR) laser array, a vertically cavity surface emitting laser (VCSEL) array are well known as light emitting elements. The light receiving element is, for example, a PhotoDetecter array.

The light modulation element can be configured by, for example, the one that is directly modulated on the light emitting element, the one that integrates an electro-absorption (EA) modulator, or an external modulation element configured by a Mach-Zehnder interference circuit or a ring modulator circuit. The optical function element is a splitter, a wavelength multiplexer/demultiplexer, an optical switch, a polarization control element, an optical filter, or the like.

Any of these can be used as the optical element. A photonic integrated circuit (PIC), in which the above-described various elements such as the light emitting element, the light receiving element, the light modulation element, and the optical function element are integrated by monolithic integration or in hybrid on a silica-based PLC being the base of the optical waveguide, an Si waveguide, a polymer waveguide, an InP waveguide, an LN waveguide or the like, can also be used as the optical element.

In any case, any optical element that includes a plurality of optical input/output parts and configured to input/output light to the outside when connected with external optical fibers or optical waveguides can be applied to embodiments of the present invention.

Further, the positioning structure provided on the optical element 13_23 side is not limited to the present embodiment, and may be an arbitrary one as long as it exerts a positioning effect similar to the above-described effect. For example, V grooves on which the guide pins 13_41 can be mounted may be formed as separate components and provided on both sides of the optical element. Alternatively, the V grooves may be directly fabricated and formed on the optical element by machining, lithography, or the like. In such a case, positioning of the positioning structure and the optical element can be determined by process accuracy or machining accuracy.

As mentioned above, the positioning structure is not always required to be directly integrated with the optical element 13_23 and may be indirectly integrated via an intervening substrate or the like. Further, the guide pins 13_41 may be provided on the optical element 13_23 side and the guide holes 13_42 may be provided on the optical fiber connection side.

Modified Example of Thirteenth Embodiment

Figure 32A:
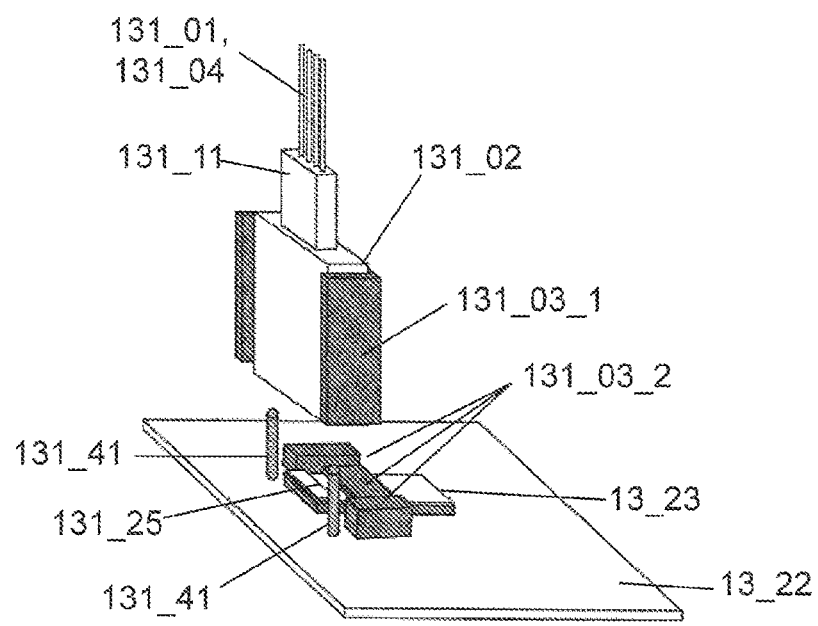
FIG. 32A is a perspective view illustrating an optical connecting structure, before connection, according to a modified example of the thirteenth embodiment of the present invention.
Figure 32B:
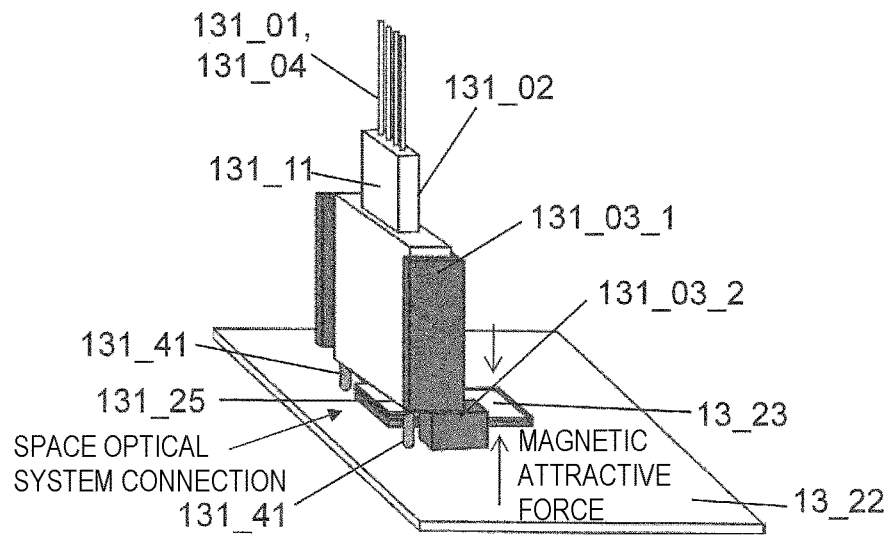
FIG. 32B is a perspective view illustrating an optical connecting structure, after connection, according to the modified example of the thirteenth embodiment of the present invention.

FIGS. 32A and 32B illustrate perspective views of an optical connecting structure, before and after connection, according to a modified example of the present embodiment of the present invention.

Basically, the modified example is similar to the present embodiment, but an optical path conversion structure 131_25 for changing the light advancing direction in the vicinity of the optical input/output parts of the optical element is integrated, and an optical connection is made by so-called Vertical Coupling. Any known method such as integrating grating couplers in the photonic integrated circuit or in the vicinity of the optical input/output parts, integrating mirrors, or integrating bending waveguides may be used as the optical path conversion means.

Even in this configuration, a compact optical connector connection structure can be realized by using a magnetic attractive force as described above, without using mechanical components.

Fourteenth Embodiment

Figure 33A:
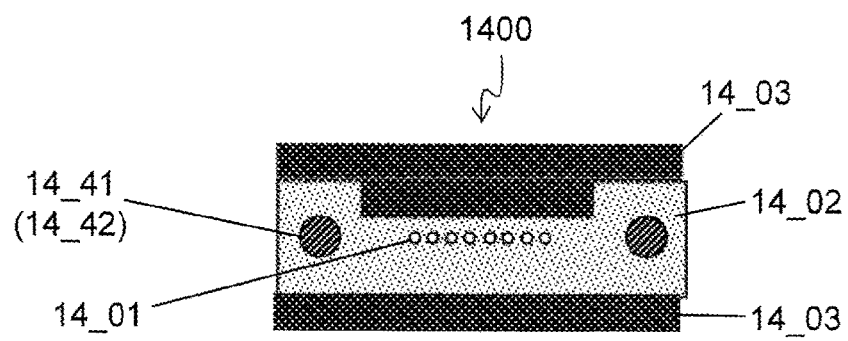
FIG. 33A is a connecting end face sectional view illustrating an optical connecting structure according to a fourteenth embodiment of the present invention.
Figure 33B:
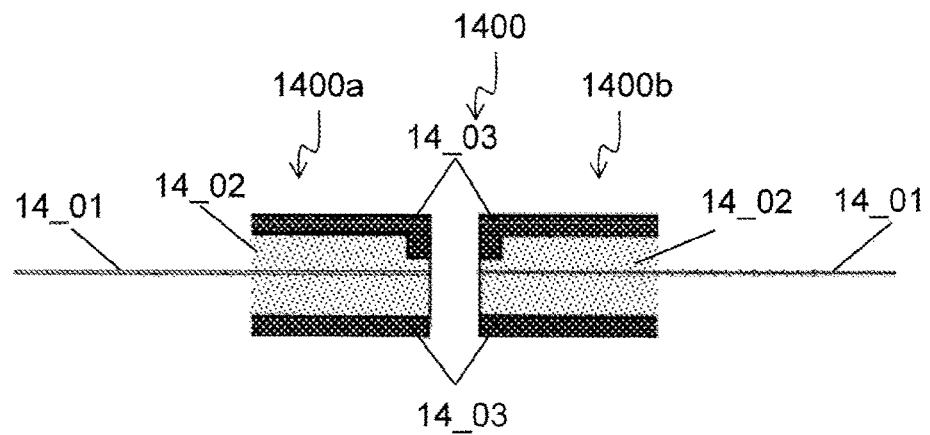
FIG. 33B is a side sectional view illustrating the optical connecting structure, before connection, according to the fourteenth embodiment of the present invention.
Figure 33C:
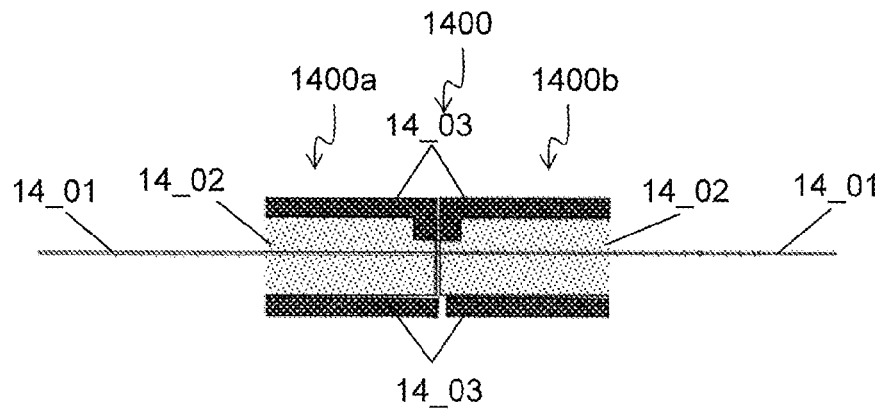
FIG. 33C is a side sectional view illustrating the optical connecting structure, after connection, according to the fourteenth embodiment of the present invention.

FIGS. 33A, 33B, and 33C illustrate a schematic view of a connecting end face of a connection component, a side sectional view before connection, and a side sectional view after connection, of an optical connecting structure 1400 according to the fourteenth embodiment of the present invention. The optical connecting structure 1400 is configured by connecting an optical connecting component 1400*a* and an optical connecting component 1400*b*.

Constituent elements and connection structures are substantially the same as those of the ninth embodiment, but arrangement positions of magnetic structures 14_03 are different from those of the ninth embodiment.

That is, as illustrated in FIG. 20G, the magnetic structures 14_03 are arranged not only in the circumference of an alignment component 14_02 but also in the connecting end face of the alignment component 14_02. A depressed structure for accommodating the magnetic structure 14_03 is provided partly, in advance, in the vicinity of the connecting end face of the alignment component 14_02. The magnetic structure 14_03 or a part of the magnetic structure 14_03 is arranged in the depressed structure. Here, the depressed structure also includes a notch.

Further, at least one of the magnetic structures 14_03 includes a magnet of a hard magnetic structure, similar to the embodiments described above. With such a structure, similar to the ninth embodiment, a compact optical connecting structure can be realized without using any mechanical component or any fastening structure.

Further, by increasing the area of the magnetic structure 14_03 on the end face, the substantial cross section of the magnet can be increased, the magnetic force can be greatly generated without increasing the external dimensions, or the external dimensions can be reduced with the same magnetic force. As a result, a further compact optical connecting structure can be realized.

Fifteenth Embodiment

Figure 34A:
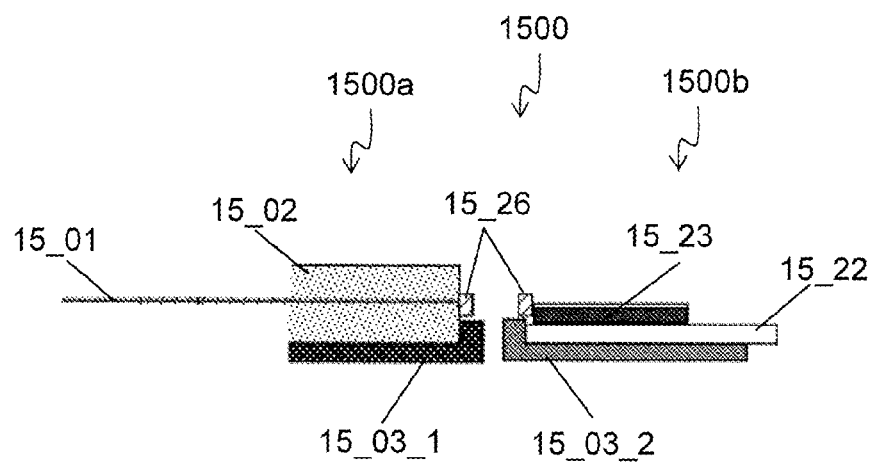
FIG. 34A is a side sectional view illustrating an optical connecting structure, before connection, according to a fifteenth embodiment of the present invention.
Figure 34B:
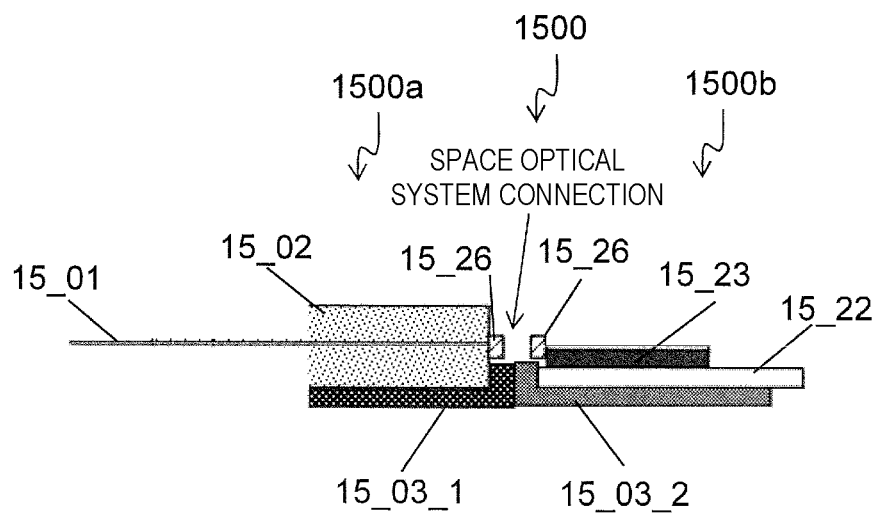
FIG. 34B is a side sectional view illustrating the optical connecting structure, after connection, according to the fifteenth embodiment of the present invention.

FIGS. 34A and 34B illustrate side sectional views of an optical connecting structure 1500, before and after connection, according to a fifteenth embodiment of the present invention. The optical connecting structure 1500 is configured by connecting an optical connecting component 1500*a* and an optical connecting component 1500*b*.

The fundamental structure is similar to a combination of the fourteenth embodiment and the thirteenth embodiment, but magnetic structures 15_03_1 and 15_03_2 protrude from connecting end faces of an alignment component 15_02 and optical fibers 15_01.

Further, the objects to be connected are an optical element 15_23 and a plurality of optical fibers 15_01.

Further, the optical element 15_23 including a microlens array structure 15_26 described in the ninth embodiment with reference to FIG. 23C and a reflection prevention film are formed on respective connecting end faces of the optical element and the optical fibers 15_01, thereby performing space system coupling.

Further, the magnetic structures 15_03_1 and 15_03_2 are arranged on the connecting end face of the alignment component 15_02 and have predetermined thicknesses. The total thickness of two magnetic structures 15_03_1 and 15_03_2 is equal to the same thickness as an optimum gap required for the space coupling system. Further, of the magnetic structures, one magnetic structure 15_03_1 on the alignment component 15_02 side is a magnet, and the other magnetic structure 15_03_2 is SUS430 being a soft magnetic material.

At the time of connection, optical coupling is performed by the positioning structure. A magnetic attractive force is generated between the magnetic structure 15_03_1 provided on the connecting end face of the alignment component 15_02 and the magnetic structure 15_03_2 provided in the vicinity of the end face of the optical element, and the connection state is held.

Further, as mentioned above, the gap (cavity) between the optical element 15_23 and the optical fibers 15_01 is defined by total thickness of the magnetic structures 15_03_1 and 15_03_2.

With such a structure, similar to the ninth embodiment, a compact optical connecting structure can be realized without using any mechanical component or any fastening structure. In addition, by defining the gap, highly efficient optical connection can be easily realized.

Here, in the configuration of FIGS. 34A and 34B, the magnetic structures 15_03_1 and 15_03_2 are small in size and therefore the magnetic attractive force to be generated is small. However, in applications where spatial coupling is performed without performing butt coupling via PC connection or matching agent, an excessive stress that elastically deforms the fiber end face required for the PC connection or the like is unnecessary. Therefore, a smaller magnetic attractive force will be sufficient if only the application for holding the connection is taken into consideration.

Further, if there is no necessity of attachment/detachment, the magnetic structures 15_03_1 and 15_03_2 may be permanently connected to each other with additional mechanical components, adhesive, or the like, so as to further hold the connection state after positioning. With this arrangement, the optical connection can be realized without making the external size larger than that of the alignment component 15_02, and a further compact optical connecting structure can be realized.

Modified Example of Fifteenth Embodiment

Figure 35A:
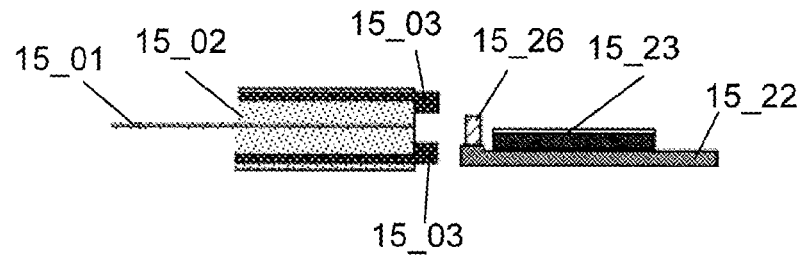
FIG. 35A is a side sectional view illustrating an optical connecting structure, before connection, according to a modified example of the fifteenth embodiment of the present invention.
Figure 35B:
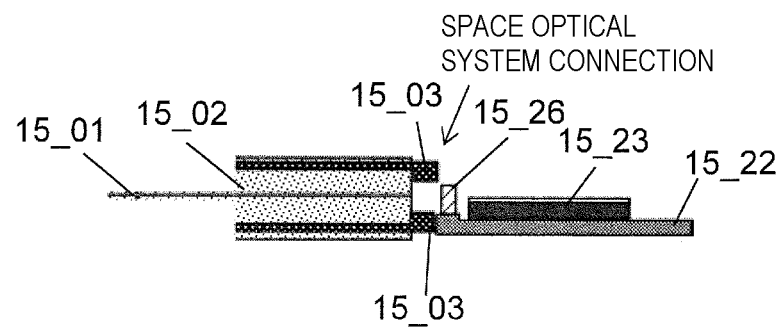
FIG. 35B is a side sectional view illustrating the optical connecting structure, before connection, according to the modified example of the fifteenth embodiment of the present invention.

FIGS. 35A and 35B are schematic views illustrating an optical connecting structure, before and after connection, according to a modified example of the fifteenth embodiment of the present invention.

Although the fundamental structure is similar to that of the fifteenth embodiment, but a magnetic structure 151_03 is arranged on a connecting end face of an alignment component 151_02, and the magnetic structure 151_03 is extended along the optical fiber longitudinal direction so as to penetrate into the alignment component 151_02.

As a result, while exerting effects similar to the effects of the fifteenth embodiment described previously, the effective magnet area can be made larger without making the external size larger than that of the alignment component 151_02, particularly. The magnetic attractive force can be set to be larger than that of FIGS. 34A and 34B. As a result, a further compact optical connecting structure can be realized.

If necessary, a configuration in which a metal spacer made of a soft magnetic material is intervened may be adopted as a means for controlling the gap.

Further, similar effects can be exerted with a configuration in which no lens is formed on the optical fibers and the optical element and another optical component on which a microlens array is formed is arranged on an optical connecting end face. Further, another optical function element (lens, Faraday rotator, polarization separation element, wavelength multiplexing/demultiplexing element, or the like) may be integrated in the gap.

Sixteenth Embodiment

Figure 36A:
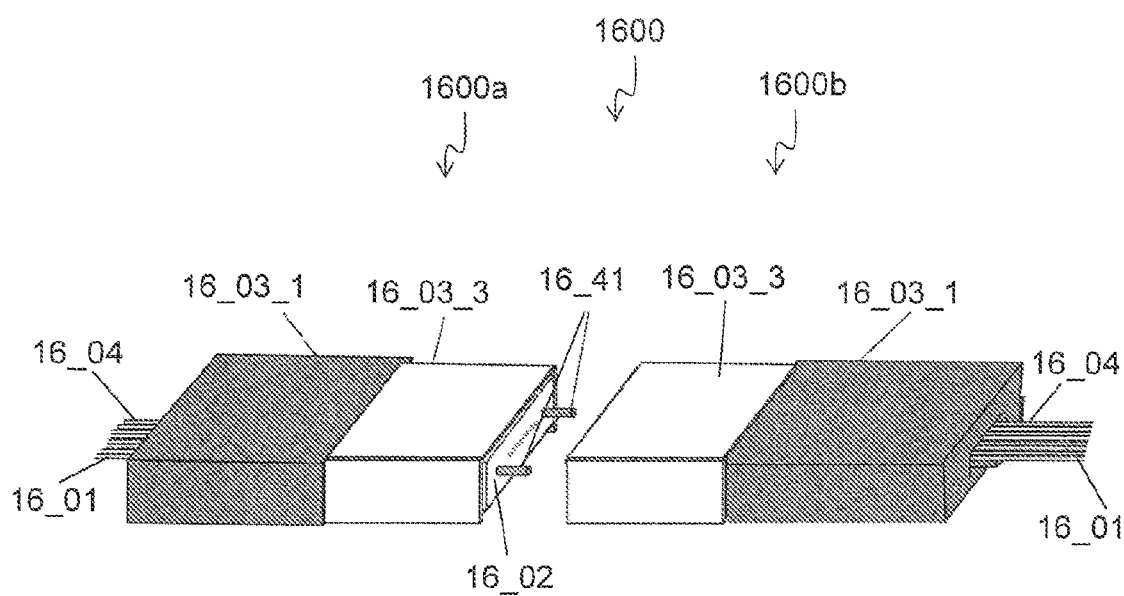
FIG. 36A is a perspective view illustrating an optical connecting structure, before connection, according to a sixteenth embodiment of the present invention.
Figure 36B:
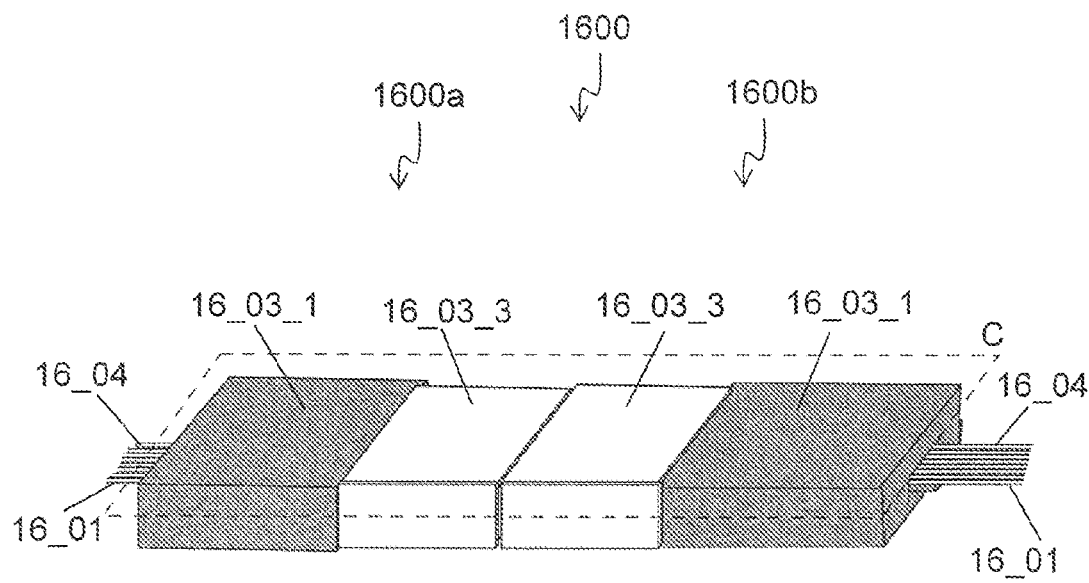
FIG. 36B is a perspective view illustrating the optical connecting structure, after connection, according to the sixteenth embodiment of the present invention.

FIGS. 36A and 36B illustrate perspective views of an optical connecting structure 1600, before and after connection, according to a sixteenth embodiment of the present invention. The optical connecting structure 1600 is configured by connecting an optical connecting component 1600a and an optical connecting component 1600b.

Constituent elements and connection structures are substantially similar to those of the ninth embodiment, but arrangement positions of magnetic structures are different from those of the ninth embodiment.

The magnetic structure is an exemplary structure illustrated in FIG. 21D. The circumference of an alignment component 16_02 is a metal plate 16_03_3 made of SUS430 being a soft magnetic material. A magnet 16_03_1 made of a hard magnetic material surrounds the optical fiber tape 16_04 at an edge of the alignment component 16_02 (an insertion side of an optical fiber tape 16_04) opposite to the connecting end face in the fiber longitudinal direction.

Respective N-S poles or the like are appropriately magnetized so that a magnetic attractive force acts between the magnets when connecting them. With such a structure, similar to the ninth embodiment, a compact optical connecting structure can be realized without using any mechanical component or any fastening structure.

Further, forming the circumference of the alignment component 16_02 by the SUS metal plate 16_03_3 that is made of a soft magnetic material, which is relatively thin and has a thickness of 0.5 mm, for example, can minimize the increase in the external shape of the connecting end face in the optical connecting structure. Further, enlarging the external shape of the magnet 16_03_1 provided on the optical fiber tape 16_04 side to increase the substantial magnet volume can generate a sufficient magnetic force. A further compact optical connecting structure can be realized even when the same pressing force is generated.

For example, a general MT ferrule has a thickness of 2.5 mm, but the thickness of the optical fiber tape 16_04 is approximately 0.3 mm to 0.5 mm. Therefore, arranging the magnet 16_03_1 around it can reduce a magnet hollowed part for accommodating the tape. Thus, the magnet volume can be easily increased and a sufficient magnetic force can be generated without largely increasing the external shape of the connection structure.

Modified Example 1 of Sixteenth Embodiment

Figure 37A:
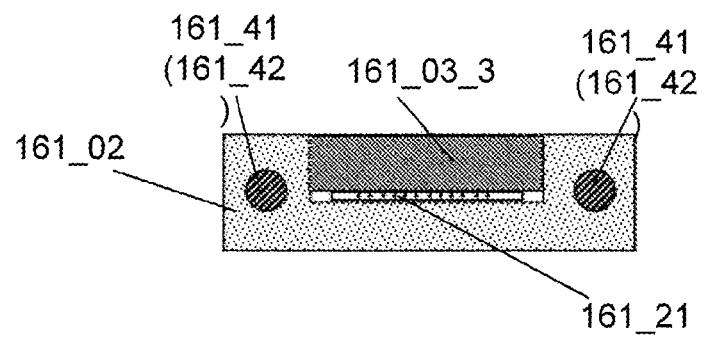
FIG. 37A is a connecting end face sectional view illustrating the optical connecting structure according to the sixteenth embodiment of the present invention.
Figure 37B:
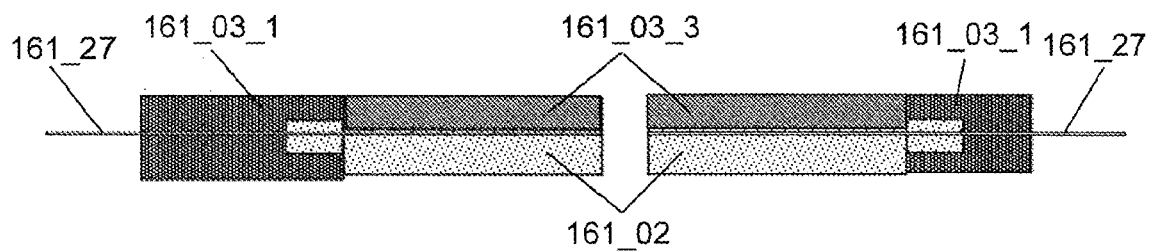
FIG. 37B is a side sectional view illustrating the optical connecting structure, before connection, according to the sixteenth embodiment of the present invention.
Figure 37C:
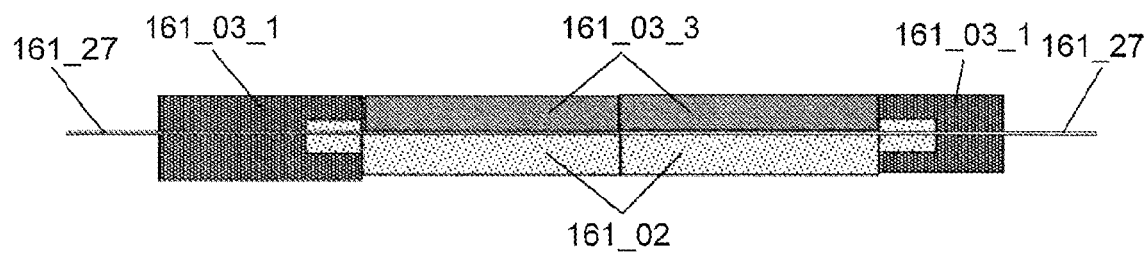
FIG. 37C is a side sectional view illustrating the optical connecting structure, after connection, according to the sixteenth embodiment of the present invention.

An optical connecting structure according to a modified example 1 of the sixteenth embodiment (FIGS. 36A and 36B) has magnetic structures 161_03 incorporated even in alignment components 161_02, as illustrated in FIGS. 37A to 37C. The built-in part is configured by a nickel member, which is a soft magnetic material. The objects to be connected are polymer waveguides 161_27. Providing a magnet on one side opposite to the connecting end face in the longitudinal direction of the polymer waveguide 161_27 can generate a sufficient magnetic force without making the external dimensions larger than those of the alignment component 161_02.

Modified Example 2 of Sixteenth Embodiment

Figure 38:
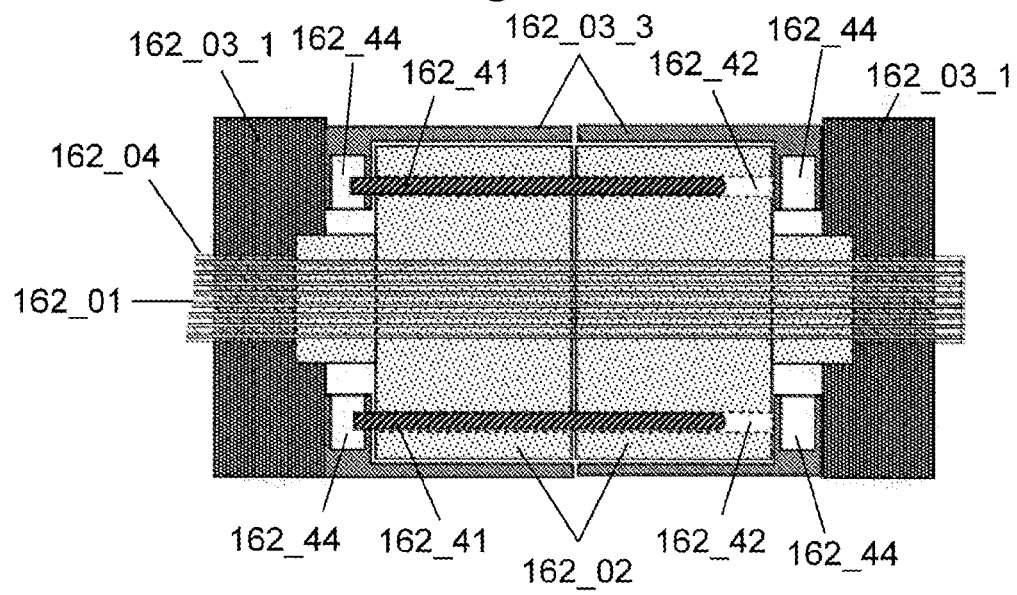
FIG. 38 is a top sectional view illustrating the optical connecting structure, after connection, according to the sixteenth embodiment of the present invention.

An optical connecting structure according to a modified example 2 of the sixteenth embodiment (FIGS. 36A and 36B) will be described with reference to FIG. 38. FIG. 38 is a sectional view of the optical connecting structure according to this modified example, taken along a plane corresponding to a plane C in FIG. 36B.

As illustrated in FIG. 38, SUS430 being a magnetic structure 162_03 has a structure 162_44 that supports a guide pin 162_41 of the positioning structure. Reference characters 162_02 indicate alignment components.

Conventionally, when the guide pin 162_41 is inserted into a guide hole 162_42 so as to serve as a male for the fitting, it is actually necessary to hold the guide pin 162_41 so that it does not fall from the guide hole 162_42. Further, it is necessary to separately add metal components serving as mechanism components for the holding at an end opposite to the connecting end face of the MT ferrule.

n this structure, the structure configured by a soft magnetic material that generates a magnetic attractive force serves as the falling prevention structure 162_44. Consolidating the functions can reduce the number of components, and accordingly contributes to the downsizing.

Contrary to FIGS. 36A and 36B, a structure in which the circumference of the alignment component is a magnet and SUS430 being a soft magnetic material is arranged on the optical fiber tape side may be adopted (not illustrated). Even in this case, the soft magnetic material functions as a so-called yoke and prevents the magnetic force lines from being confined to the outside. Therefore, the magnetic attractive force can be enhanced.

Further, in the present embodiment and the modified example 2 (FIGS. 36A and 36B, and FIG. 38), as for the magnets surrounding the optical fiber tapes 16_04 and 162_04, it is of course possible to adopt any structure described in the ninth to sixteenth embodiments with respect to the direction of magnetization, the magnet division structure, or the like.

Further, it is similarly applicable even when the objects to be connected are optical waveguides being optical waveguide components and optical elements. Further, any combination is applicable to the form of the connecting end face.

Seventeenth Embodiment

Figure 39A:
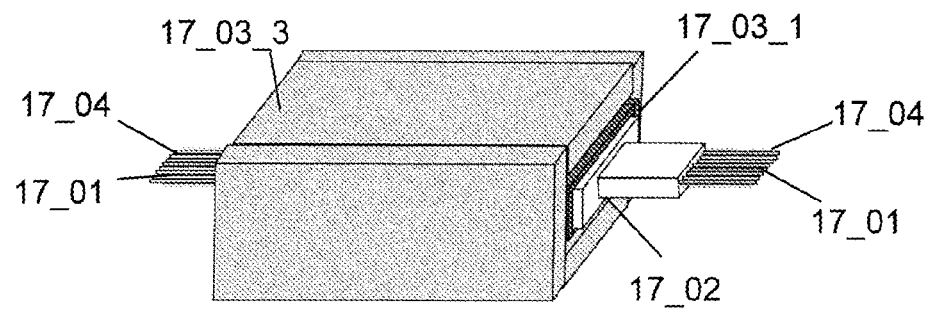
FIG. 39A is a perspective view illustrating an optical connecting structure according to a seventeenth embodiment of the present invention.
Figure 39B:
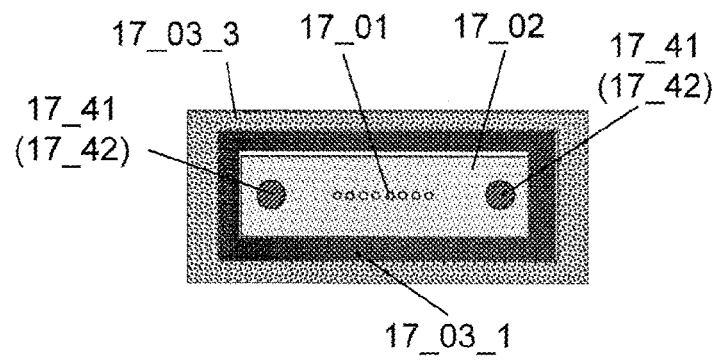
FIG. 39B is a connecting end face sectional view illustrating the optical connecting structure according to the seventeenth embodiment of the present invention.

FIGS. 39A and 39B illustrate a perspective view and a sectional view of an optical connecting structure 1700 according to a seventeenth embodiment of the present invention. The optical connecting structure 1700 includes an optical connecting component 1700a, an optical connecting component 1700b, and a plate 17_03_03. The structures of the optical connecting components can be any combination obtainable from the ninth to sixteenth embodiments.

Here, the plate 17_03_03 is provided so as to surround the circumference of each of the connected pair of magnetic structures. The plate 17_03_03 is made of a soft magnetic material such as metal. For example, it is a plate made of SUS430 or nickel.

With such a structure, not only a compact optical connecting structure can be realized as in the ninth to sixteenth embodiments, but also the leakage of the magnetic force lines to the outside can be prevented so as to strengthen the confinement of a magnetic circuit. Therefore, the magnetic attractive force can be further enhanced, and an optical connecting component and an optical connecting structure that are further reduced in size can be provided.

It is unnecessary that the plate 17_03_03 is in contact with the entire circumference of the outer periphery, and similar effects are exerted when it is a plate in contact with at least one face.

At the same time, preventing the magnetic force lines from leaking to the outside leads to reducing the influence of the magnetic force to the outside. This exerts auxiliary effects of preventing the magnets from adhering to surrounding members and eliminating adverse effects of the magnetic field. Here, the shape of the plate 17_03_03 is arbitrary and, if necessary, the outer periphery of the magnetic structure may be a processed structure or may be a structure that is in contact with at least one face.

Further, even when the first to sixteenth connection structures themselves are arranged in a plurality of multiple-strings, one plate may be provided so as to be in contact with each connection structure or accommodate each connection structure according to the shape.

Modified Example of Seventeenth Embodiment

Figure 40:
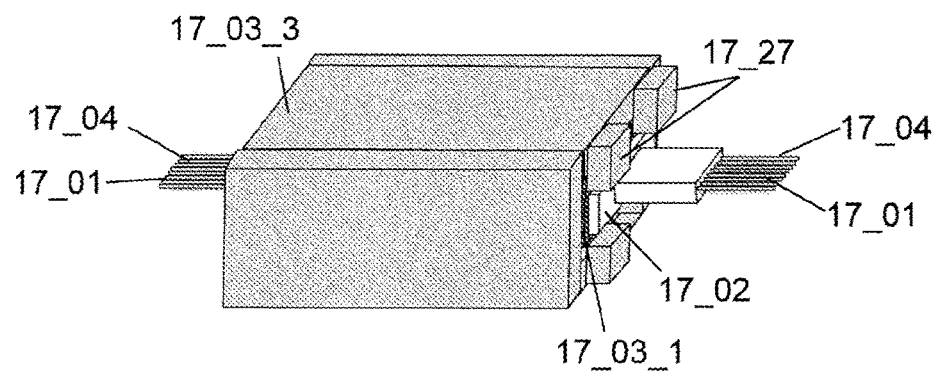
FIG. 40 is a perspective view illustrating an optical connecting structure according to a modified example of the seventeenth embodiment of the present invention.

FIG. 40 illustrates a perspective view of an optical connecting structure according to a modified example of the seventeenth embodiment (FIGS. 39A and 39B).

As illustrated in FIG. 40, on the side opposite to the connecting end face (optical waveguide component insertion side) in the fiber longitudinal direction, soft magnetic materials or magnets are arranged additionally, as a stopper structure 17_27, in the vicinity of the end face opposite to the connecting end face of an alignment component 17_02 (optical waveguide component insertion side), which is present in a plane perpendicular to the fiber longitudinal direction.

With this arrangement, a large external force is applied in the direction opposite to the magnetic attractive force acting between the connecting end faces in this connection structure. Even when an external force exceeding the magnetic attractive force is applied, it is possible to prevent disconnection due to mechanical interference or different magnetic repulsive forces, and a compact and stable optical connecting structure can be realized.

Eighteenth Embodiment

Figure 41:
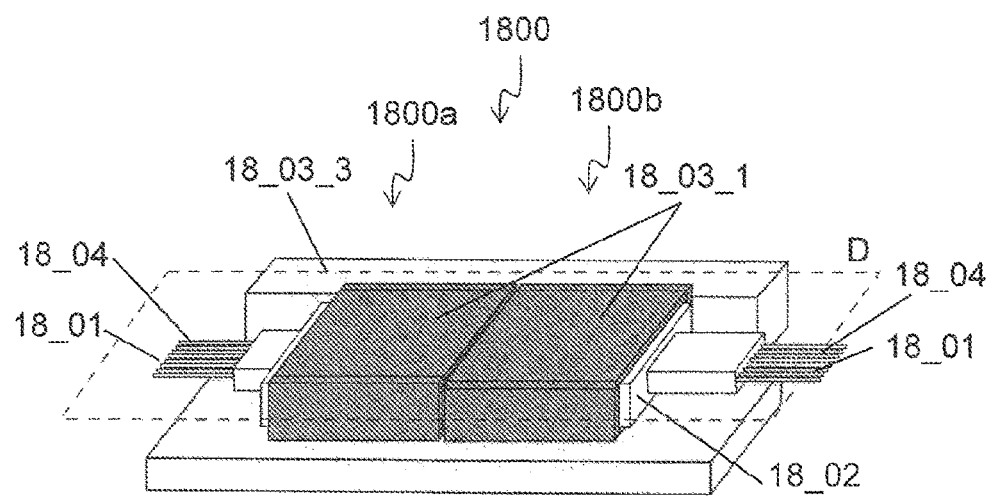
FIG. 41 is a perspective view illustrating an optical connecting structure according to an eighteenth embodiment of the present invention.
Figure 42:
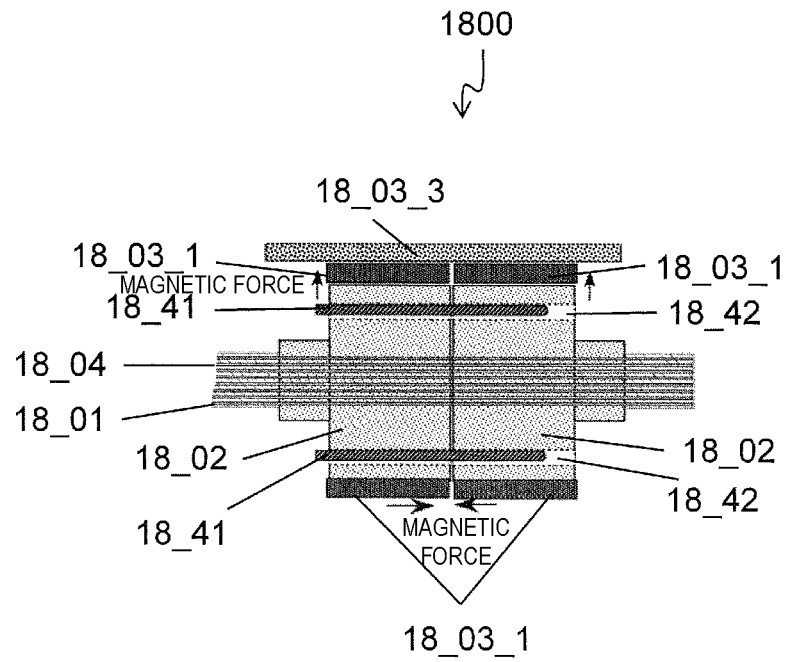
FIG. 42 is a top sectional view illustrating the optical connecting structure according to the eighteenth embodiment of the present invention.

FIG. 41 illustrates a perspective view of an optical connecting structure 1800 according to an eighteenth embodiment of the present invention. Further, FIG. 42 illustrates a sectional view with a plane D in FIG. 41 as a cross section. The optical connecting structure 1800 includes an optical connecting component 1800a, an optical connecting component 1800b, and a plate 18_03_03. The structures of the optical connecting components may be any combination obtainable from the ninth to seventeenth embodiments. It is desired that both of a pair of magnetic structures 18_03_1 to be connected are magnets being hard magnetic materials.

Here, a plate 18_03_3 is provided so as to be in contact with one surface of each of bottom and side faces of the pair of connected magnetic structures 18_03_01. The plate 18_03_3 is made of metal or other magnetic material. For example, it is a plate of SUS430.

With such a structure, not only a compact optical connecting structure can be realized as in the ninth to twelfth embodiments, but also the leaking of the magnetic force lines to the outside can be prevented so as to strengthen the confinement of a magnetic circuit. Therefore, the magnetic attractive force can be further enhanced, and an optical connecting component and an optical connecting structure that are further reduced in size can be provided.

At the same time, preventing the magnetic force lines from leaking to the outside leads to reducing the influence of the magnetic force to the outside. This exerts auxiliary effects of preventing the magnets from adhering to surrounding members and eliminating adverse effects of the magnetic field.

In addition, at this time, as illustrated in FIG. 42, the magnets 18_03_01 are pulled to the face of one plate 18_03_03.

With such a structure, the positioning accuracy at the time of fitting positioning components can be further enhanced.

That is, when guide pins 18_41 or the like are used for fitting, from the viewpoint of insertability, it is necessary to provide a slight gap between the pins 18_41 and their holes 18_42, namely, a clearance movable between the guide pins 18_41 and the guide holes 18_42, on the male side and the female side, and this gap may deteriorate the positioning accuracy.

With the present structure, the fitting portion is moved in one direction of the gap by the attractive force of the magnets 18_03_01 for pulling the alignment components 18_02. As a result, if the relative positions between respective optical fibers 18_01 and the guide pins 18_41 are adjusted in advance so as to be optimum positions in biased directions, an additional effect of enhancing the positioning accuracy of the optical fibers 18_01 can be exerted.

Figure 43:
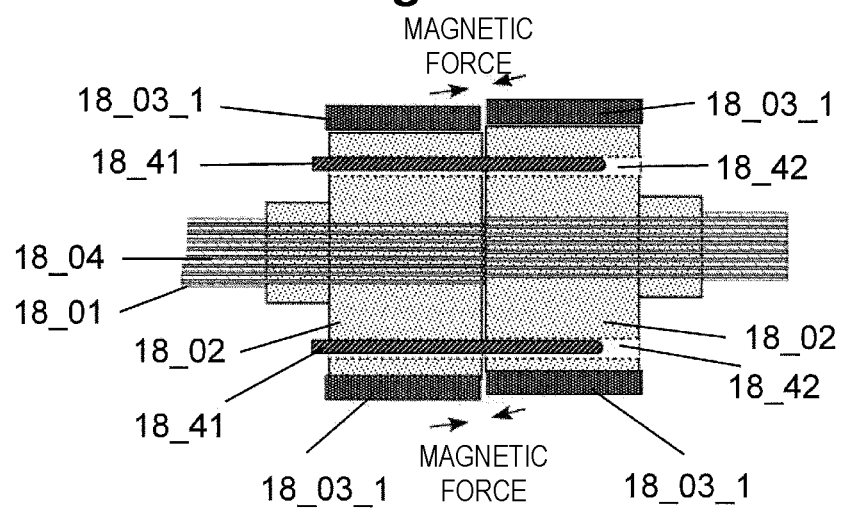
FIG. 43 is a top sectional view illustrating an exemplary optical connecting structure according to the eighteenth embodiment of the present invention.

This effect can also be realized with a structure illustrated in FIG. 43. That is, when the optical fiber longitudinal direction is regarded as the center, by asymmetrically setting the arrangement of two opposing alignment components 18_02 and the magnetic structures 18_03_01 toward the vertical direction of the paper surface with respect to a direction perpendicular to the horizontal plane, the vector of the attractive force by the magnets 18_03_01 is slightly applied in the direction perpendicular to the horizontal plane in addition to the fiber longitudinal direction as illustrated in the drawing.

Therefore, the fitting portion of the positioning structure is moved in one direction of the gap by the attractive force of the magnets 18_03_01 for pulling the alignment components 18_02.

Figure 44:
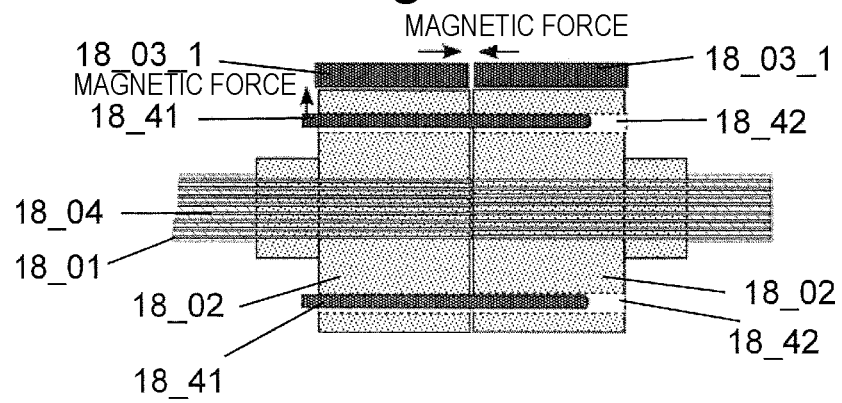
FIG. 44 is a top sectional view illustrating an exemplary optical connecting structure according to the eighteenth embodiment of the present invention.

This can exert an additional effect of enhancing the positioning accuracy of the fibers. Effects similar to the above-described effects can be exerted even if the magnetic structures 18_03_01 are arranged on one side around the alignment components 18_02, as illustrated in FIG. 44, and the guide pins 18_41 are SUS4340 of a soft magnetic material.

Nineteenth Embodiment

Figure 45A:
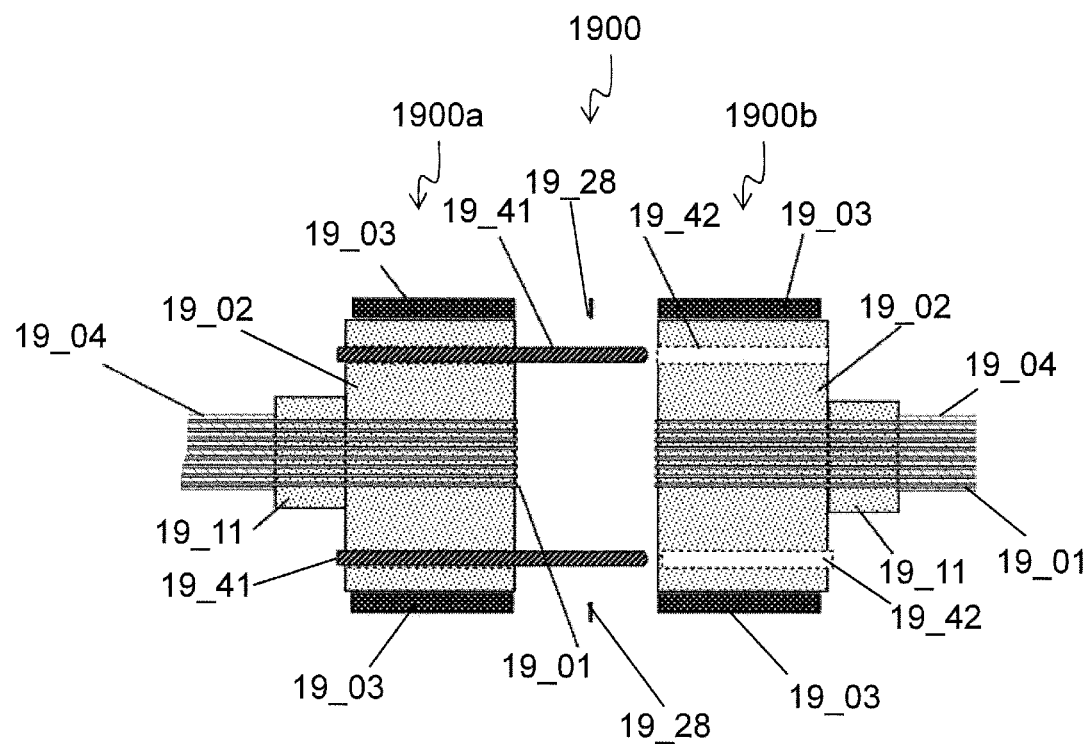
FIG. 45A is a top sectional view illustrating an optical connecting structure, before connection, according to a nineteenth embodiment of the present invention.
Figure 45B:
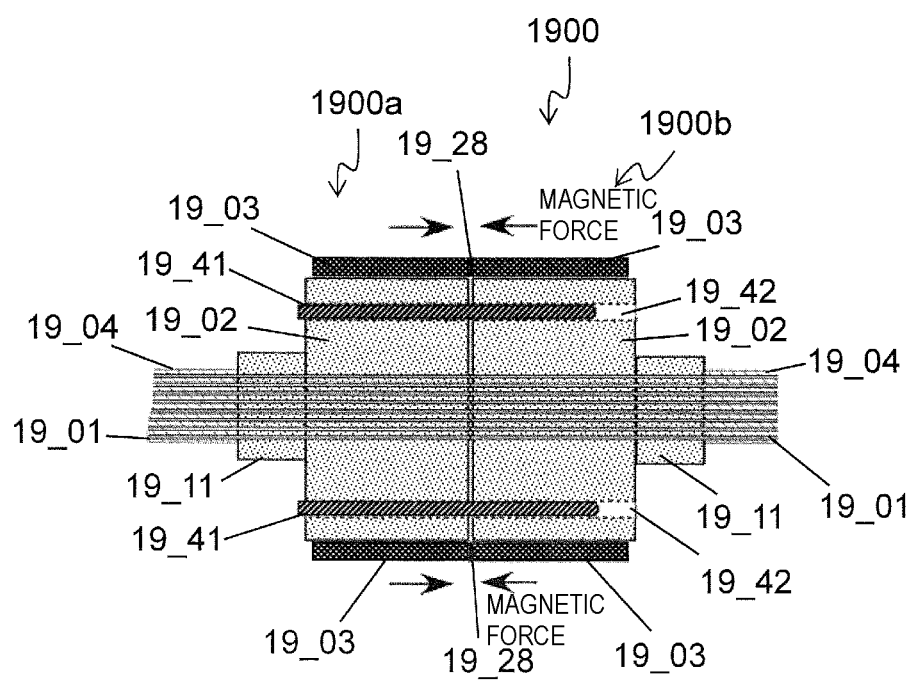
FIG. 45B is a top sectional view illustrating the optical connecting structure, after connection, according to the nineteenth embodiment of the present invention.

FIGS. 45A and 45B illustrate sectional views of an optical connecting structure 1900, before and after connection, according to a nineteenth embodiment of the present invention. The optical connecting structure 1900 includes an optical connecting component 1900a and an optical connecting component 1900b.

The structure is substantially similar to that of the ninth embodiment, but a metal foil 19_28 containing a soft magnetic material (metallic magnetic material) is inserted between opposing magnetic structures 19_03. For example, a metal foil of SUS430 with an opening for alignment components 19_02 is inserted.

With such a structure, not only a compact optical connecting structure can be realized without using any mechanical component as in the ninth embodiment but also a cavity between the magnetic structures 19_03 is filled with a magnetic material. Therefore, it is possible to reduce the gap of the magnetic structures 19_03 that may occur due to mechanical tolerance.

That is, in the previous embodiments, there is a possibility that a gap (cavity) may occur between the opposing magnetic structures 19_03 due to the mechanical tolerance. If this gap is large, the magnetic attractive force may decrease and the magnetic attractive force may decrease as compared with the design.

In the present embodiment, inserting the magnetic structures 19_03 in such a way as to eliminate this gap (cavity) can suppress the reduction in the magnetic attractive force to the outside and confine it in the magnetic circuit. Therefore, even if there is a tolerance, the influence of the magnetic force reduction can be minimized.

Although various, first to eleventh, embodiments have been described, it is needless to say that the present invention can be applied to any combination derived from the description of the first to eleventh embodiments with respect to objects to be connected, connection structure, connecting end face structure, positioning structure, structure/arrangement/joining form of magnetic structure, material/arrangement of various constituent components, and the like.

In the embodiments according to the present invention, the magnetic structures (joining components) may be provided entirely or partly with a hard magnetic material such as a magnet.

In the embodiments according to the present invention, the configurations using two guide pins have been illustrated, but the number of the guide pins is not limited to two and may be any other plural number.

In the embodiments according to the present invention, permanent magnets are used as hard magnetic materials, but they are not limited to the permanent magnets. Even if a hard magnetic material is not a magnet that is not a permanent magnet, it suffices as long as it can hold the magnetic force for a predetermined period. Considering the fact that the optical connectors according to the present invention are mainly applied to optical communication systems and the like, any other magnet capable of holding the magnetic force of 1N or more for at least 10 years may be used, as described above.

In the embodiments according to the present invention, the magnetic structures are configured in such a manner that each component is entirely made of a magnet or a soft magnetic material, but the present invention is not limited to the described examples. Even if each component is configured to partly contain a magnet or a soft magnetic material, similar effects can be exerted as long as the attractive force or repulsive force of the magnet or magnetic material acts and functions in each component.

In the embodiments according to the present invention, practical dimensions are described for the optical connecting components and configuration parts and components of the optical connecting structures, but the dimensions are not limited and any other dimensions suffice as long as respective configuration parts, components, and the like can function.

INDUSTRIAL APPLICABILITY

Embodiments of the present invention relate to an optical connecting component and an optical connecting structure that are compact in size, and can be applied to devices and systems of optical communication or the like.

REFERENCE SIGNS LIST

100 optical connecting structure (optical connector)
100a, 100b, optical connecting component
101 optical waveguide component (optical fiber)
102 alignment component
103 magnetic material structure (joining component)
1041 guide pin
1042 guide pin hole.

The invention claimed is:
1. A first optical connecting component configured to be connected to a second optical connecting component, the first optical connecting component comprising:
an optical waveguide component;
an alignment component for fixing the optical waveguide component;
a magnetic structure integrated with the alignment component; and
a positioning structure provided on a connecting end face of the alignment component, wherein the positioning structure is configured to determine a relative position between the connecting end face and a connecting end face of an alignment component provided in the second optical connecting component;
wherein:
the positioning structure is a guide pin protruding from the connecting end face of the alignment component;
the guide pin is configured to be fitted into a guide hole provided on the connecting end face of the alignment component of the second optical connecting component;
the magnetic structure includes: a metal plate made of a soft magnetic material, arranged on an outer periphery face of the alignment component exclud- ing the connecting end face; and a magnet arranged on an opposite side of the metal plate to the connecting end face; and the metal plate includes a falling preventing structure made of the soft magnetic material, arranged on an opposite side to the connecting end face and configured to prevent the guide pin from falling.

2. The first optical connecting component according to claim 1, wherein at least a part of the magnetic structure includes a hard magnetic material.

3. The first optical connecting component according to claim 1 wherein:
the optical waveguide component is an optical element mounted on a substrate;
the alignment component is provided on the substrate;
the positioning structure is arranged around the optical element or adjacent to an end face of the optical element; and
the magnetic structure is joined to the optical element.

4. The first optical connecting component according to claim 1 wherein the magnetic structure includes a magnet having an N-pole and an S-pole along a longitudinal direction of the optical waveguide component.

5. The first optical connecting component according to claim 1 wherein the magnetic structure includes a magnet having an N-pole and an S-pole along an outer peripheral direction of the alignment component.

6. The first optical connecting component according to claim 1 wherein the magnetic structure includes a plurality of first magnets arranged along a longitudinal direction of the optical waveguide component and a plurality of second magnets arranged in an outer peripheral direction of the alignment component, and the plurality of first magnets and the plurality of second magnets are arranged so that opposing faces of neighboring magnets have different polarities.

7. The first optical connecting component according to claim 1, wherein the magnetic structure extends lower than the alignment component along a face into which the optical waveguide component is inserted.

8. The first optical connecting component according to claim 1, wherein:
a plate is installed on at least one face of each outer periphery portion of the magnetic structure; and
the plate is made of a soft magnetic material.

9. The first optical connecting component according to claim 8, wherein a stopper structure is provided on the plate, and the stopper structure restricts a movement in a direction opposite to a direction toward the connecting end face in a longitudinal direction of the optical waveguide component.

10. The first optical connecting component according to claim 8 wherein the positioning structure has a clearance movable in a direction perpendicular to a horizontal plane, and the positioning structure is moved in one direction by a magnetic force acting between the plate and the magnetic structure.

11. An optical connecting structure comprising:
a first optical connecting component comprising:
a first optical waveguide component;
a first alignment component for fixing the first optical waveguide component;
a first magnetic structure integrated with the first alignment component, wherein at least a part of the first magnetic structure includes a hard magnetic material; and
a first positioning structure provided on a connecting end face of the first alignment component, wherein the first positioning structure is configured to determine a relative position between the connecting end face and a connecting end face of a second alignment component provided in a second optical connecting component;
wherein:
the first positioning structure is a guide pin protruding from the connecting end face of the first alignment component;
the guide pin is configured to be fitted into a guide hole provided on the connecting end face of the second alignment component of the second optical connecting component;
the first magnetic structure includes: a metal plate made of a soft magnetic material, arranged on an outer periphery face of the first alignment component excluding the connecting end face; and a magnet arranged on an opposite side to a connecting end face of the metal plate; and
the metal plate includes a falling preventing structure made of the soft magnetic material, arranged on an opposite side to the connecting end face and configured to prevent the guide pin from falling; and
the second optical connecting component connected to the first optical connecting component in such a manner that opposing connecting end faces of the first optical connecting component and the second optical connecting component have different polarities, wherein the second optical connecting component comprises:
a second optical waveguide component;
the second alignment component for fixing the second optical waveguide component;
a second magnetic structure integrated with the second alignment component, wherein at least a part of the second magnetic structure includes a hard magnetic material; and
a second positioning structure provided on the connecting end face of the second alignment component, wherein the second positioning structure is configured to determine a relative position between the connecting end face of the second alignment component and the connecting end face of the first alignment component.

12. The optical connecting structure according to claim 11, further comprising a foil component arranged on at least one connecting end face of the first magnetic structure, the foil component containing a metallic magnetic material.

13. An optical connecting structure comprising:
a first optical connecting component comprising:
a first optical waveguide component;
a first alignment component for fixing the first optical waveguide component;
a first magnetic structure integrated with the first alignment component, wherein at least a part of the first magnetic structure includes a hard magnetic material; and
a first positioning structure provided on a connecting end face of the first alignment component, wherein the first positioning structure is configured to determine a relative position between the connecting end face of the first alignment component and a connecting end face of a second alignment component provided in a second optical connecting component;
wherein:
the first positioning structure is a guide pin protruding from the connecting end face of the first alignment component;

the guide pin is configured to be fitted into a guide hole provided on the connecting end face of the second alignment component of the second optical connecting component;

the first magnetic structure includes: a metal plate made of a soft magnetic material, arranged on an outer periphery face of the first alignment component excluding the connecting end face; and a magnet arranged on an opposite side to a connecting end face of the metal plate; and the metal plate includes a falling preventing structure made of the soft magnetic material, arranged on an opposite side to the connecting end face and configured to prevent the guide pin from falling; and the second optical connecting component connected to the first optical connecting component, the second optical connecting component comprising:

a second optical waveguide component;

the second alignment component for fixing the second optical waveguide component;

a second magnetic structure integrated with the second alignment component, wherein the second magnetic structure is made of a soft magnetic material; and a second positioning structure provided on the connecting end face of the second alignment component, wherein the second positioning structure is configured to determine a relative position between the connecting end face of the second alignment component and the connecting end face of the first alignment component.

14. The optical connecting structure according to claim 13, further comprising a foil component arranged on at least one connecting end face of the first magnetic structure or the second magnetic structure, the foil component containing a metallic magnetic material.

* * * * *